(12) United States Patent
Thomson et al.

(10) Patent No.: US 7,500,176 B2
(45) Date of Patent: Mar. 3, 2009

(54) METHOD AND APPARATUS FOR AUTOMATICALLY CREATING A MOVIE

(75) Inventors: J. Keith Thomson, Belmont, CA (US); Scott Feldstein, Foster City, CA (US); Ivan Maltz, Pleasanton, CA (US)

(73) Assignee: Pinnacle Systems, Inc., Mountain View, CA (US)

( * ) Notice: Subject to any disclaimer, the term of this patent is extended or adjusted under 35 U.S.C. 154(b) by 790 days.

(21) Appl. No.: 10/957,263

(22) Filed: Sep. 30, 2004

(65) Prior Publication Data

US 2005/0217462 A1    Oct. 6, 2005

Related U.S. Application Data

(60) Provisional application No. 60/559,237, filed on Apr. 1, 2004.

(51) Int. Cl.
*G06F 17/00* (2006.01)
(52) U.S. Cl. .................................. 715/202; 715/203
(58) Field of Classification Search ................ 715/201, 715/202, 203, 723
See application file for complete search history.

(56) References Cited

U.S. PATENT DOCUMENTS

| | | | |
|---|---|---|---|
| 6,514,083 B1 * | 2/2003 | Kumar et al. | 434/307 A |
| 7,026,536 B2 * | 4/2006 | Lu et al. | 84/612 |
| 7,132,595 B2 * | 11/2006 | Lu et al. | 84/612 |
| 7,301,092 B1 * | 11/2007 | McNally et al. | 84/612 |
| 2003/0124499 A1 * | 7/2003 | Kumar et al. | 434/307 A |
| 2004/0199866 A1 * | 10/2004 | Deshpande | 715/500.1 |

OTHER PUBLICATIONS

Foote et al., Creating Music Videos Using Automatic Media Analysis, ACM Dec. 2002, pp. 553-560.*
Hua et al., Optimization-Based Automated Home Video Editing System, May IEEE 2004, pp. 572-583.*
Hua et al., AVE—Automated Home Video Editing, ACM 2003, pp. 490-497.*
Wang et al., Automatic Generation of Personalized Music Sports Video, ACM 2005, pp. 735-744.*
Nayak et al. Music Synthesis for Home Video: an Analogy based Approach, IEEE 2003, pp. 1556-1560.*
Tzanetakis, George, et al., "Audio Analysis using the Discrete Wavelet Transform," In Proceedings WSES Int. Conf. Acoustics and Music: Theory and Applications (AMTA 2001) Skiathos, Greece, 2001, 6 pages [unnumbered].
Muvee Technologies, News Release, "muvee autoProducer DVD Edition Awarded 4 Stars by PC Magazine," 2 pages, Apr. 30, 2003.
Muvee Technologies, News Release, "muvee Technologies launches muvee autoProducer—the world's only smart automatic video editing software," 2 pages, issued Oct. 29, 2001.

(Continued)

*Primary Examiner*—Cong-Lac Huynh
(74) *Attorney, Agent, or Firm*—Peter J. Gordon, Fish & Richardson; Oliver Strimpel

(57) ABSTRACT

Methods and systems for automatically creating a movie of computer selected video scenes accompanied by music are disclosed. Methods or systems consistent with the invention may synchronize the video scene changes with the onsets of beats in the music. Methods or systems consistent with the invention may also offer a user of the computer program product a choice of video styles by which the movie may be characterized when viewed by the user.

7 Claims, 29 Drawing Sheets

Method 350

OTHER PUBLICATIONS

Alghoniemy, Masoud, et al., "Rhythm and Periodicity Detection in Polyphonic Music," Proc. IEEE Third Workshop on Multimedia Signal Processing, pp. 185-190, Denmark, Sep. 1999.

Allen, Paul E., et al., "Tracking Musical Beats in Real Time," in *1990 International Computer Music Conference*, International Computer Music Association (Sep. 1990), 12 pages, 1 unnumbered page, pp. 1-10, p. xi.

Blackburn, Steven G., "Search by Humming," *Faculty of Engineering, University of Southhampton*, U.K. (B.Sc. in Computer Science Project Report), 69 pages (incl. title page & pp. 1-68, May 8, 1997.

Cheng, Kileen, et al., "Beat This: A Beat Synchronization Project: Home," Rice University, Houston, TX, available at http://www.owlnet.rice.edu/~elec301/Projects01/beat_sync/index.html, 2 pages, © 2001.

Cheng, Kileen, et al., "Beat This: A Beat Synchronizaion Project: Background," Rice University, Houston, TX, available at http://www.owlnet.rice.edu/~elec301/Projects01/beat_sync/background.html, 2 pages, © 2001.

Cheng, Kileen, et al., "Beat This: A Beat Synchronization Project: Beat Detection Algorithm," Rice University, Houston, TX, available at http://www.owlnet.rice.edu/~elec301/Projects01/beat_sync/beatalgo.html, 6 pages, © 2001.

Cheng, Kileen, et al., "Beat This: A Beat Synchronization Project: Time Scaling Algorithm," Rice University, Houston, TX, available at http://www.owlnet.rice.edu/~elec301/Projects01/beat_sync/timescale.html, 2 pages, © 2001.

Cheng, Kileen, et al., "Beat This: A Beat Synchronization Project: Phase Alignment Algorithm," Rice University, Houston, TX, available at http://www.owlnet.rice.edu/~elec301/Projects01/beat_sync/phasealign.html, 3 pages, © 2001.

Cheng, Kileen, et al., "Beat This: A Beat Synchronization Project: Results," Rice University, Houston, TX, available at http://www.owlnet.rice.edu/~elec301/Projects01/beat_sync/results.html, 2 pages, © 2001.

Cheng, Kileen, et al., "Beat This: A Beat Synchronization Project: Conclusions," Rice University, Houston, TX, available at http://www.owlnet.rice.edu/~elec301/Projects01/beat_sync/conclusions.html, 2 pages, © 2001.

Cheng, Kileen, et al., "Beat This: A Beat Synchronization Project: References," Rice University, Houston, TX, available at http://www.owlnet.rice.edu/~elec301/Projects01/beat_sync/references.html, 2 pages, © 2001.

Cheng, Kileen, et al., "Beat This: A Beat Synchronizaion Project: Matlab Code: Filterbank," Rice University, Houston, TX, available at http://www.owlnet.rice.edu/~elec301/Projects01/beat_sync/filterbank.m, 1 page, © 2001.

Cheng, Kileen, et al., "Beat This: A Beat Synchronization Project: Matlab Code: Hwindow," Rice University, Houston, TX, available at http://www.owlnet.rice.edu/~elec301/Projects01/beat_sync/hwindow.m, 2 pages, © 2001.

Cheng, Kileen, et al., "Beat This: A Beat Synchronization Project: Matlab Code: Differentiation," Rice University, Houston, TX, available at http://www.owlnet.rice.edu/~elec301/Projects01/beat_sync/diffrect.m, 1 page, © 2001.

Cheng, Kileen, et al., "Beat This: A Beat Synchronizaion Project: Matlab Code: Timecomb," Rice University, Houston, TX, available at http://www.owlnet.rice.edu/~elec301/Projects01/beat_sync/code/timecomb.m, 2 pages, © 2001.

Cheng, Kileen, et al., "Beat This: A Beat Synchronization Project: Matlab Code: Control," Rice University, Houston, TX, available at http://www.owlnet.rice.edu/~elec301/Projects01/beat_sync/control.m, 3 pages, © 2001.

Cheng, Kileen, et al., "Beat This: A Beat Synchronization Project: Signal Image," Rice University, Houston, TX, available at http://www.owlnet.rice.edu/~elec301/Projects01/beat_sync/images/plot1.gif., 1 page, © 2001.

Cheng, Kileen, et al., "Beat This: A Beat Synchronization Project: Hanning Window Images," Rice University, Houston, TX, available at http://www.owlnet.rice.edu/~elec301/Projects01/beat_sync/images/plot2.gif, 1 page, © 2001.

Cheng, Kileen, et al., "Beat This: A Beat Synchronization Project: Differentiated Images," Rice University, Houston, TX, available at http://www.owlnet.rice.edu/~elec301/Projects01/beat_sync/images/plot3.gif, 1 page, © 2001.

Cheng, Kileen, et al., "Beat This: A Beat Synchronization Project: Comb Filterbank Images," Rice University, Houston, TX, available at http://www.owlnet.rice.edu/~elec301/Projects01/beat_sync/plot4.gif, 1 page, © 2001.

Cheng, Kileen, et al., "Beat This: A Beat Synchronization Project: Matlab Code: Timescale," Rice University, Houston, TX, available at http://www.owlnet.rice.edu/~elec301/Projects01/beat_sync/code/timescale.m, 1 page, © 2001.

Cheng, Kileen, et al., "Beat This: A Beat Synchronization Project: Matlab Code: Phase Align," Rice University, Houston, TX, available at http://www.owlnet.rice.edu/~elec301/Projects01/beat_sync/phasealign.m, 2 pages, © 2001.

Cheng, Kileen, et al., "Beat This: A Beat Synchronization Project: First Beat Images," Rice University, Houston, TX, available at http://www.owlnet.rice.edu/~elec301/Projects01/beat_sync/images/plot5.gif, 1 page, © 2001.

Cheng, Kileen, et al., "Beat This: A Beat Synchronization Project: Phase Alignment Images," Rice University, Houston, TX, available at http://www.owlnet.rice.edu/~elec301/Projects01/beat_sync/images/plot6.gif, 1 page, © 2001.

Dixon, Simon, "An Interactive Beat Tracking and Visualisation System," in Proceedings of the International Computer Music Conference (ICMC 2001), La Habana, Cuba, 4 pages [unnumbered].

Escobar, Margarita, "Beat Detection in Music Using Average Mutual Information," (graduate thesis) Engineer Technology, University of Miami Music, pp. 3-90, 2001, available at http://www.music.miami.edu/programs/Mue/mue2003/research/graduate.htm, last accessed Jul. 21, 2004.

Forrest, James, "Tuning and Timbre Applet," available at http://eceserv0.ece.wisc.edu/~sethares/forrestjava/tuningandtimbre.html, 2 pages, last accessed on Jun. 12, 2002.

Fowlkes, Charless, et al., "Audio Morphing and Tempo Detection Using Fourier Analysis (CS20c Project Final Report)," available at http://www.cs.caltech.edu/~fowlkes/writeup, pp. 1-9, [undated].

Goto, Masataka, "An Audio-based Real-time Beat Tracking System for Music With or Without Drum-sounds," *Journal of New Music Research*, vol. 30, No. 2, pp. 159-171 (2001).

Goto, Masataka, et al., "A Beat Tracking System for Acoustic Signals of Music," Association of Computing Machinery, in Proceedings of the Second ACM International Conference on Multimedia, pp. 365-372, 1994, ISBN 0-89791-686-7.

Hone et al., "Making Movies With Your PC," 458 pages, Stefan Grünwedel (editor), Prima Publishing, 1994.

Ozer, Jan, "Visual Quickstart Guide, Pinnacle Studio 9 for Windows," 468 pages, Jill Marts Lodwig (editor), Peachpit Press, 2004.

Scheirer, Eric D., "Music-Listening System" (Ph.D. Thesis), School of Architecture and Planning, Massachusetts Institute of Technology, MA, pp. 1-248, Jun. 2000.

Scheirer, Eric D., "Tempo and beat analysis of acoustic musical signals," *J. Acoust. Soc. Am.* 103(1), pp. 588-601, Jan. 1998.

Searle, Brian C., "[Example Code: Matlab/FFT and AR]," available at http://www.dartmouth.edu/~searleb/matlab/sleep.html, as of Apr. 23, 2002, 1 page.

Searle, Brian C., "[Example Code: Matlab]," available at http://www.dartmouth.edu/~searleb/matlab/sleep/menu.html, as of Apr. 23, 2002, 2 pages.

Searle, Brian C., "[Example Code: Matlab/sleepplot]," available at http://www.dartmouth.edu/~searleb/matlab/sleep/sleepplot.html, as of Apr. 23, 2002, 4 pages.

Searle, Brian C., "[Example Code: Matlab/sleepedit]," available at http://www.dartmouth.edu/~searleb/matlab/sleep/sleepedit.html, as of Apr. 23, 2002, 1 page.

Searle, Brian C., "[Example Code: Matlab/sleepduelpick]," available at http://www.dartmouth.edu/~searleb/matlab/sleep/sleepduelpick.html, as of Apr. 23, 2002, 1 page.

Searle, Brian C., "[Example Code: Matlab/sleepduel]," available at http://www.dartmouth.edu/~searleb/matlab/sleep/sleepduel.html, as of Apr. 23, 2002, 2 pages.

Searle, Brian C., "[Example Code: Matlab/sleepdelete]," available at http://www.dartmouth.edu/~searleb/matlab/sleep/sleepdelete.html, as of Apr. 23, 2002, 1 page.

Searle, Brian C., "[Example Code: Matlab/sleep analyze]," available at http://www.dartmouth.edu/~searleb/matlab/sleep/sleepanalyze.html, as of Apr. 23, 2002, 2 pages.

Searle, Brian C., "[Example Code: Matlab/sleep add]," available at http://www.dartmouth.edu/~searleb/matlab/sleep/sleepadd.html, as of Apr. 23, 2002, 2 pages.

Searle, Brian C., "[Example Code: Matlab/etedit]," available at http://www.dartmouth.edu/~searleb/matlab/sleep/etedit.html, as of Apr. 23, 2002, 1 page.

Searle, Brian C., "[Example Code: Matlab/fmdir]," available at http://www.dartmouth.edu/~searleb/matlab/sleep/fmdir.html, as of Apr. 23, 2002, 1 page.

Searle, Brian C., "[Example Code: Matlab/sleep menu]," available at http://www.dartmouth.edu/~searleb/matlab/sleep/sleep.jpg, as of Apr. 23, 2002, 1 page.

Searle, Brian C., "[Example Code: Matlab/sleep peak picker]," available at http://www.dartmouth.edu/~searleb/matlab/sleep/sleeppeakpicker.jpg, as of Apr. 23, 2002, 1 page.

Searle, Brian C., "[Example Code: Matlab/sleep autoregressive]," available at http://www.dartmouth.edu/~searleb/matlab/sleep/sleepanalyze.jpg, as of Apr. 23, 2002, 1 page.

Searle, Brian C., "[Example Code: Matlab/sleep autoregressive, duel]," available at http://www.dartmouth.edu/~searleb/matlab/sleep/sleepduel.jpg, as of Apr. 23, 2002, 1 page.

Seppänen, Jarno, "Computational Models of Musical Meter Recognition" (M.Sc. Thesis), *Department of Information Technology*, Tampere University of Technology, Finland, 80 pages (incl. title page, pp. ii-viii & pp. 1-72), Nov. 1, 2001.

Sethares, William A., "Acoustical Signal Processing," available at http://eceserv0.ece.wisc.edu/~sethares/percept.html, 2 pages, 1999.

Sethares, William A., "Adaptive Tunings for Musical Scales," available at http://eceserv0.ece.wisc.edu/~sethares/papers/adaptun.html, 1 page, 1999.

Sethares, William A., "Consonance Based Spectral Mappings," available at http://eceserv0.ece.wisc.edu/~sethares/papers/specmap.html, 1 page, 1999.

Sethares, William A., "Local Consonance and the Relationship Between Timbre and Scale," http://eceserv0.ece.wisc.edu/~sethares/papers/consance.html, 2 pages, 1999.

Sethares, William A., "Relating Tuning and Timbre," available at http://eceserv0.ece.wisc.edu/~sethares/consemi.html, 24 pages, 1999.

Sethares, William A., "Selected Publications," available at http://eceserv0.ece.wisc.edu/~sethares/pubs.html, 10 pages, 1999.

Sethares, William A., "Some Useful Computer Programs," available at http://eceserv0.ece.wisc.edu/~sethares/comprog.html, 3 pages, 1999.

Sethares, William A., "Tuning Timbre Spectrum Scale Table of Contents," available at http://eceserv0.ece.wisc.edu/~sethares/contents.html, as of Jun. 12, 2002.

Sethares, William A. et al., "Periodicity Transforms," available at http://eceserv0.ece.wisc.edu/~sethares/periodic.html, 2 pages, 1999.

Toews, Dan, et al., "Design Specifications for the Pace Maker Beat Recognition System," Simon Frasier University School of Engineering Science, *Simplesmart Inc.*, 29 pages (incl. title page, abstract page, & pp. 1-27), Oct. 15, 2001, available at http://www.ensc.sfu.ca/users/whitmore/public-html/courses/305/2001/sstdesi.pdf.

Tzanetakis, George, "Tutorial on Music Information Retrieval for Audio Signals," distributed at International Symposium on Music Information Retrieval, 2002, 2 pages [unnumbered].

Tzanetakis, George, et al., "Human Perception and Computer Extraction of Musical Beat Strength," *Proc. of the 5th Int. Conference on Digital Audio Effects(DAFX-02)*, Hamburg, Germany, pp. 1-5, Sep. 26-28, 2002.

Uhle, Christian, et al., "Estimation of Tempo, Micro Time and Time Signature from Percussive Music," *Proc. of the 6th Int. Conference on Digital Audio Effects (DAFX-03)*, London, UK, pp. 1-6, Sep. 8-11, 2003.

Wang, Ye, et al., "A Compressed Domain Beat Detector using MP3 Audio Bitstreams," Association for Computing Machinery, in Proceedings of the Ninth ACM International Conference on Multimedia, pp. 194-202, (26 pages), Ottawa, Canada, 2001, also available at http://www.acum.org/sigs/sigmm/mm2001/ep/wang.

Scheirer, Eric D., "Tempo and beat analysis of acoustic musical signals", J. Acoustical Society Of America 103(1), Jan. 1998, pp. 588-601.

* cited by examiner

| Bin # | Frequency | Bin value |
|---|---|---|
| | F1 | RA1 |
| | F2 | RA2 |
| | F3 | RA3 |
| | F4 | RA4 |
| | F5 | RA5 |
| | F6 | RA6 |

Harmonicity Matrix

| F1/F1 | F1/F2 | F1/F3 | F1/F4 | F1/F5 | F1/F6 |
|---|---|---|---|---|---|
| F2/F1 | F2/F2 | F2/F3 | F2/F4 | F2/F5 | F2/F6 |
| F3/F1 | F3/F2 | F3/F3 | F3/F4 | F3/F5 | F3/F6 |
| F4/F1 | F4/F2 | F4/F3 | F4/F4 | F4/F5 | F4/F6 |
| F5/F1 | F5/F2 | F5/F3 | F5/F4 | F5/F5 | F5/F6 |
| F6/F1 | F6/F5 | F6/F3 | F6/F4 | F6/F5 | F6/F6 |

FIG. 7a

| Bin # | Center Frequency | Bin value |
|---|---|---|
| 26 | 202.8 | 0.28 |
| 54 | 96.6 | 0.38 |
| 80 | 65.0 | 1.00 |
| 159 | 32.6 | 0.48 |

Harmonicity Matrix

| 1 | 2 | 3 | 6 | 0 | 0 |
|---|---|---|---|---|---|
| 0 | 1 | 0 | 3 | 0 | 0 |
| 0 | 0 | 1 | 2 | 0 | 0 |
| 0 | 0 | 0 | 1 | 0 | 0 |
| 0 | 0 | 0 | 0 | 0 | 0 |
| 0 | 0 | 0 | 0 | 0 | 0 |

FIG. 7b

Method 350

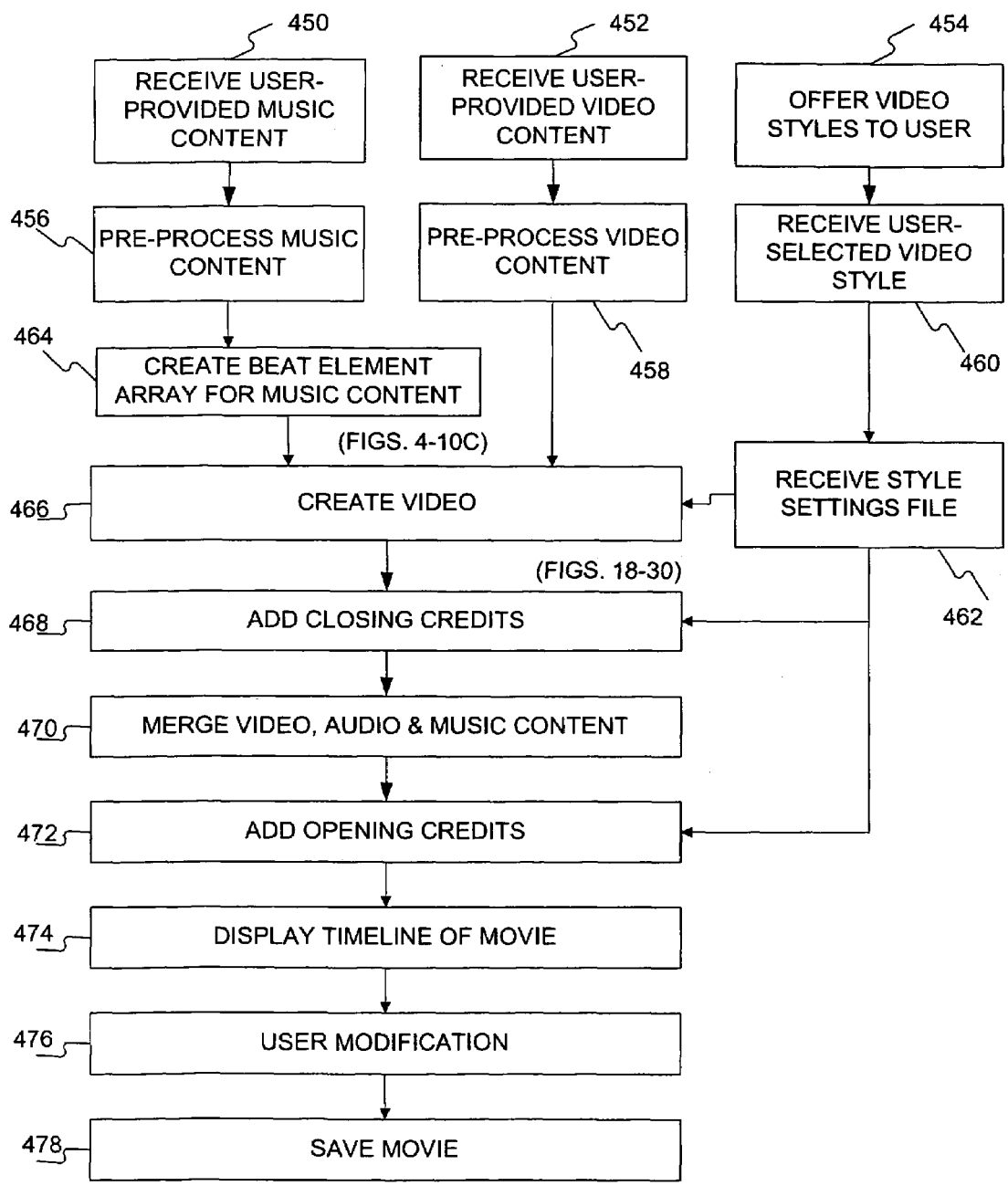

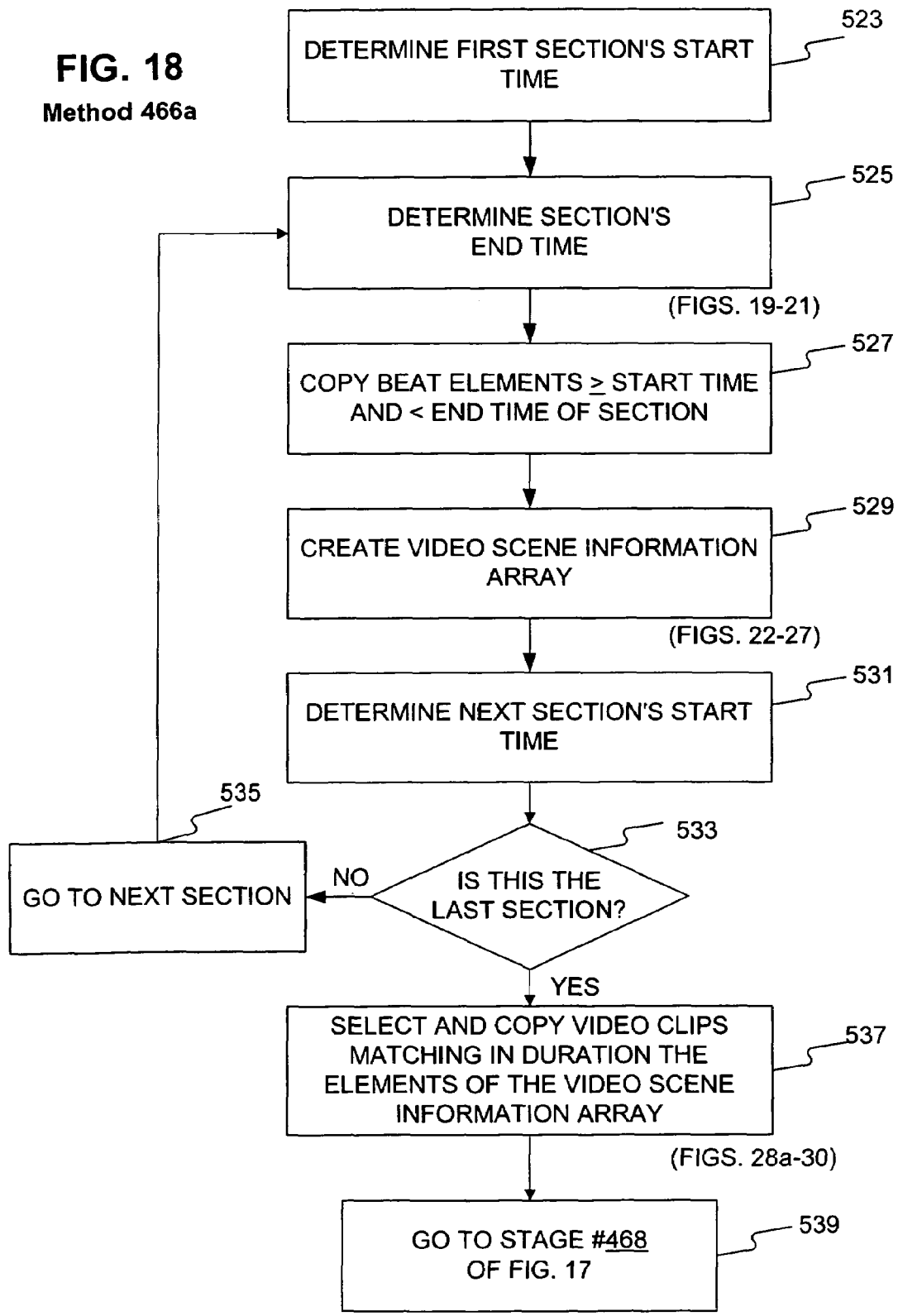

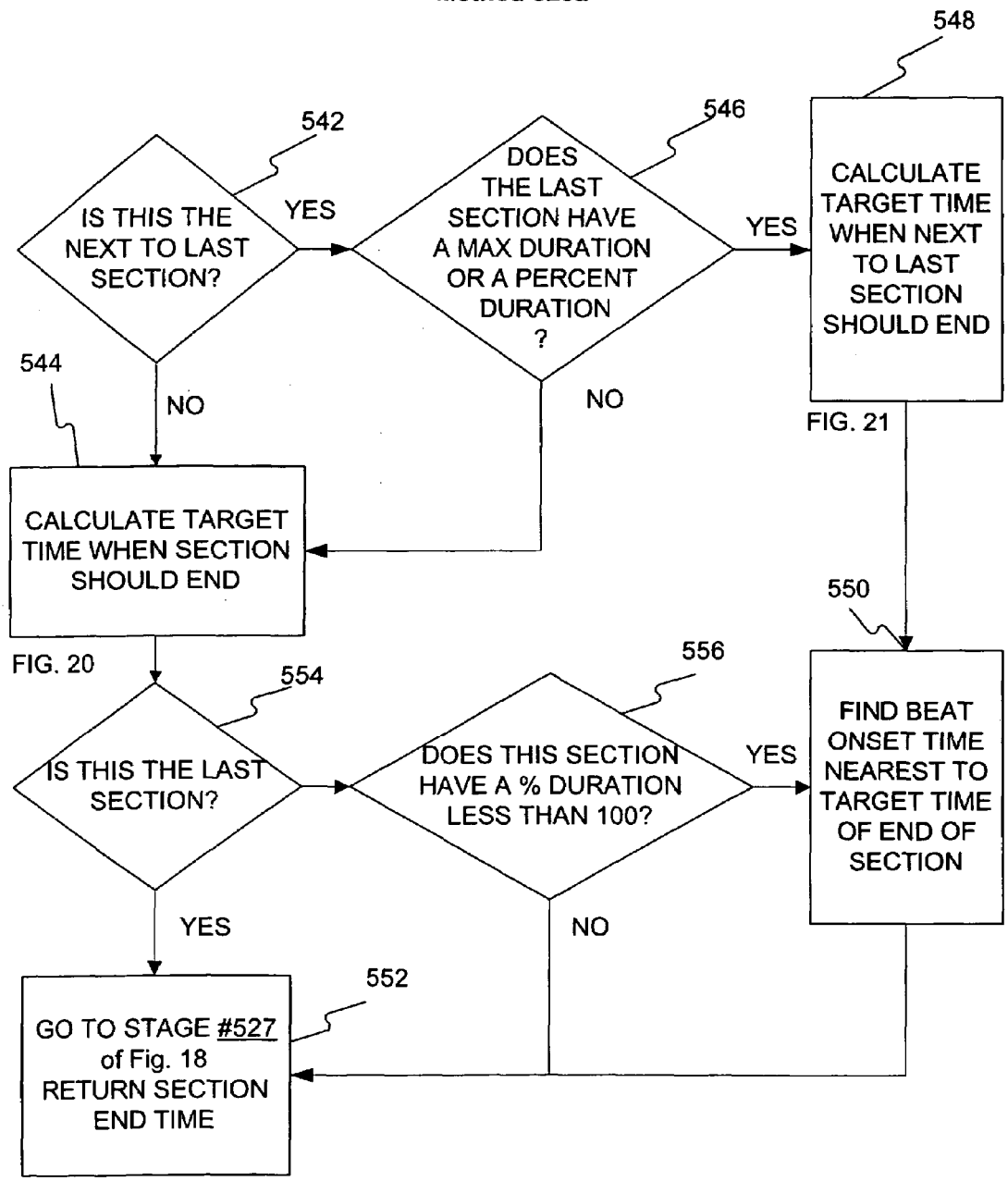

Method 544a

Method 593a

Method 595a

Method 640a

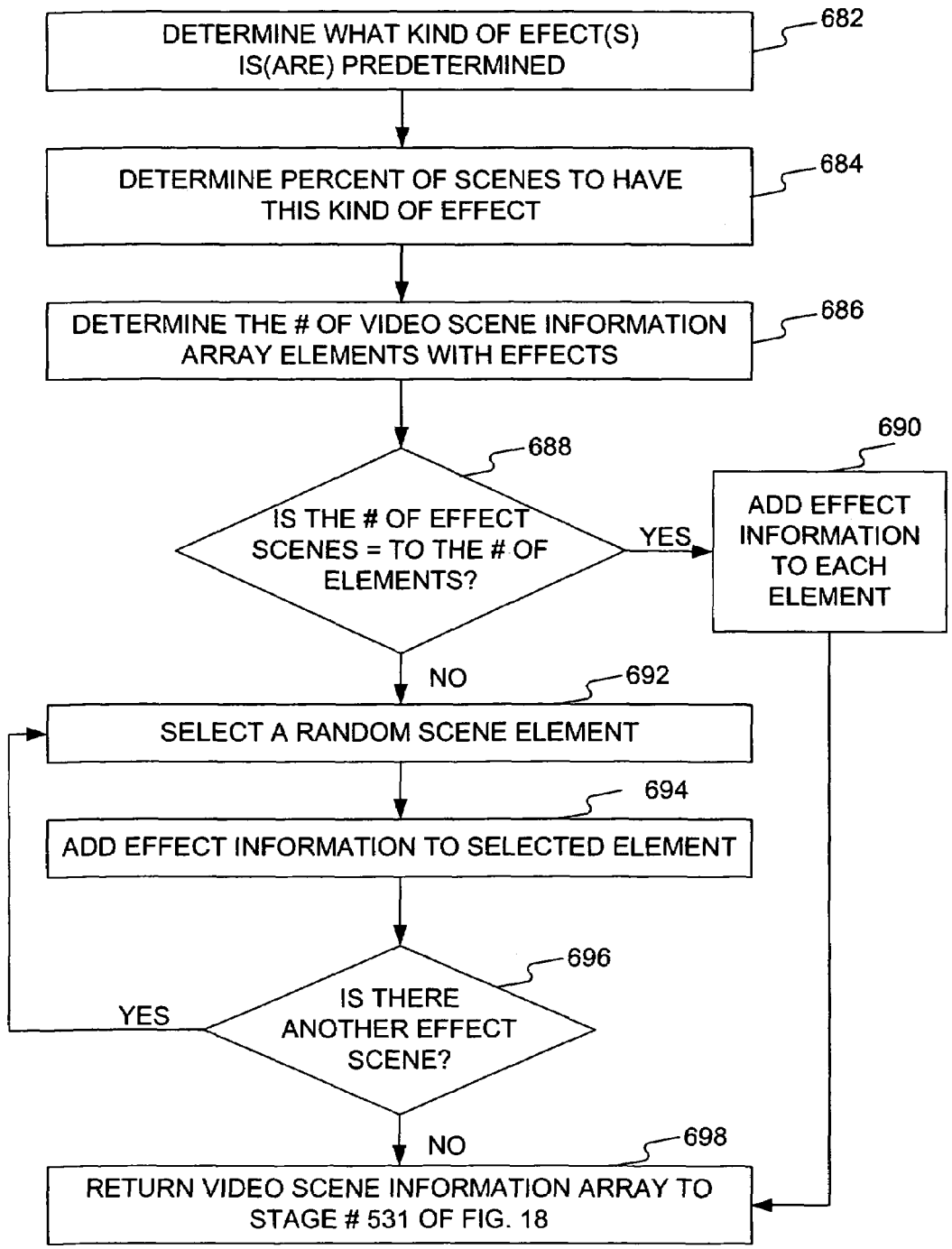

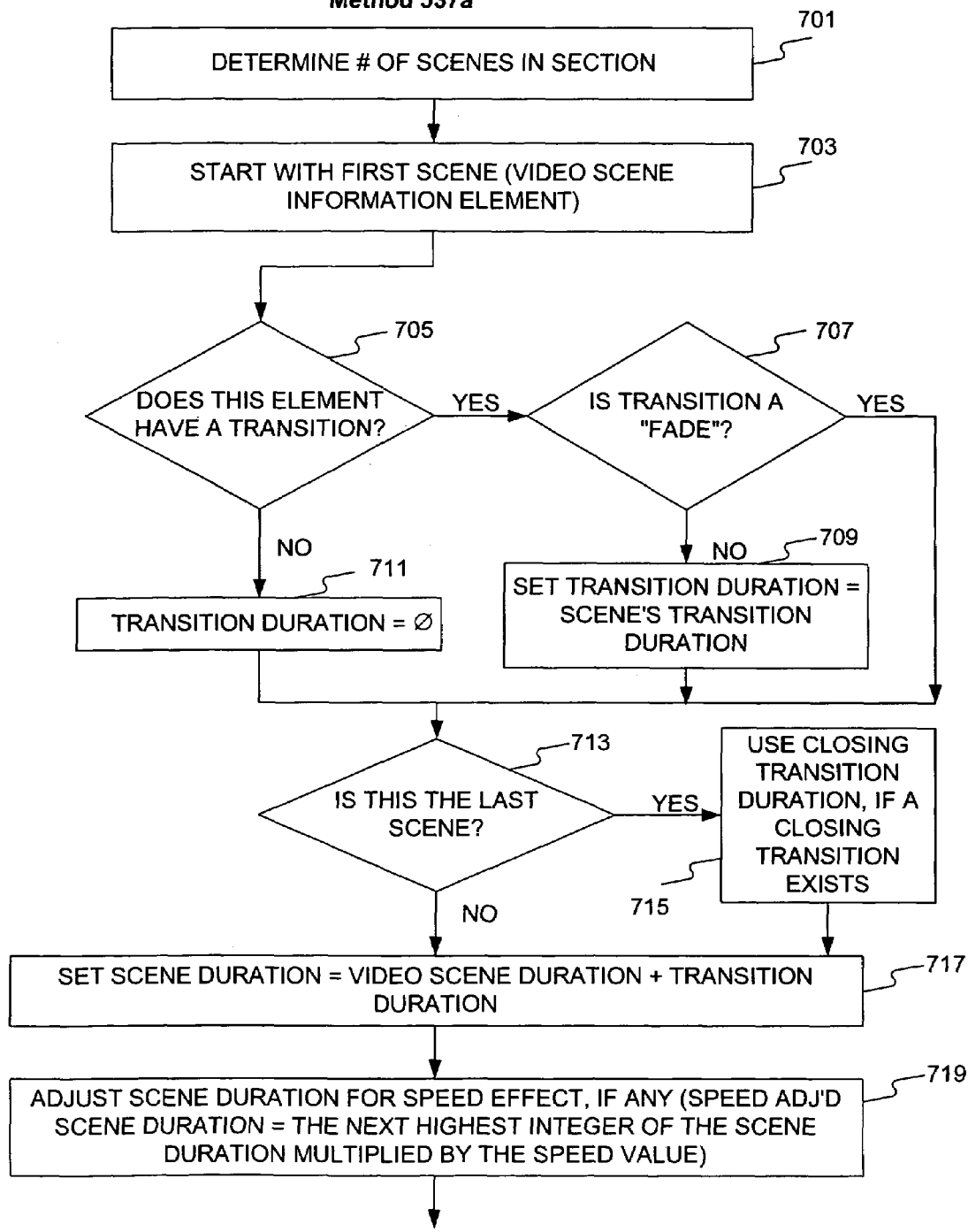

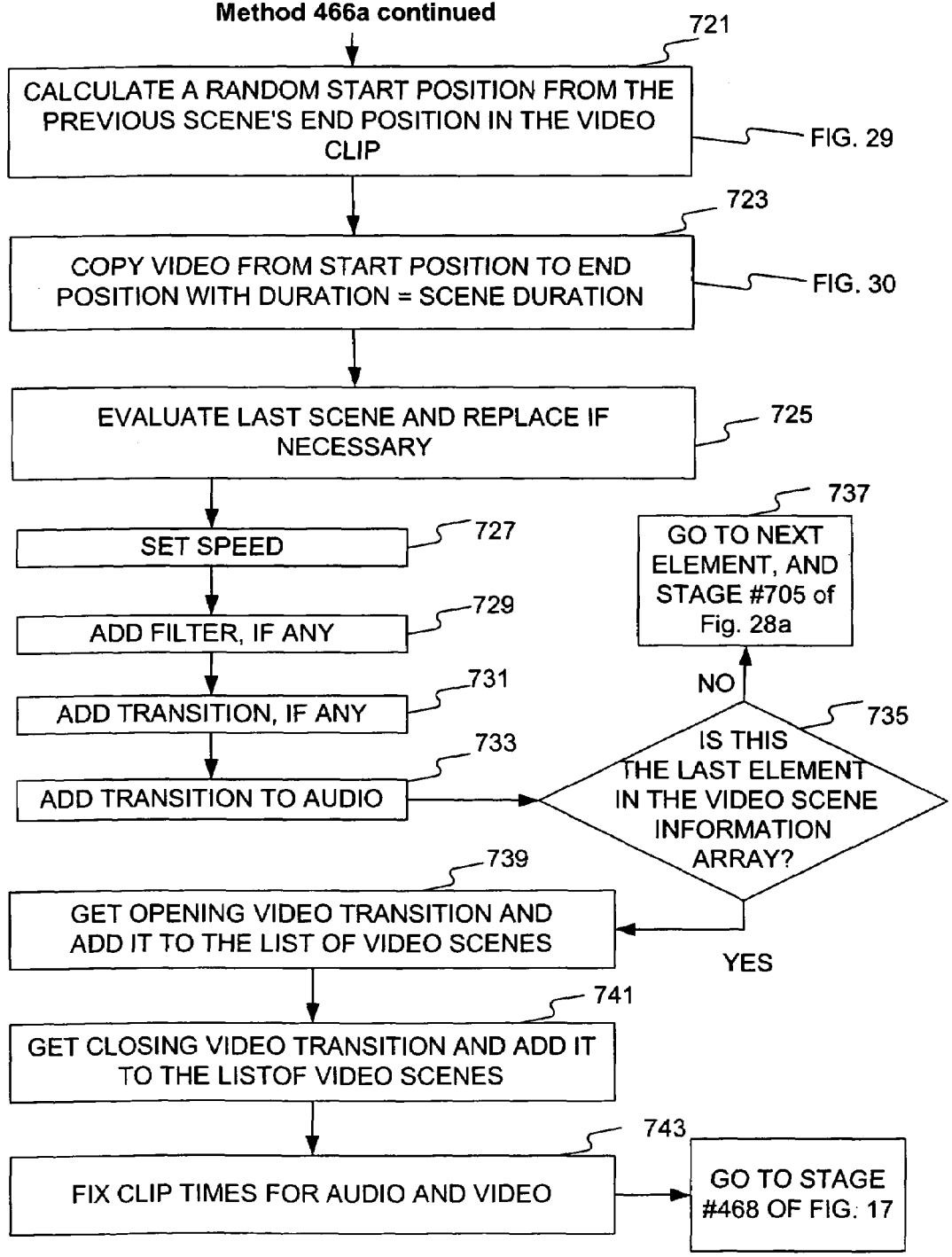

Method 721a

Method 723a

METHOD AND APPARATUS FOR AUTOMATICALLY CREATING A MOVIE

CROSS REFERENCE TO RELATED APPLICATION

Priority under 35 U.S.C. § 119 is claimed based on U.S. Provisional Application No. 60/559,237, filed on Apr. 1, 2004, the disclosure of which is expressly incorporated by reference.

BACKGROUND

1. Technical Field

Embodiments disclosed herein relate to methods and apparatus for automatically creating a "movie" from user-provided digital music content and user-provided digital moving video content.

2. Description of Related Art

In the production of multimedia presentations, it is often desirable to synchronize music and video. Such synchronization can, however, be difficult with certain types of music.

Music composers create music with a particular tempo and a "meter." The meter is the part of rhythmical structure concerned with the division of a musical composition into "measures" by means of regularly recurring accents, with each measure consisting of a uniform number of beats or time units, the first of which usually has the strongest accent. "Time" is often used as a synonym of meter. It is the grouping of the successive rhythmic beats, as represented by a musical note taken as a time unit. In written form, the beats can be separated into measures, or "bars," that are marked off by bar lines according to the position of the principal accent.

Tempo is the rate at which the underlying time unit recurs. Specifically, tempo is the speed of a musical piece. It can be specified by the composer with a metronome marking as a number of beats per minute, or left somewhat subjective with only a word conveying the relative speed (e.g. largo, presto, allegro). Then, the conductor or performer determines the actual rate of rhythmic recurrence of the underlying time unit.

The tempo does not dictate the rhythm. The rhythm may coincide with the beats of the tempo, but it may not. FIG. 1 shows, in standard musical notation, two measures of a simple musical composition with a four-four meter, or "time signature," identified by the 4/4. This meter could also expressed as "the quarter note 'gets the beat' with four beats to a measure". The tempo will be the rate at which the quarter notes (individual solid notes in FIG. 1) recur, but in FIG. 1 the actual tempo is unspecified.

Each measure generally begins and ends with a bar line and may include an Arabic number above its beginning bar as identification. The rhythm in FIG. 1 is a steady repetition of an accented beat (indicated by ">") followed by three unaccented beats. The rate of recurrence of beats in the rhythm is the same as the tempo and each beat in the rhythm will occur on the beats of the tempo. The frequency of the accented beats in the rhythm is one-fourth of the tempo.

FIG. 2 shows three measures using the same tones ("pitches") as the notes of the musical composition in FIG. 1, but with a different meter. The meter of the musical composition in FIG. 2 is symbolized as 3/4 and expressed as "the quarter note 'gets the beat' with three beats to a measure." Here, the rhythm is a steady repetition of an accented beat followed by two unaccented beats. The rate of recurrence of beats in the rhythm is the same as the tempo and each beat in the rhythm will fall on the beats of the tempo. The frequency of the accented beats in the rhythm is one-third of the tempo.

FIG. 3 shows two measures of a simple musical composition with a 4/4 meter, with the quarter note getting the beat. Here, however, the rhythm varies in each measure. In measure 1, there are two half notes (open note equal to two quarter notes in duration), and in measure 2 there is a dotted quarter note (one and a half times the duration of a quarter note) followed by five eighth notes (each one half the duration of a quarter note). In each case, the first beat of the measure is accented followed by unaccented beats. However, the accented beats in FIG. 3 are not the same duration. Where two or more beats occur during one tempo beat period, the tempo beat is broken into appropriate sub time frames. Since in FIG. 3 the most beats per underlying time unit is two, the time unit is split into two and the time is "counted" as follows: One And Two And Three And Four And. In the second measure, the dotted quarter note is counted One And Two, the first eighth note is counted as the "And" of Two, the second eighth note as Three, the third eighth note as the "And" of Three, the fourth eighth note as Four, and the last eighth note as the "And" of Four. The And is symbolized by an addition sign, "+". For illustration, the "counted" beats of the tempo are printed below the notes in FIGS. 1-3. Thus, one can see that only some beats of the rhythm coincide with the tempo beats. Note that the frequency of the accented beats in FIG. 3 is still one-fourth the tempo.

When asking a room of people to "keep time" to the beat of a musical composition, the response may vary. With reference to the compositions of FIGS. 1-3, some may mark one beat per measure (the most accented beat in the measure, often the first beat) and some may mark a faster recurrence of beats. With respect to a musical composition like the two measures in FIG. 1, the second group of people will be marking four times to the first group's one mark in the same time period.

The fundamental beat frequency is a name given to the frequency of the predominant beats that the majority of people perceive in any given musical composition as they keep time with the music. (Note that this use of the term "frequency" is in contrast to another use of the term "frequency" to denote the pitch of a note.) Candidates for the fundamental beat frequency of the two measures of FIG. 1 could either be the tempo (number of quarter notes per minute, since all beats of the rhythm coincide with the underlying time unit) or the frequency of the accented first beat of the measure, which is one-fourth the frequency of the tempo. Candidates for the fundamental beat frequency of the three measures of FIG. 2 could either be the tempo (since all beats of the rhythm coincide with the underlying time unit) or the frequency of the accented first beat of the measures, which is one-third the tempo.

The fundamental beat frequency of the measures of FIG. 3 is unlikely to be the tempo, even though there are beats on 1 and 3 in the first measure and 1, 3 and 4 in the second measure. Candidates could be the frequency of the accented beats (one fourth of the tempo) or the frequency of beats 1 and 3 (half of the tempo). However, analysis of more measures of the composition may be necessary to determine the fundamental beat frequency.

The fundamental beat frequency may depend on other aspects of the music, like the presence, pattern, and relative strengths of accents within the rhythm. As is the case with tempo, the fundamental beat frequency is specified as beats per minute (BPM). The fundamental beat frequency in music typically ranges from 50 to 200 BPM and, of course, may change over the course of a complete composition.

Dance music has a rather pronounced and consistent fundamental beat frequency, but jazz, classical (symphonic) music, and some individual songs have inconsistent fundamental beat frequencies, because the tempo, or meter, or rhythm, or all three may change. Disc jockeys have made use of reasonably priced equipment that can detect the fundamental beat frequency of certain types of dance music, such as modern rock, pop, or hip-hop. Usually, such equipment did not identify the beats that corresponded to the fundamental beat frequency, but merely provided a tempo, e.g., 60 or 120 BPM.

A more sophisticated analyzer, unlike simpler DJ-style BPM equipment, is needed to successfully determine the fundamental beat frequency of a wider range of musical styles including jazz, classical, etc. and of material where the tempo and rhythm change, e.g. Zorba the Greek. The advent of the mathematical technique known as the discrete wavelet transform ("DWT") has enabled more precise temporal and spectral analysis of a signal. Use of the DWT has addressed some of the shortcomings of the earlier mathematical technique of Fourier transform. In particular, coefficient wavelet ("DAUB4") variations of the DWT proposed by Ingrid Daubechies, have enabled digital analysis of music with much better real-time information.

A method using DWT to analyze a musical composition to estimate the tempo is described in Section 5 "Beat detection" of the article "Audio Analysis using the Discrete Wavelet Transform" by George Tzanetakis, Georg Essl, and Perry Cook. However, this method using the DWT often failed to detect the fundamental beat frequency in certain genres of music, especially jazz and classical. The beat frequency that it did detect often did not match the beat frequency determined by human analysis using a computer (i.e., listening and clicking the mouse to the music and then averaging the time between clicks).

Due to the nature of music performance, the beats do not always fall with clock-like precision. Such imprecision and inconsistency, so that beats do not fall at exact time period intervals of the fundamental beat frequency is expected, and even desired. However, when such music is incorporated into multimedia productions, sophisticated synchronization of audio and video is necessary. That is, the eye will immediately notice if still images or moving video content is manipulated or changed at inappropriate instants in time, i.e., times not corresponding closely enough to the beat corresponding to the fundamental beat frequency, be it slightly ahead or behind the actual beat onset times. In certain audiovisual applications, it is not sufficient to merely determine the fundamental beat frequency, but rather, it is desirable to select the exact beat onset time that are associated with this fundamental beat frequency.

A time domain signal (amplitude vs. time) display of a musical composition does not always readily indicate the fundamental beat frequency. The envelope of the time domain signal can be manipulated to make the onsets of the notes of the instrument (whether it be voice, rhythm, wind, brass, reed, string, or whatever else is being used) appear as amplitude peaks. However, most of the time not all of the peaks are beat onset times that correspond to the fundamental beat frequency.

Moreover, those computer users with know-how have edited video content to be accompanied by music. How-to books abound on editing video content with your computer, such as *Making Movies with Your PC* by Robert Hone and Margy Kuntz, Prima Publishing, 1994, or using a video editor such as the one available in Pinnacle Studio 9, as described in *Pinnacle Studio 9 for Windows* by Jan Ozer, Peachpit Press, 2004. However, a wider range of people would like to create personalized movies, consisting of video that they have selected accompanied by music they have selected. Or they may just prefer to make a video faster, by having a computer program do it automatically. Preferably, users desire movies with variable length scenes and effects. Users prefer to have a range of video styles from which to create a movie.

It is therefore desirable to provide automated methods and apparatus for creating "movies" from user-provided digital music content and user-provided digital moving video content.

SUMMARY

In one embodiment broadly described herein, a method for and computer readable medium of instructions for making a movie. The method and product may include receiving digital music content and digital video content. The method and product may further include offering the user a selection of video styles by which to characterize the movie and receiving the user's selected video style. The method and product may further include creating a set of ordered durations of video scenes according to the user-selected video style and a set of ordered video scenes selected from the user-selected digital video content according to the user-selected video style. The duration of a video scene may match the corresponding duration of the set of ordered durations. The method and product may further include synchronizing concurrent playing of the digital music content and the set of ordered video scenes.

In another embodiment broadly described herein, a method and computer readable medium of instructions for making a movie may include receiving digital music content and user-provided digital video content. The method and product may further include offering a selection of video styles to a user and receiving a user-selected video style. The video style may provide preset values of variables that define the visual characteristics of the movie. The method and product may further provide a set of onset times of beats in the digital music content. The method and product may further include choosing from the set of beat onset times, a stop time for one or more video scenes to be played in the movie using at least one of the preset values of the variables from the video style. The method and product may further include selecting from the user-selected video content, one or more video scenes to match in duration the duration between the scene's start and stop times. The method and product may further include creating a list of selected video scenes for synchronized playback with the digital music content, wherein a plurality of the selected video scenes change in synchronization with a subset of onset times of beats in the digital music content.

In yet another embodiment broadly described herein, a method and computer readable medium of instructions for creating a movie may include receiving user-provided digital music content and user-provided digital video content which may include a set of video clips. The method and product may further include receiving a set of onset times of beats in the user-provided digital music content and creating a set of ordered durations of video scenes. The method and product may further include selecting a set of ordered video scenes from the user-provided digital video content, the video scenes matching in duration their corresponding duration of the set of ordered durations. The method and product may further include synchronizing concurrent playing of the user-provided digital music content and set of ordered video scenes such that a plurality of video scenes change on onset time of beats within the user-provided digital music content.

BRIEF DESCRIPTION OF THE DRAWINGS

The accompanying drawings, which are incorporated in and constitute a part of this specification, illustrate several embodiments consistent with the invention and together with the description, serve to explain the principles of the invention.

FIGS. 7a and 7b illustrate the harmonicity matrix calculations of the method of FIG. 4.

FIG. 17 is a flow diagram of a method consistent with invention for automatically creating a movie, characterized by a user-selected video style.

FIG. 18 is a flow diagram of a preferred implementation of stage 466 of FIG. 17 for creating a list of selected video scenes.

FIG. 19 is a flow diagram of a preferred implementation of stage 525 of FIG. 18 for determining a section's end time.

FIG. 27 is a flow diagram of a preferred implementation of stage 605 of FIG. 22 for adding video effect information to an array of information about video scenes to be created.

FIGS. 28a & 28b are flow diagrams of a preferred implementation of stage 537 of FIG. 18 for creating one or more video scenes.

DESCRIPTION OF EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Figure 4:
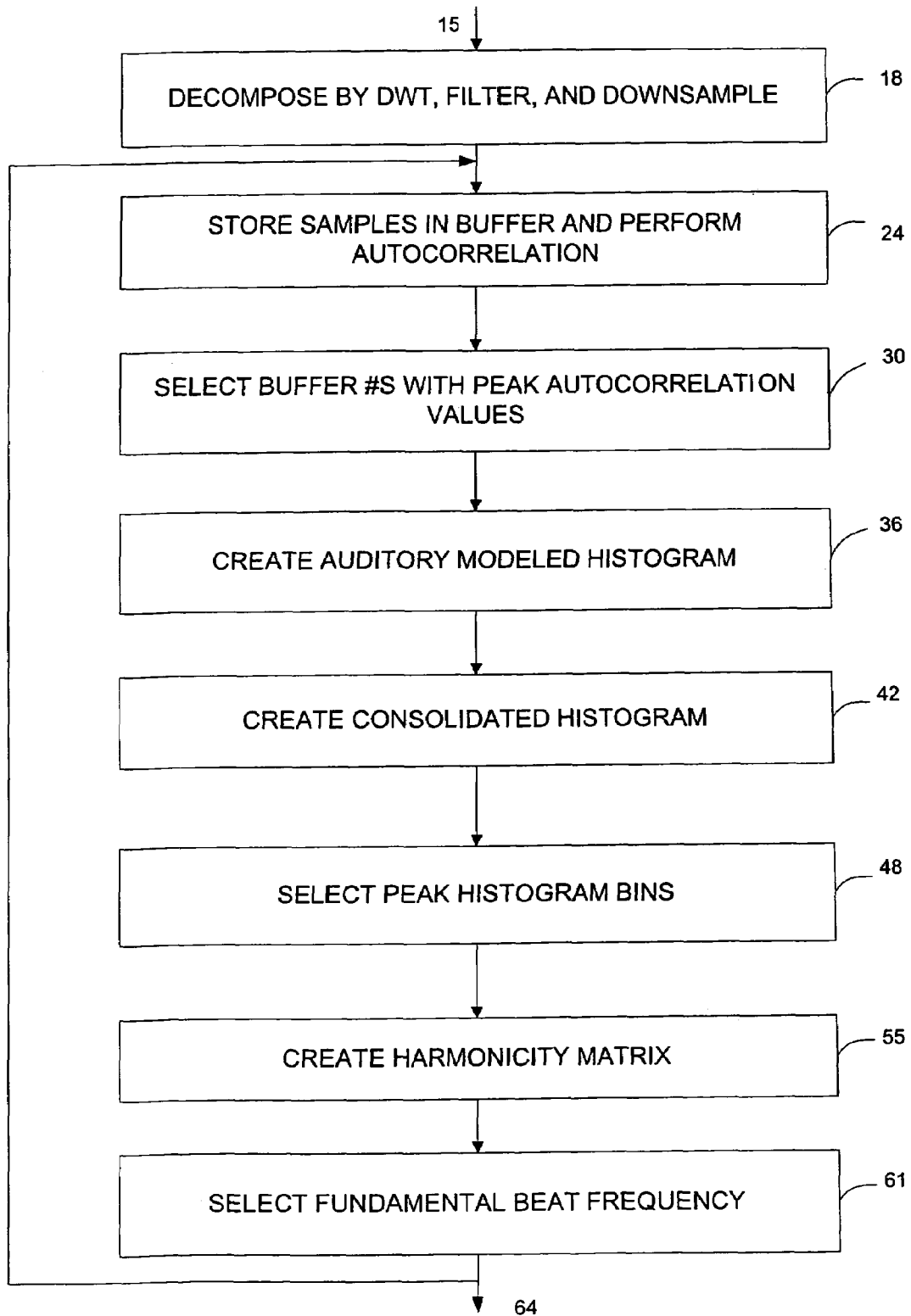
FIG. 4 is a flow diagram of a method consistent with the invention for detecting the fundamental beat frequency in a window of time in a music signal.

A method consistent with the invention detects the fundamental beat frequency present in a localized section of a music signal. In FIG. 4, a digital music signal 15 is transformed using the DWT plus other digital processing in stage 18. Preferably, signal 15 has a sample rate of 22.05 kHz and represents audio frequencies up to 11.025 kHz. Signal 15 is processed by a Dyadic Analysis Filter Bank ("DAUB4"), a well-known specific application of DWT, to produce five sets of DWT coefficients. Specifically, a set of "Detail" coefficients is produced corresponding to four separate octave subbands with upper limits at 11,025 Hz, 5,512 Hz, 2,756 Hz and 1,378 Hz; and a set of "Smooth," or coarse approximation, coefficients is produced for the band from zero to 689 Hz. Other input frequencies or wavelet families may be used; however, this works well to identify the beat for a variety of instruments.

The coefficient sets from DAUB4 are further digitally processed in stage 18. Specifically, the subband Detail coefficient sets and the Smooth coefficient set are full wave rectified and low-pass filtered by, for example, a second-order Butterworth low-pass filter with a cutoff frequency of approximately 120 Hz. This cutoff frequency is a compromise in that it is necessary to capture the envelope of each of the bands and preserve the rhythmic content while protecting against aliasing in the downsampling that follows.

The processed coefficient sets are then downsampled to a common sample rate, preferably of approximately 86 Hz. Specifically, the coefficient set for the highest frequency band is downsampled by a factor of 128. The coefficient set for the next highest frequency band is downsampled by half as much, that is, a factor of 64. Coefficient sets for the lower two frequency bands are downsampled by factors of 32 and 16, respectively. The coefficient set for the coarse approximation is also downsampled by a factor of 16. The downsampled data of all subbands and the downsampled coarse approximation are summed.

Stage 24 processes the summed data by high pass filtering and assembling into buffers each containing summation values, preferably 256 summation values. Since input signal 15 had a sampling rate of 22.05 kHz, 256 summation values, after downsampling to a common sampling rate of approximately 86 Hz, represents approximately three (3) seconds of audio, specifically, 2.9722 seconds. The buffer size is chosen to encompass several cycles of the expected range of the fundamental beat frequency. Because most music typically has a fundamental beat frequency of 50 to 200 BPM, a time interval of three seconds of audio is likely to contain at least three beats at the fundamental beat frequency.

Each buffer entry represents 1/256 of 2.9722 seconds of audio, or 11.6 ms. Beat periodicity resolution is therefore 11.6 ms or, in other words, has an absolute uncertainty of 11.6 ms.

Each successive buffer is created such that its set of summation values overlaps with the previous buffer's set. In this embodiment, the overlap is 128 summation values. That is, the first 128 summation values of each buffer are the same as the last 128 summation values of the previous buffer. The overlap may be greater or smaller. The overlap does not affect the sample rate of subsequent processing but does alter the amount of processing. With an overlap of 128 summation values, the analysis moves forward in 1.486 second hops. With an overlap of 192 summation values, for example, the analysis would move forward in 0.743 second hops.

Greater overlap provides greater time resolution for beats. In other words, with a 192 summation value overlap, three fourths of each 2.9722 seconds of audio would be analyzed at least twice, the latter half would be analyzed three times, and the last fourth would be analyzed four times. Thus, the window of time for a particular beat representing a detected beat period is narrowed, providing a greater time resolution, or certainty, as to when the beat marking the beginning of that period will occur.

Figure 5:
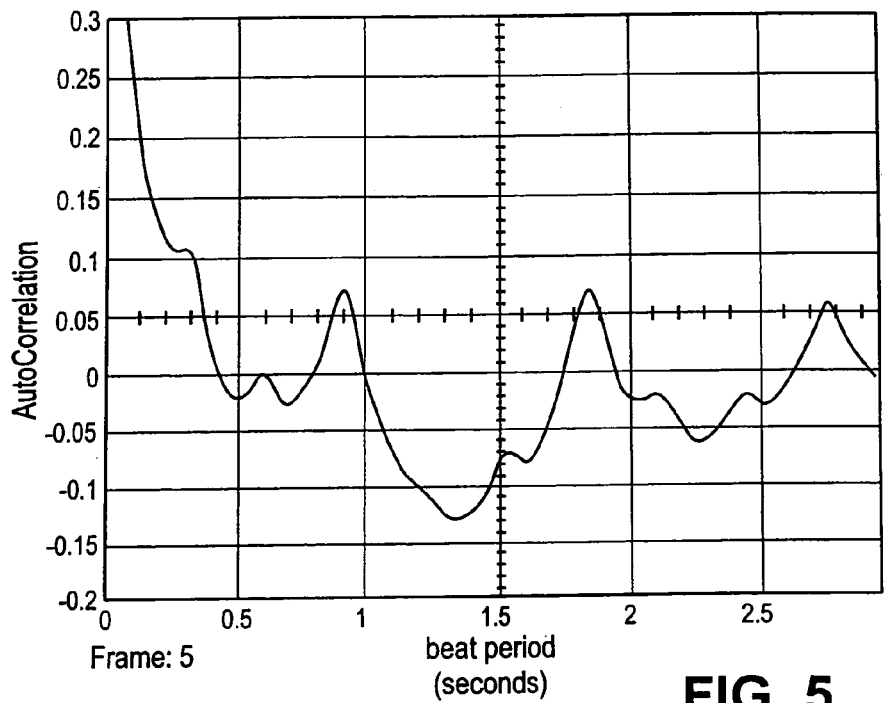
FIG. 5 is a graph of an envelope of a sample autocorrelation function as a function of beat period.

The autocorrelation function for the buffer is then sequentially computed with all non-negative lags and normalized, creating an autocorrelation value for each entry in the buffer. An aggressive high pass filter then performs mean removal, i.e., removes the autocorrelation values for very small time shifts. An envelope of autocorrelation data for the buffer, when graphed as a function of beat period (in seconds) is illustrated in FIG. 5.

As illustrated in Table 1 below, each buffer entry corresponds to a range of beat period in seconds and a range of frequencies in beats per minute.

TABLE 1

| buffer entry # | maximum frequency (BPM) | minimum beat period (seconds) | minimum frequency (BPM) | maximum beat period (seconds) |
|---|---|---|---|---|
| 1 | undefined | 0.0000 | 5168.0 | 0.0116 |
| 2 | 5168.0 | 0.0116 | 2584.0 | 0.0232 |
| 3 | 2584.0 | 0.0232 | 1722.7 | 0.0348 |
| . | . | . | . | . |
| . | . | . | . | . |
| . | . | . | . | . |
| 57 | 92.3 | 0.6502 | 90.7 | 0.6618 |
| 58 | 90.7 | 0.6618 | 89.1 | 0.6734 |
| 59 | 89.1 | 0.6734 | 87.6 | 0.6850 |
| . | . | . | . | . |
| . | . | . | . | . |
| . | . | . | . | . |

TABLE 1-continued

| buffer entry # | maximum frequency (BPM) | minimum beat period (seconds) | minimum frequency (BPM) | maximum beat period (seconds) |
|---|---|---|---|---|
| 90 | 58.1 | 1.0333 | 57.4 | 1.0449 |
| 91 | 57.4 | 1.0449 | 56.8 | 1.0565 |
| 92 | 56.8 | 1.0565 | 56.2 | 1.0681 |
| . | . | . | . | . |
| . | . | . | . | . |
| 175 | 29.7 | 2.0201 | 29.5 | 2.0317 |
| 176 | 29.5 | 2.0317 | 29.4 | 2.0434 |
| . | . | . | . | . |
| . | . | . | . | . |
| 255 | 20.3 | 2.9489 | 20.3 | 2.9606 |
| 256 | 20.3 | 2.9606 | 20.2 | 2.9722 |

In stage 30 of FIG. 4, the autocorrelation values are processed to identify the most prominent peaks of the autocorrelation function within a range of buffer entry numbers, preferably numbers 25 to 130. The preferable range selected covers the expected normal range of music fundamental beat frequencies between 50 and 200 BPM. The higher the autocorrelation value in these buffer entry numbers, the more likely that the corresponding time represents the fundamental beat period.

Specifically, to emphasize positive correlations, the autocorrelation values are first half-wave rectified. The maximum value and average noise value of the rectified autocorrelation values of the current buffer are determined. The autocorrelation values are examined for a positive change greater than the noise level to indicate the start of a peak. The data is examined to find the turnover point, that is, the largest buffer entry number whose autocorrelation value increases after start of peak. The buffer entry number and the autocorrelation value at the turnover point is logged. A threshold is applied to eliminate smaller peaks. In this embodiment, 20% of maximum peak value is the threshold.

Selecting only the highest peaks of the autocorrelation function for further analysis serves the purpose of decreasing the data that needs to be further analyzed, thus saving computational time. If limiting the computational time is not important in a particular application, then the threshold to eliminate smaller peaks need not be performed. Also an alternate peak-picking method could be employed rather than the specific one described above. The output of stage 30 is a set of 256 values corresponding to buffer entry numbers, of which all are zeroes, except those corresponding to buffer entry numbers of the identified autocorrelation peaks.

Next, in stage 36, the peak values from stage 30 are integrated and stored in corresponding "bins" of a dynamic and weighted histogram. The histogram has 256 bins, each corresponding to a buffer entry number. Integration is performed to increase the ability of the method to identify those beat frequencies that a human being would perceive while listening to the music as it progresses. Stage 36 does this by considering and recording not only that a particular beat frequency was present in the three seconds of music represented by the buffer, as indicated by the identified autocorrelation peaks of the buffer currently being processed, but by allowing those identified frequencies to affect the accumulated record of frequencies identified by autocorrelation peaks of previous buffers' data.

Specifically, if a beat frequency is present in the current buffer (as indicated by a non-zero autocorrelation peak value), the peak value is multiplied by an integration value and added to any value currently stored in the corresponding bin.

In stage 36, the bin value can thus increase over processing intervals of successive buffers, up to a maximum value of 1.0. On the other hand, if a beat frequency is not one of the highest autocorrelation peaks in the currently processed buffer, the corresponding value passed from stage 30 is zero, and then the integration value is subtracted from the corresponding bin value.

Figure 6:
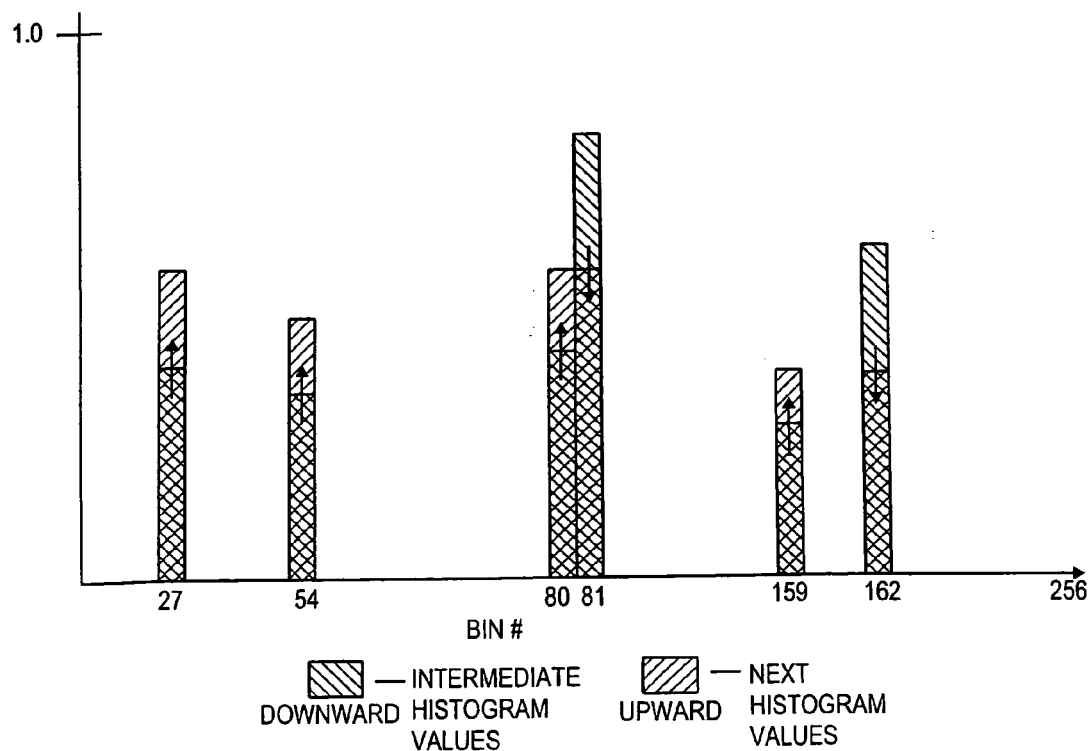
FIG. 6 is a sample histogram showing two successive results from the method of FIG. 4.

FIG. 6 shows a sample histogram and illustrates the effects of a shift in tempo. In this example, the tempo is increasing. Thus, whereas autocorrelation peaks had previously been present at frequencies corresponding to buffer entries 27, 54, 81, and 162, thus building the values in histogram bins 27, 54, 81, and 162, the autocorrelation peaks of several subsequent and the current buffers are present in frequencies corresponding to buffer entries 27, 54, 80, and 159. The values in the histogram bins 81, and 162 are thus decreased by the integration value and the values in the histogram bins 27, 54, 80, and 159 are increased by the most recent (non-zero) peak autocorrelation value multiplied by the integration value. Thus, the histogram of FIG. 6 differs from a standard running histogram that will only increase the value in any peak frequency bin by one count for each time a peak in the same autocorrelation bin number appears in the next buffer's data.

The integration value chosen controls how quickly the values in the bins for the detected beat frequencies in the histogram build and decay. Preferably, the integration value is 0.1. The integration value is an important variable and, combined with the low pass filters in stage 18 (preferably second-order Butterworth filters) after the DAUB4 wavelet analysis, determines the ability to track changes of tempo.

A particularly strongly-accented and recurring beat will produce a large magnitude peak in the autocorrelation function, and if it recurs with great regularity (i.e., appears in almost every buffer of processed data), the corresponding histogram bin value will build quickly to a maximum value of 1. If the musical signals to be analyzed will always have an extremely stable beat, then a "fast" value of 0.2 for the integration value is appropriate, because it will build and decay the histogram bin value faster. It should be noted that a normalized histogram (values between zero and one) is used solely for ease of processing and it is not necessary to set maximum values of 1.

Returning to FIG. 4, at stage 42, the mathematical technique known as a sliding window function is used to consolidate the values in adjacent bins for a subsequent peak detection function. Preferably the window function is a Hamming window function. However, those skilled in the art will recognize the particular benefits and applications for other window functions, for example, Blackman, Barlett, Kaiser, Hanning, or Triangular. The window function serves to capture the effects of the bins in the middle of the window, but to stop the effects of values in bins at the edges, or in other words, to prevent "leakage."

This way, if the tempo is changing, the shift in prevalent frequencies will not mask the peak beat frequencies due to two adjacent bins having similar magnitudes. Since the peak-picking operation in stage 30 operates by moving from left to right in the autocorrelation data, use of the sliding window function will particularly assist in identifying the beat frequencies if the tempo is increasing, because the peaks will shift to the left in the autocorrelation function as the beat periods become shorter and therefore will not be selected as a candidate for predominant beat frequency until its value in the histogram rises above the previous peak frequency, which, even though it is decaying, will still have significant magnitude.

Referring back to FIG. 6, when the histogram values have the upward-hatched values, bins 80 and 81 have the same value. Therefore, without the window function, bin 81 would be the turnover bin. Yet the peaks in the buffer no longer are present at bin 81, but rather at bin 80. Thus the frequency corresponding to bin 80 should be considered as a candidate frequency and not the frequency corresponding to bin 81.

In stage 48 (FIG. 4), the resulting histogram produced by the window function is examined and the peaks (local maximum amplitude bin values) are identified, preferably the six highest. The peak picking method of stage 30 may be used, but this is not necessary. The number of peaks chosen also is not critical. However, because the fundamental beat frequency has relationships with other prevalent beat frequencies present, more than one peak should be chosen. At this point, the beat frequencies corresponding to the selected peaks are candidates for the fundamental beat frequency. The selected peak bin numbers and values are then used to form a harmonicity matrix at stage 55.

Figure 1:
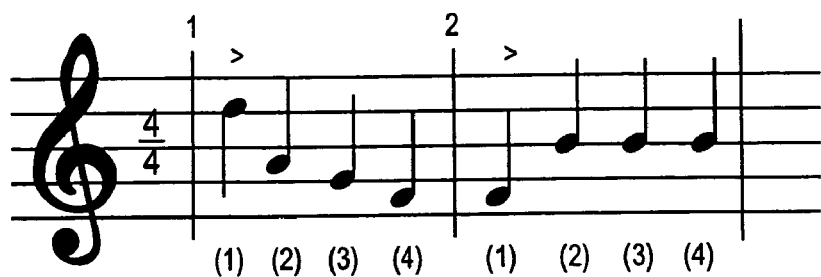
FIG. 1 shows standard musical notation of two measures of a simple music composition in four-four time.
Figure 2:
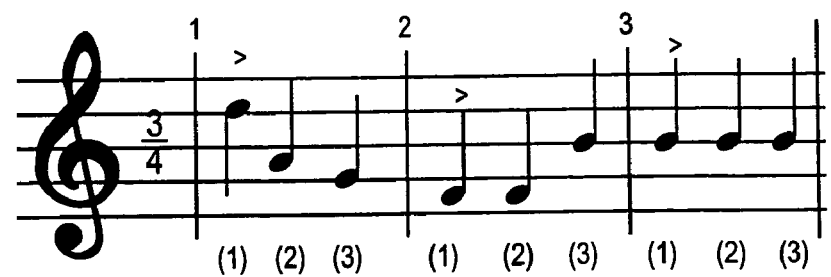
FIG. 2 shows standard musical notation of three measures of a simple music composition in three-four time.
Figure 3:
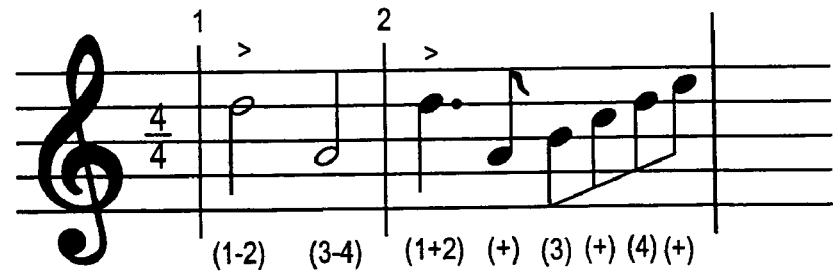
FIG. 3 shows standard musical notation of two measures of a second simple music composition in four-four time.

With reference back to FIG. 1, the accented beat (beat 1, indicated by the ">") recurs at a frequency, X. Beats 1 and 3 of each measure recur at frequency 2X. Beats 1 and 2 of each measure recur at frequency 4X. The mathematical relationships between them may be expressed by the term "harmonic," a term which is also used in relation to pitch. Although the accented beat frequency X is too low to be audible, it does have harmonic relationships with the other prevalent beat frequencies.

True harmonics, of course, consist of only whole integer multiples of a frequency. However, because the beat frequencies corresponding to the histogram bins each actually represent a range of beat frequencies (the beat periodicity value has an uncertainty of 11.6 ms), and because the exact time period between beats may be shortened or lengthened in a performance of a musical composition, methods consistent with the invention consider candidate beat frequencies to be harmonics of each other even when the ratio of such beat frequencies is not a precise integer.

In stage 55 (FIG. 4), a harmonicity matrix is constructed. Specifically, the harmonic relationships between beat frequencies of the six peaks of the histogram of FIG. 6, ordered from highest to lowest beat frequency, are determined and entered into a matrix. These beat frequencies F1 through F6 are candidates for the fundamental beat frequency.

FIG. 7a illustrates the six beat frequencies F1 through F6, where F1>F2>F3>F4>F5>F6. The first column at the left of FIG. 7a contains bin numbers corresponding to the beat frequency and the third column contains the values stored in the corresponding histogram bins, represented by RA1 through RA6. Each of the frequencies F1-F6 could represent any of the beat frequencies in the range of beat frequencies corresponding to a specific bin number, for example, the maximum beat frequency of each bin number, the minimum beat frequency, or the center beat frequency. In this example, we will use the center beat frequency.

Next, the harmonic relationships between the candidate beat frequencies are found. FIG. 7a illustrates the mathematical formulas represented by each cell of the matrix. Although FIG. 7a indicates that ratios of beat frequencies are entered into cells of the matrix, the actual matrix entries are not always equal to exact ratios. Rather, each entry is the whole integer (greater than one) nearest to the exact ratio, if the actual ratio is within a deviation value of that nearest whole integer. In this embodiment the deviation value is 7.5%.

If the exact calculated ratio between candidate beat frequencies is not within 7.5% of an exact integer, then no harmonic relationship between the two candidate beat frequencies is found, and a zero is thus entered into the corresponding cell of the matrix. On the other hand, if the calculated ratio is within 7.5% of an integer, then that integer is entered into the matrix, representing the harmonic relationship between the two candidate beat frequencies. Stage 61 (FIG. 4) uses the harmonic relationships between candidate beat frequencies and their relative amplitudes (values from the peak bin numbers passed to stage 61 from stage 55) of the candidate frequencies to select a fundamental beat frequency.

When the harmonicity matrix is completed, it is used by stage 61 to determine the fundamental beat frequency. Preferably, the fundamental beat frequency is determined as follows. The matrix shows the harmonic structure of the candidate beat frequencies in the selected bins. For example, the top row of the matrix of FIG. 7b corresponds to bin 26, representing candidate beat frequency F1 of 202.8 BPM, and contains the numbers 1, 2, 3, and 6. This indicates that this candidate beat frequency, F1, constitutes the first, second, third, and sixth harmonic of candidate beat frequencies contained in the music represented by this set of histogram values, but the frequencies of which it is the fourth and sixth harmonic are missing. Therefore, the harmonic structure is non-contiguous and is considered to be ambiguous with respect to candidate beat frequency F1. Non-ambiguous harmonic structure means, in other words, no missing harmonics.

The second row of the matrix represents candidate beat frequency F2. This row contains a 1 and a 3. Thus, candidate beat frequency F2 constitutes the first and third, but not the second harmonic of candidate beat frequencies contained in the music represented by this set of histogram values. Thus the harmonic structure of F2 is also ambiguous.

The third row represents candidate beat frequency F3 and contains a 1 and a 2, indicating first and second harmonics. Since 1 and 2 are contiguous, candidate beat frequency F3 has contiguous harmonics and is considered to have a non-ambiguous harmonic structure. The fourth row for candidate beat frequency F4, contains only a 1. The harmonic structure of F4 is also considered to be non-ambiguous. Thus the candidates for the fundamental beat frequency are narrowed to frequencies F3 and F4, that is, those that have non-ambiguous harmonic structures. Stage 61 then selects the candidate beat frequency with the largest relative amplitude and a non-ambiguous harmonic structure as the fundamental beat frequency.

In FIG. 7b, candidate beat frequency F3, bin 80, has the largest relative amplitude (1.00) and a non-ambiguous harmonic structure. Since each bin actually represents a range of frequencies, the fundamental beat frequency for this example is between 64.6 and 65.4 BPM.

In an alternative embodiment, the resolution of the selected fundamental beat frequency may be improved by multiplying the frequency range of the highest bin number in the harmonic structure of the fundamental beat frequency by the harmonic number of the fundamental beat frequency. In FIG. 7b, the highest bin number in the harmonic structure of the fundamental beat frequency is bin number 159. Its corresponding frequency range is 32.5 to 32.7 BPM. Multiplying this frequency range by the harmonic number of the selected fundamental beat frequency (i.e., 2) yields 65.0-65.4 BPM, a better resolution of the fundamental beat frequency than 64.6-65.4 BPM, which is the frequency range of bin 80. This fundamental beat frequency range of 65.0-65.4 is the output of stage 61 in the embodiment.

Optionally, the relative strength of each beat, as measured as the sum of the relative amplitudes (RA) of all found harmonics may also be calculated. This can be useful as a classification tool for database searches, e.g., "search for all dance music" would select a certain range of BPM and a strength of beat exceeding a desired level.

As shown in FIG. 4, this process returns to stage 24 and repeats for each 256-summation value buffer, until all buffers of signal 15 have been processed. The method thus creates a series of fundamental beat frequency values.

Figure 8:
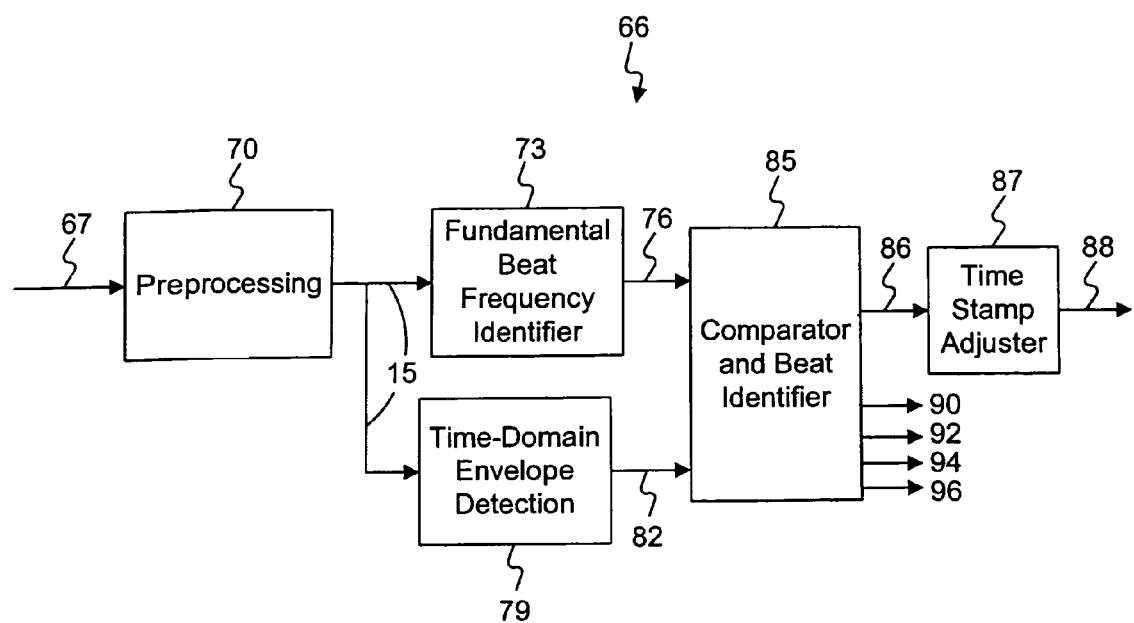
FIG. 8 is a block diagram of a beat analyzer consistent with the invention for identifying the onset time and amplitude of beats corresponding to a fundamental beat frequency of a music signal.

Illustrated in FIG. 8 is a beat analyzer 66 consistent with the invention. Here, a music signal 67, which may have any number of channels and any sampling rate, is converted by a pre-processor 70 to a mono-channel music signal 15, preferably sampled at 22.05 kHz. Signal 15 is processed by a fundamental beat frequency identifier 73, which may execute the method described above to produce a signal 76 consisting of a series of fundamental beat frequency values for successive time intervals of music signal 67.

Signal 15 is also processed by a time domain envelope peak detector 79 to produce a fast-attack, slow-release peak time-domain envelope signal 82. The fast-attack, slow-release peak detector 79 accurately detects amplitude peaks, but does not have the intelligence to know which peaks correspond to the fundamental beats. The time constants used in this embodiment of detector 79 are zero for attack and 0.75 seconds for release, but this is not critical.

Fundamental beat frequency signal 76 and envelope signal 82 are supplied to a comparator and beat identifier 85. Comparator and beat identifier 85 employs a phase-locked loop to select the peaks in envelope signal 82 which correspond to beats corresponding to fundamental beat frequency values of signal 76. Specifically, a time delay compensator is used in comparator and beat identifier 85 to align envelope signal 82 with time periods based on fundamental beat frequency values specified by signal 76, since it takes more time for signal 15 to be processed by fundamental beat frequency identifier 73 than detector 79. Comparator and beat identifier 85 selects only the maximum peaks of envelope signal 82 that are within time periods based on fundamental beat frequency values of signal 76, thus removing non-relevant peaks from consideration as beats corresponding to fundamental beat frequency values of signal 76.

Figure 9:
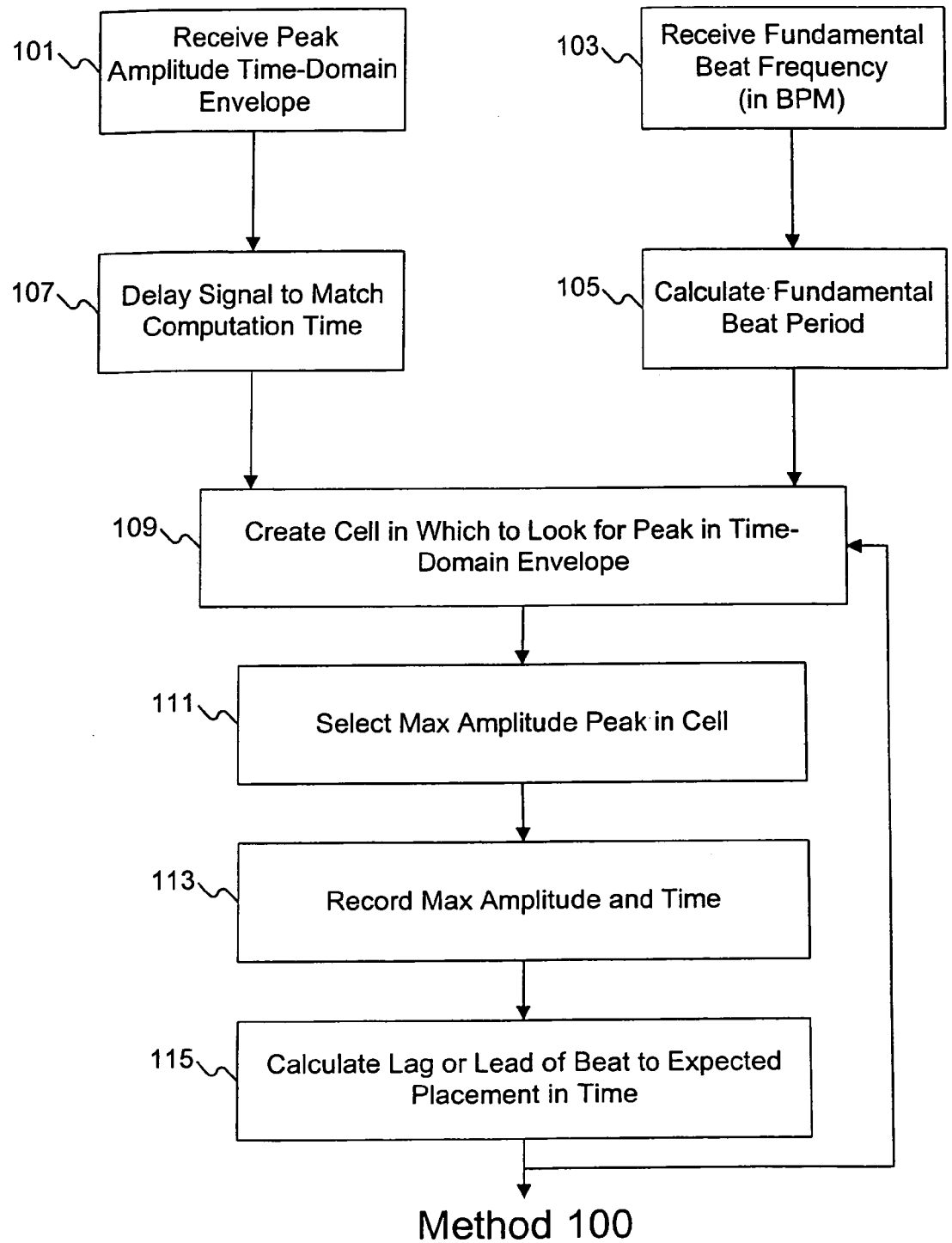
FIG. 9 is a flow diagram of a method consistent with the invention for identifying the time of occurrence and amplitudes of peaks in a time domain envelope signal which correspond to a fundamental beat frequency of a music signal.

FIG. 9 illustrates a method 100 for identifying fundamental beat onset times and amplitudes of music signal 15, by which comparator and beat identifier 85 may operate. Method 100 receives envelope signal 82 in stage 101, and fundamental beat frequency signal 76 in stage 103. In stage 105, method 100 repeatedly calculates a fundamental beat period, which is proportional to the inverse of current received fundamental beat frequency values of signal 76. The proportion depends on the time units in which fundamental beat frequency 76 is expressed and the desired time units of the fundamental beat period. In stage 107, envelope signal 82 is delayed to compensate for the length of time it takes to receive signal 76 and calculate the fundamental beat period of each fundamental beat frequency value of signal 76. Stages 101/107 and 103/105 may proceed sequentially or in parallel.

Figure 10A:
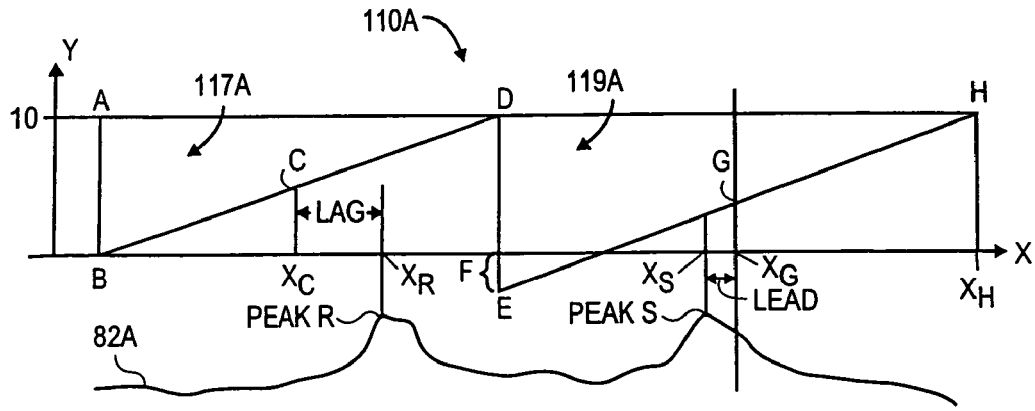
FIGS. 10a-c are example cell grids constructed in relation to sample time domain envelope signals in connection with the method of FIG. 9.
Figure 10B:
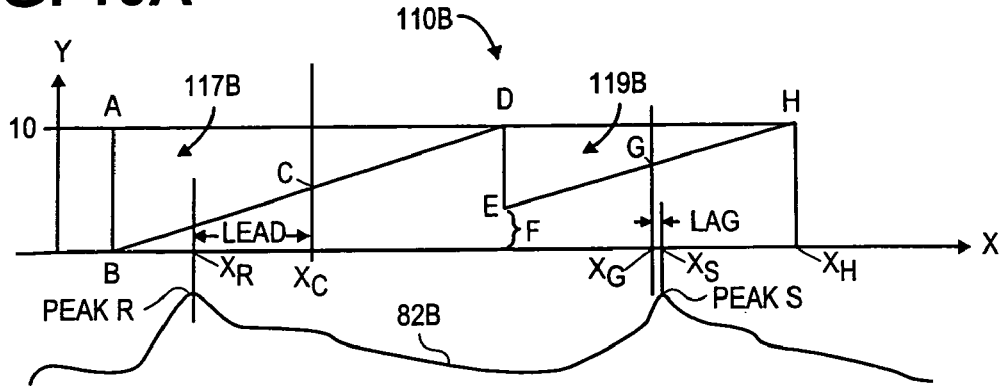
Figure 10C:
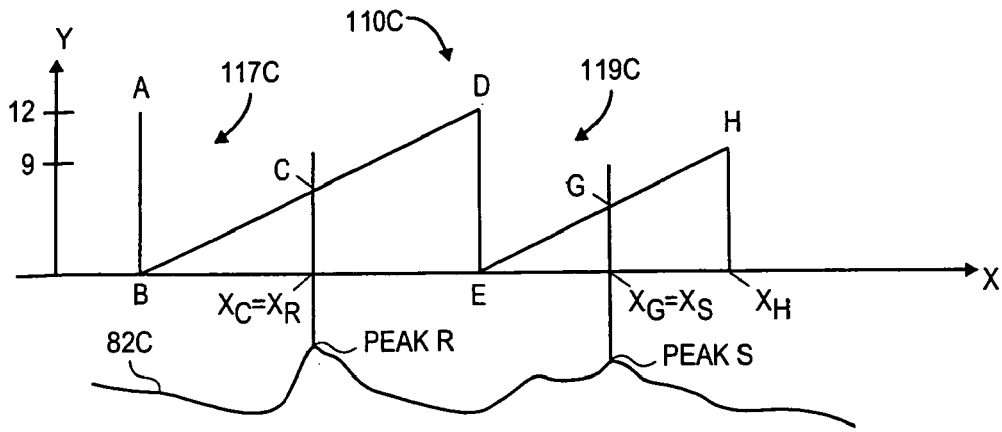

Stage 109 selects a portion of envelope signal 82 corresponding to a "cell" or period of time in which to search for peaks corresponding to the fundamental beat frequency. In general, it may construct a grid of cells based on fundamental beat periods, as shown in FIGS. 10a-10c. Each cell length is initially approximately equal to the actual fundamental beat period, because the fundamental beat frequency value received in stage 103 is only an estimate (picked from the range of frequencies present in each "frequency bin" as illustrated in Table 1) and because the positively sloped line is created by a series of small steps, which are dependent on the sampling rate, the maximum Y value and corresponding end X value of each cell will have a small error of 2 to 3%. Each cell may be constructed in real time (at the same time envelope signal 82 is received) to place the middle of the cell over the expected beat onset. This makes it easier to select peaks corresponding to beat onsets, for if the edge of the cell were to occur where the peak was expected, two peaks might appear in the cell, or none. The middle of the cell indicates the expected placement in time of the maximum peak (beat onset) in envelope signal 82.

However, the maximum peak in each cell may not occur exactly at the expected time. Because each cell is based on the fundamental beat period, no matter where the maximum peak is within the current cell of the cell grid, it is selected in stage 111 and the elapsed time and amplitude are recorded in stage 113. If the maximum peak in the first cell did not occur at the expected time within a cell, then the difference in time between the expected time and the maximum peak is calculated in stage 115. If the maximum peak occurred before the expected time, the difference is described as a lead time, i.e., the actual beat onset leads the expected placement and the actual beat period is shorter than the calculated fundamental beat period. On the other hand, if the maximum peak occurred after the expected time, the difference is described as a lag time, i.e., the actual beat onset lags the expected placement and the actual beat period is longer than the calculated fundamental beat period.

Method 100 uses the lead or lag time as an error signal to calculate the length of the next cell in which to look for a peak in envelope signal 82 corresponding to the fundamental beat frequency. FIGS. 10a, b, and c illustrate a manner in which stages 109-113 may operate. In each of FIGS. 10a-c, envelope signal 82 is shown in relation to a cell grid 110 constructed on an x-axis representing time. The y-axis is unitless, but is proportional to the fundamental beat period as expressed minutes. Cell grid 110 is composed of vertical line-segments and positively-sloped line segments, such as AB, BD, DE, EH, and HI. The slope of each positively-sloped line segment is equal to a multiple of the fundamental beat frequency. It is not critical which multiple is selected. However, the selected multiple determines the y-value of point A.

In FIGS. 10a-c, the first cell 117, composed of vertical line segment AB and positively sloped line segment BD, is constructed such that the peak is expected to occur at the midpoint of segment BD, point C, at time Xc. Point B and point E are a fundamental beat period apart, thus Xc is one-half a fundamental beat period further in time than point B. A peak in envelope signal 82, which corresponds to a beat onset of a beat in the music of signal 67, is expected at time Xc. Envelope signal 82 is examined and the maximum peak between points B and E is selected in stage 111. The maximum peak between points B and E is peak R. The time and amplitude of peak R from time envelope signal 82 is recorded in stage 113. Then, in stage 115, the difference in time between the expected time, Xc and the actual time, Xr, is calculated. In FIG. 10a, because peak R came later than expected, the difference is a lag time.

The difference in time is used by stage 109 to adjust the expected time of the next peak. The preferred method of adjustment follows. The difference is compared to a deviation value equal to a predetermined fraction of the length in time of the cell. Preferably, the fraction is one sixth. If the absolute value of the difference is less than or equal to the deviation value, then no change is made to the next cell's length and the next sloped line segment restarts at zero on the y axis. If the absolute value of the difference is greater than the deviation value, then stage 109 adjusts the next cell's length. If, as in FIG. 10a, the difference is a lag time then the next cell is lengthened by a predetermined fraction. If, as in FIG. 10b, the difference is a lead time then the next cell is shortened by a predetermined fraction. This is accomplished on cell grid 110 by either extending the vertical line-segment downward by a percentage of the maximum Y value, F, for a lag situation as illustrated in FIG. 10a, or shortening the vertical segment DE by the same percentage of the maximum Y value, F, for a lead situation as illustrated in FIG. 10b. Positively-sloped segment EH begins to build wherever vertical segment DE ends and continues until it reaches the maximum Y-value associated with the current fundamental beat frequency, 10, in each of FIGS. 10a and b. If the fundamental beat period as calculated in stage 105 remains the same, then the maximum value of y in each sloped line-segment always remains the same, but the minimum value of y in each cell may change.

This method of adjustment will reduce the number of incorrect peaks that are selected as peaks corresponding to beat onsets of the fundamental beat frequency from a method of no adjustment. The predetermined percentage is called the slew rate. The greater the slew rate (for FIGS. 10a-10c), the faster the cell length can react to correct for peaks not near the expected time, but the greater chance that a "false" peak will throw off the rest of the cells, destabilizing the cell length. The lesser the slew rate, the slower the cell length can react to correct for peaks not near the expected time, but the cell length will be more stable. Preferably the slew rate is 15 percent. Other percentages could be used. Alternate methods of adjustment could also be used.

As illustrated in FIG. 10c, if the fundamental beat frequency value of signal 76 as calculated by identifier 73 changes, the maximum y-value attained will either be greater (for smaller fundamental beat frequencies) or lesser (for greater fundamental beat frequencies). Specifically, in FIG. 10c, the fundamental beat frequency in cell 117c is 60 BPM, and for cell 119c, it is 80. Because the slope of segments BD and EH remains the same (12×60=720), the maximum Y-value attained in cell 119c is 9, where as it was 12 in cell 117c.

Returning to FIG. 10a, cell 119a is longer than cell 117a, as a result of the lag between Xr and Xc being more than one-sixth of the length of cell 117a. Point G is the midpoint of segment EH and its x value, Xg, marks the expected placement in time of the next peak corresponding to a beat onset. The maximum peak between Xe and Xh is peak S, which leads Xg, but only by an amount less than one-sixth of the length of cell 119a. Therefore no adjustment is made to the length of the next cell. The process repeats.

In FIG. 10b, peak R leads Xc in cell 117b. The adjustment for the lead shortens segment DE by F, and moves Xg up in time (to the left) in cell 119b. Peak S, the next selected peak, lags the adjusted expected time, Xg, but is again within one-sixth of the length of cell 119b and no adjustment of the next cell length is needed.

In FIG. 10c, peak R coincides in time with midpoint Xc, thus no adjustment to the length of cell 119c is needed. However, the fundamental beat frequency identifier 73 determined a change in fundamental beat frequency 76 from 60 to 80 (this is for example only), and thus cell 119c is shorter than cell 117c. However, peak S coincides with midpoint Xg, so, again, no adjustment to the next cell length is needed.

Returning to FIG. 8, comparator and beat identifier 85 produces several outputs. The first is a series of time values 86 from each of the selected peaks in envelope signal 82. A final stage 87 generates a time-stamp for each of the time values 86, adjusting for the processing delay and time delay compensation in comparator and beat identifier 85. The series of time-stamps corresponds to the beat onset times of signal 67 and is called the tempo grid 88. A second output is the series of amplitudes corresponding to the signal strengths 90 from each of the selected peaks in envelope signal 82.

Several outputs in addition to the series of beat onset times 88 and signal strengths 90 of the beats in the music signal 67 may be provided. These additional outputs may include: a numeric indication 92 of the current fundamental beat frequency in the range 50 to 200 BPM; a beat graph 94, which is a graphical indication of the relative strength of each beat, i.e., an indication of the overall strength of the beat as the material progresses; a beat per minute graph 96, which is a graphical indication of the BPM. BPM graph 96 could be superimposed on a video screen as an aid to karaoke singers. Each of these outputs has values during operation of method 100, i.e., they may be created in real time, not only after the entire envelope signal 82 has been processed.

It should be noted that the above described embodiments may be implemented in software or hardware or a combination of the two.

Figure 11:
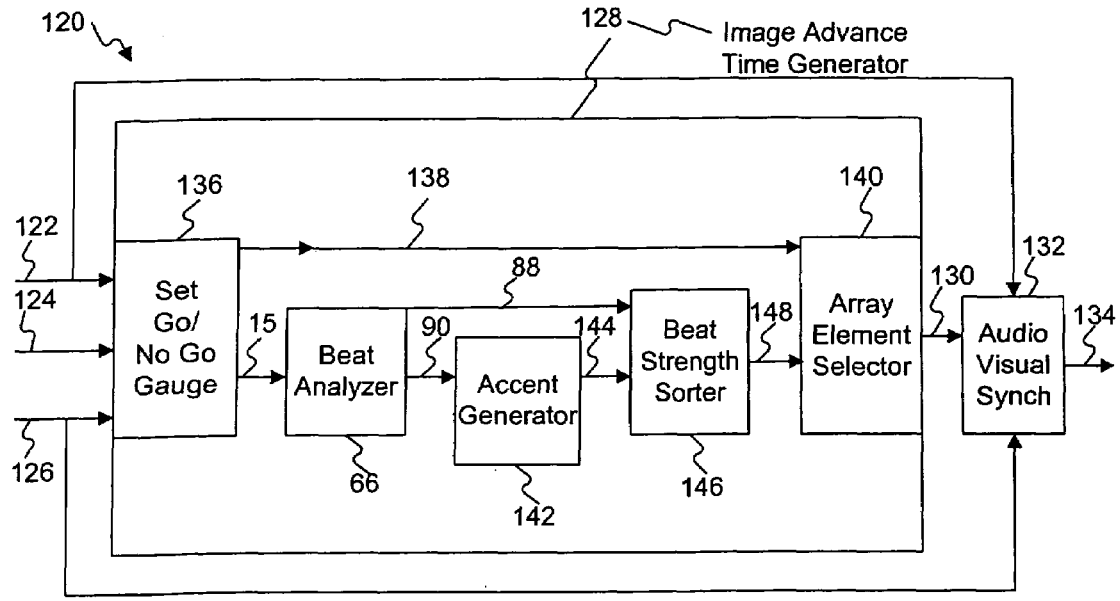
FIG. 11 is a block diagram of a still image advance synchronizer consistent with the invention.

In another embodiment consistent with the invention, the data produced by beat analyzer 66 is used by an automatic slideshow synchronizer 120, illustrated in FIG. 11, that automatically generates signals to display still images synchronized to music. In FIG. 11, automatic slideshow synchronizer 120 receives a set of still images 122, a user-entered minimum display period per image ("MDP") 124, and a music signal 67 as inputs to an image advance time generator 128. MDP 124 is the minimum amount of time that the user wishes any single image to be displayed. However, in applications where the slide show will be saved to a DVD, the MDP preferably is no less than 1.0 second. Image advance time generator 128 produces an array of beat elements 130, each of which specifies the time at which the next still image in set 122 should be displayed to synchronize the image change with the onset of a predominant beat in music signal 126. An audiovisual synchronizer 132 generates an audiovisual signal 134 from inputs 122, 67, and 130, which comprises an electronically-timed slide-show such that the still images of signal 122 advance in synchronization to predominant beats of music 67.

As illustrated in FIG. 11, image advance time generator 128 comprises a set go/no-go gauge 136. Gauge 136 supplies a signal 138, specifying a workable number of images to be displayed, to an array element selector 140. Gauge 136 also supplies a signal 15, comprising a workable set of music data, to beat analyzer 66. Beat analyzer 66 may function as described in the previous embodiment and passes a set of beat onset times 88 to a beat strength sorter 146 and a set of corresponding beat amplitudes 90 to an accent generator 142. Accent generator 142 normalizes amplitudes 90 and passes the resulting set of accent values 144 to beat strength sorter 146. Beat strength sorter 146 creates an array of beat elements, each comprising a beat onset time and its corresponding accent value. This array is then sorted by accent value and the resulting array 148 of beat elements, ordered by strongest accent value (1.00) to weakest, is passed to an array element selector 140. Array element selector 140 selects beat elements from array 148. These selected beat elements, which contain beat onset times on which to change a displayed image, are then reordered by increasing beat onset times, creating an array 130.

Synchronizer 132 creates a signal 134 which synchronizes the start of music signal 67 and a clock from which pulses to change the image displayed are generated according to array 130 of beat onset times. The output 134 is a synchronized slide-show, which changes the images displayed 122 on beat onsets of music signal 67.

Figure 12:
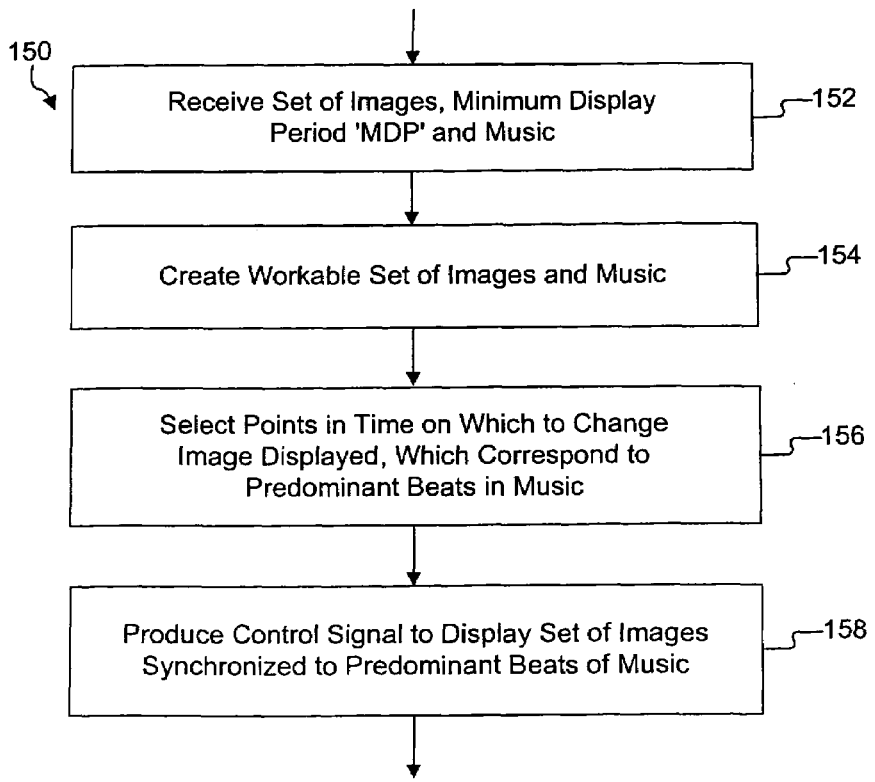
FIG. 12 is a flow diagram of a method consistent with the invention for generating a synchronized signal to advance still images on predominant beats of accompanying music.

FIG. 12 illustrates overall stages in a method 150 for automatically generating an electronic slide show consistent with the invention, performed by the apparatus described above. Method 150 begins by receiving a set of images, a minimum display period MDP, and a set of music data in stage 152. A workable set of images and music data is created in stage 154, such that the average period of time that each image of the workable set will be displayed, during the amount of time required for playback of the music data, is at least equal to an MDP. In stage 156, elapsed time values at which to change the displayed image are selected, the selected times corresponding to onset times of predominant beats in the set of workable music data. Finally, a control signal is produced in stage 158 to advance the display of images within the set of images, synchronized to predominant beats of the music data.

Figure 13:
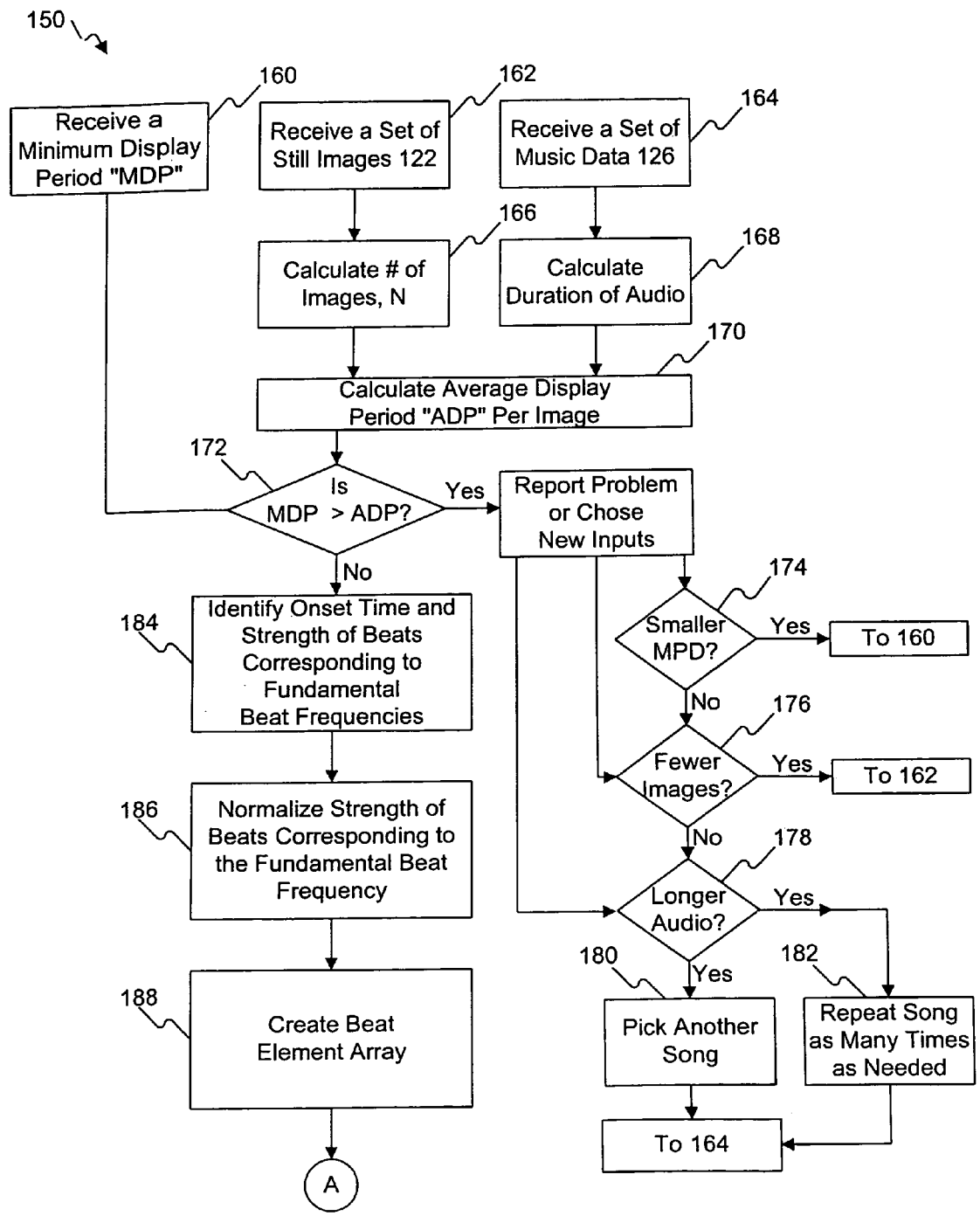
FIG. 13 is a more detailed flow diagram of a preferred embodiment of the method of FIG. 12.
Figure 13:
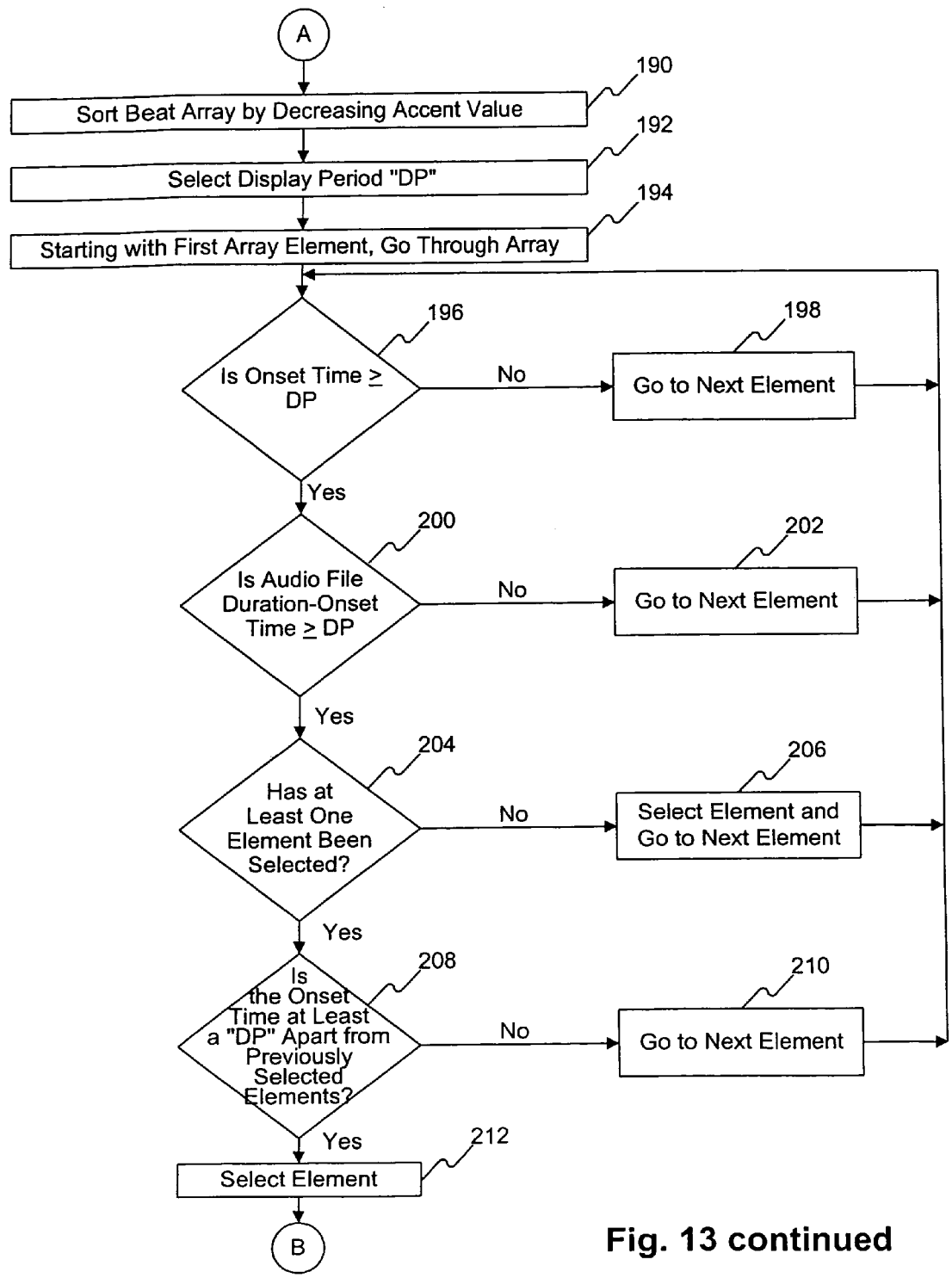
Figure 13:
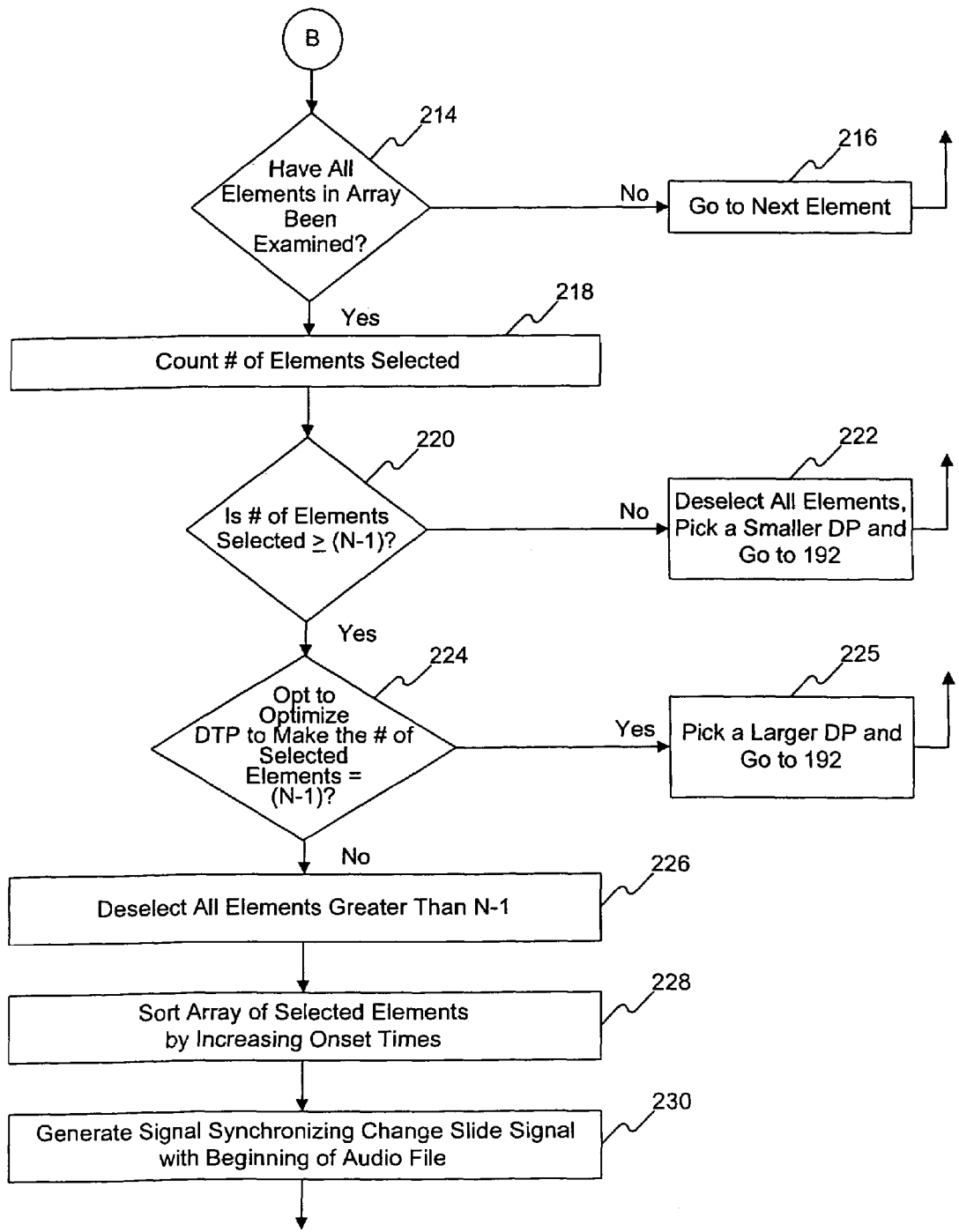

FIG. 13 illustrates detailed stages of one embodiment of method 150. Stages 160 through 164 of FIG. 13 correspond to stage 152 of FIG. 12. In stage 160, method 150 receives a minimum display period "MDP." In stage 162, method 150 receives data comprising a set of still images to display, and in stage 164, method 150 receives a set of music data.

Stages 166 through 182 of FIG. 13 correspond to stage 154 of FIG. 12. The user has specified that each image should be displayed for at least the MDP received in stage 160. The number of images N in the set is determined in stage 166 and the total duration of set 126 of music data is calculated in stage 168. An average display period ("ADP") per image may be calculated in stage 170. Stage 172 checks to see if the MDP received is greater than the ADP. If so, the user is prompted to adjust one or more of the inputs to stage 152. For example, the user may decrease minimum display period 124 so that it is equal to or less than the ADP as indicated in stage 174; select fewer images, as indicated in stage 176; or supply a longer music data set, as indicated in stage 178. A longer music data set may comprise a totally new, longer set of music data or may constitute permission to repeat the original music data set as many times as necessary to have an ADP at least equal to the MDP and show all still images. Options for each may be given to the user of the program, or an error message reporting the problem may be display on a user-interface. Stages 160 through 182 are repeated until the answer to stage 172 is "NO." At this point, the inputs of stage 152 are determined to constitute a workable set of music data and images.

Stages 184 through 228 of FIG. 13 correspond to stage 156 of FIG. 12. In stage 184, a method, such as method 100 of FIG. 9, is used to identify the onset time and signal strength (amplitude) of beats corresponding to fundamental beat frequencies of the music data. Stage 186 normalizes the signal strength of each beat, producing an accent value between 1.0 and 0.0. In stage 188, the onset times and corresponding accents values are arranged to form members of each at least two-member element of a beat element array. In stage 190, the array elements are sorted by decreasing accent value.

A display period, "DP," having a value between the ADP and the MDP is generated according to predetermined rules in stage 192. Preferably, the DP is closer to the ADP than the MDP. The DP may be picked as an arbitrary percentage of the ADP, as long as it is greater than the MDP. Preferably, that percentage is 80. The method may also provide for tracking any previously generated DP, so as to allow iteration and optimization.

Next, those beat elements whose onset times are (1) at least equal to the DP, (2) at least a DP less than the time of the end of the music file, and (3) spaced at least a DP apart from every other selected beat element are retained. One selection and retention method is illustrated by stages 194 through 214 of FIG. 13. In stage 194, the onset time of the first element of the beat element array (that is, the element having the highest accent value) is examined. In stage 196, it is compared with the DP. If it is at least equal to the DP, then the method advances to stage 200. If not, the next element in the array is examined in stage 198 and the onset time of that element is compared with the DP in stage 196 again. This cycle repeats until an element is found whose onset time is at least equal to the DP and the method advances to stage 200.

In stage 200, the difference between the duration of the music data and the onset time of the element is compared to the DP. If it is at least equal, then the method advances to stage 204. Otherwise the next element in the beat element array is examined in stage 202 and the onset time of that element compared to the DP in stage 196.

Stage 204 checks to see if at least one element has been selected. If not, then the element is selected and the next element is examined in stage 206 and its onset time is compared to the DP in stage 196. If at least one element has already been selected at stage 204, then the onset time of the element currently being examined is compared to the onset time of all of the previously selected elements in stage 208. If it is at least a DP apart from the onset times of each of the previously selected elements, then the element currently being examined is selected in stage 212. If not, then the next element of the array is examined in stage 210 and its onset time is compared to the DP in stage 196. Stage 214 determines if all elements in the array have been examined. If not, the next element is examined in stage 216 and its onset time is compared to the DP in stage 196.

When all elements have been examined as determined in stage 214, the method proceeds to stage 218, where the selected elements are counted. In stage 220 that count is compared to one less than the number of images in the set "N−1." If N−1 is not less than or equal to the count, then stage 222 deselects all elements, selects a new DP, smaller than the last DP, and the method returns to stage 194.

In an alternative embodiment of stages 194-216, the method includes first selecting all beat elements of array 148 whose onset times are at least a DP from the beginning of the music data and the end of the music data and then comparing them to each other and keeping only those that are spaced apart by at least a DP. Then the number of selected beat elements are compared to the number of images to be displayed. If fewer elements have been selected than images to be displayed, then a new DP, closer to the MDP than the last chosen DP is selected, all onset times are deselected, and the method begins at the top of the array and onset times are selected according to the above procedure.

Another way to select beat elements is to compare the running number of elements selected each time an element is selected at stage 212 and to stop once the number is equal to the desired number preferably N−1. This removes the need for deselecting the selected elements, and reduces time in reaching a set of elements with which to work.

If N−1 is less than or equal to the count, then in stage 224 an optional optimization of the DP may be offered to make the number of selected elements equal to N−1. If an optimization is desired, then stage 225 deselects all elements, selects a new DP, larger than the last, and the method returns to stage 194. If an optimization is not desired, either because the count equals the desired number, N−1, or because the period of time each image is displayed does not have to be approximately the same, stage 226 retains only the N−1 elements with strongest accents and deselects the remainder.

Stage 228 may then sort the set of selected elements by onset time and create an array of chronological beat elements. In stage 230, the chronological beat element array is used to produce a signal to advance the still image displayed and a signal to synchronize the image advance signal with the beginning of the music data, such that all still images in the set will be sequentially displayed for at least the MDP during the duration of the music data.

This new array that provides chronologically ordered times for display initiation of each "slide" may be used, for example, in a software application that creates electronic presentations of video still images synchronized with audio. Such an electronic presentation may be displayed on a computer monitor, burned to optical media in a variety of formats for display on a DVD player, or provided by other methods of output and display.

Another embodiment consistent with the invention is an application which will automatically order and, if necessary, edit a motion video signal to generate a multimedia signal in which significant changes in video content, such as scene breaks or other highly visible changes, occur on the predominant beats in music content. The output provides variation of the video synchronized to the music.

Figure 14:
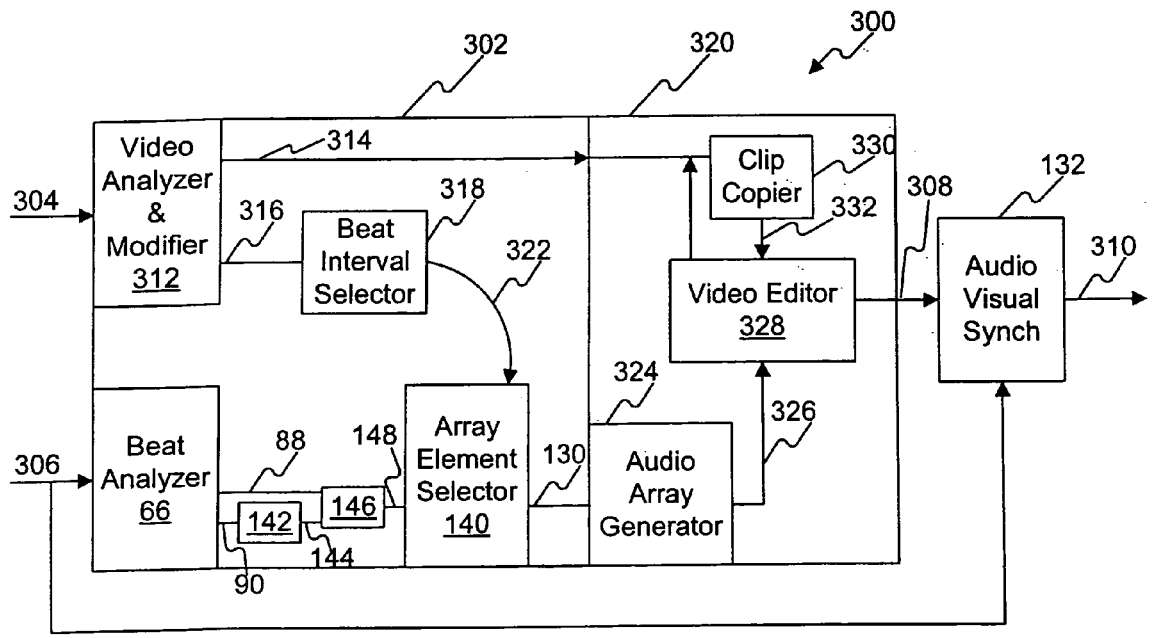
FIG. 14 is block diagram of a music video generator consistent with the invention.

FIG. 14 illustrates a music video generator 300 consistent with the invention. Music video generator 300 comprises a music and video processor 302 which accepts a video signal input 304 and a music signal input 306. Music and video processor 302 supplies a video clip signal 314 and an array 130 of selected beat elements to music and video processor 320, which produces a set of video clips 308, which is synchronized with music signal 306 by audio visual synchronizer 132 to produce a multimedia signal 310 comprising a music video.

Music and video processor 302 comprises a video analyzer and modifier 312 which produces a video clip signal 314 and a video clip duration signal 316. A beat interval selector 318 uses video clip duration signal 316 to select a beat interval 322, which it passes to array element selector 140, previous described. A beat interval is defined as the desired duration of time between selected predominant beats for playing contiguous video content.

Music and video processor 302 also comprises a beat analyzer 66, which provides a set of time-stamps 88 of the fundamental beat onsets of music signal 306 and a set of corresponding beat amplitude values 90. As described in the previous embodiment, accent generator 142 receives amplitude values 90 and creates a set of accent values 144. As previously described, beat strength sorter 146 uses time-stamps 88 and accent values 144 to produce an array of beat elements 148, previously described. Array element selector 140, also previously described, uses beat element array 148, and beat interval 322 to produce an array of selected beat elements, whose beat onset times are each approximately a beat interval 322 apart from each other.

A video clip play order selector 320 comprises an audio duration array generator 324, a video editor 328, and a clip copier 330. Video clip play order selector 320 uses video clip signal 314 and array 130 of selected beat elements from music and audio processor 302 to produce a video output signal 308, comprising an ordered set of motion video clips which change content at intervals approximately equal to beat interval 322. Signals 308 and 306 are supplied to synchronizer 132, which combines signal 308 with music signal 306 to produce a multimedia signal 310 forming a music video.

If the duration of video signal 304 is unequal to the duration of music signal 306, music video generator 300 produces multimedia music video signal 310 by one of two approaches.

When the duration of video signal 304 is greater than that of music signal 306, video content can be omitted. On the other hand, when the duration of video signal 304 is less than that of music signal 306, at least a portion of video signal 304 may be repeated. Regardless which approach is used, multimedia music video signal 310 comprises edited video clips of video signal 304, wherein each edited video clip changes on a selected subset of the beats corresponding to the fundamental beat frequency of music signal 306.

Figure 15:
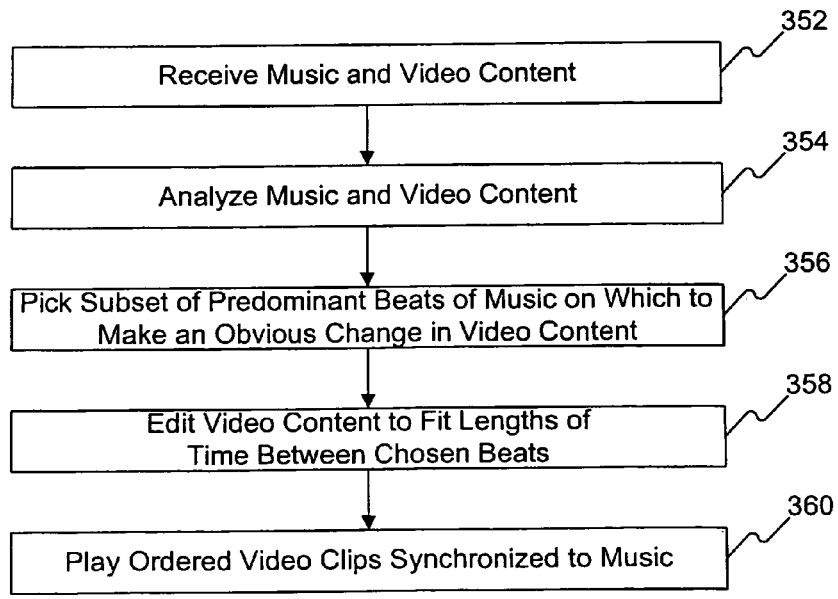
FIG. 15 is a flow diagram of a method consistent with the invention for generating a music video.

FIG. 15 illustrates a method 350 for generating a music video, by which music video generator 300 may operate. In stage 352, the method receives music and video content. In stage 354, it analyzes the music and video content to determine a set of predominant beats and video clips, respectively. In stage 356, the method selects a subset of predominant beats of music signal 306 on which to make significant changes in video content. In stage 358 it edits video content to fit the lengths of time between the selected beats. In stage 360 it generates a multimedia signal comprising the edited video clips synchronized to the music.

Considering method 350 in greater detail, in stage 354, the method preferably detects significant changes, comprising highly visible changes such as scene breaks present in video content input 304. These changes may be detected by a standard video scene detection process, as is well known to those skilled in the art. Stage 354 preferably creates separate video clips, each bracketed by a significant change. Alternately if video signal 304 is one long video clip, it may just be subdivided into a number of smaller video clips regardless of the placement of any highly visible changes within the clip. The method of subdivision may take the overall duration of the single video clip into consideration, in selecting the approximate duration of the resulting smaller video clips created by subdividing the single video clip. Preferably, if the single video clip is between 2 to 4 seconds in duration, then it is divided into two video clips, one of which is two seconds in duration. Preferably, if the single video clip is between 4 and 32 seconds in duration, then it is divided into at least two video clips, at least one of which is four seconds in duration. Preferably if the single video clip is greater than 32 seconds, it is divided into at least four video clips, at least four of which are 8 seconds in duration. Alternately video signal 304 already comprises video clips bracketed by a significant change. In each of these alternative options, the video content maybe modified by automatically removing unwanted scenes or applying effects, such as transitions or filters. The method of modification may comprise algorithms well known to those skilled in the art. Lastly, in each of these alternative options, the duration characteristics of the resulting video clips need to be determined, including the minimum, maximum, and average video clip duration. Stage 354 preferably uses method 100 to identify the set of predominant beats corresponding to the fundamental beat frequencies of music signal 306.

In stage 356, method 350 may determine how often to change video clips, or in other words, to chose a beat interval. In an embodiment consistent with the invention, the preferred beat interval for playing each video clip is two seconds. If the average video clip duration as determined in stage 354 is less than two seconds, the beat interval is set to the average video clip duration. Stage 356 then divides the total duration of music signal 306 by the beat interval, thereby determining the number of possible video clips that can be shown within the total duration of music signal 306.

Stage 356 then selects the beats according to a modified and abbreviated method 150. The modification includes setting N, the number of still images to be displayed, equal to the whole number of possible video clips that can be shown and setting the display period, DP, equal to the beat interval in stage 192. The abbreviation is that the method starts with stage 192. The preferred method will not choose a new display period, DP, if stages 192 through 218 select fewer selected elements than N−1 (i.e., the answer "NO" to step 220 of FIG. 13 will not result in stage 222 being performed), nor perform stage 225 (optimization of the display period), but will output the number of beat elements selected the first time through the entire beta element array using DP set equal to the selected beat interval.

In general, stage 358 creates a significant change in video content on every selected beat and a chronological series of video scenes when none of the original video scenes are long enough to fill a particular audio duration. Specifically, the preferred steps of stage 358 follow. Given the array of selected beats from stage 356, the method constructs an array of audio durations 326 in stage 358. The audio durations it calculates and enters as elements of the array include the duration between the beginning of the music file and the onset time of first selected beat, the durations between each pair of onset times from chronologically occurring selected beats, and the duration between the onset time of the last selected beat and the end of the Stage 358 also receives the earlier created video clips and creates a copy of them for use in a list from which they will be selected individually for examination, possible editing and ordering for concurrent play with an audio duration.

As an overall approach, stage 358 continues by examining each video clip and selecting those whose duration is equal to or exceeds an unfilled audio duration in audio array 326. If a video clip's duration exceeds an audio duration, the video clip is edited by shortening it to match the audio duration. Preferably, the video clip is edited by trimming off the end portion that exceeds the audio duration, but other editing techniques may be used. The selected and/or edited video clips are then ready to be ordered for concurrent playing with musical signal 306.

Boundary conditions may be enforced to improve video content. For example, an extremely long video clip should be initially subdivided into smaller video clips, from which stage 358 may select and further edit. Also, an edited video clip should not be followed by material trimmed from its end and the same video clip should not be used for two successive audio durations. When the resulting video clips are sequentially ordered, then played with music signal 306, each audio duration will be accompanied by the display of different video content than displayed with the previous audio duration, and a significant change in video content occurs on a beat.

Stage 358 preferably uses the following specific steps to select video clips to fill the length of time of each audio duration in array 326. First, it receives the copied list of original video clips from clip copier 330. Starting with the first video clip ("VC") and proceeding through each one in the list, it examines each clip according to rules set forth below.

FIGS. 16a-d, illustrate an example of how a stage 358 works using a hypothetical video content signal 304 and a hypothetical music signal 306. A nine (9) minute video 304, is received in stage 352 and is divided into five video clips (visual scenes) of the following durations in stage 354 listed in Table 2.

TABLE 2

| Scene/Video Clip # | Duration (seconds) |
| --- | --- |
| 400 | 120 |
| 403 | 90 |
| 406 | 5 |
| 409 | 315 |
| 412 | 10 |

In this hypothetical example, a four (4) minute digital music signal 306 has been selected by the user, in which beats corresponding to the fundamental beat frequency have been identified in stage 354. Using a beat interval of 12 seconds, a subset of predominant beats has been selected in stage 356 and stage 358 has already created the following audio duration array listed in Table 3.

TABLE 3

| Audio Duration # | Duration (seconds) |
| --- | --- |
| AD1 | 12.30 |
| AD2 | 12.42 |
| AD3 | 12.15 |
| AD4 | 11.99 |
| AD5 | 11.92 |
| . | . |
| . | . |
| . | . |
| AD20 (ADn) | 12.00 |

Stage 358 compares the duration of the first video clip ("VC") in the list to the first audio duration, AD1, of the audio duration array. If the first VC is at least equal in duration to AD1, stage 358 selects it and trims a portion from its end equal to the duration greater than AD1. It then moves the trimmed portion of the first VC to the end of the list of video clips available for filling remaining audio durations. The remaining portion of the first VC is removed from the list and ordered as number 1 for playing concurrently with the music.

Figure 16A:
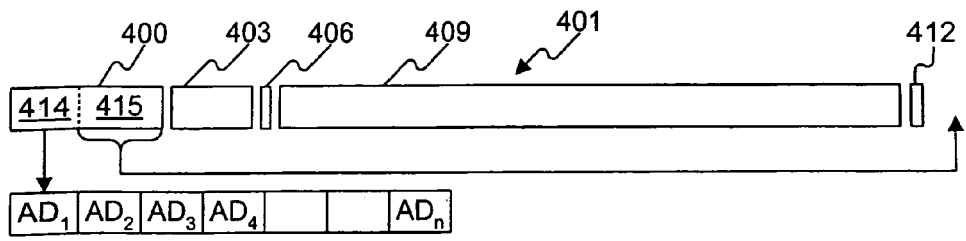
FIGS. 16a-d are snapshots of results of an embodiment consistent with a portion of the method of FIG. 15.

FIG. 16a shows the initial configuration of the list 401 of video clips of an example signal 304 and audio durations of an example music signal 306, where original video clip 400 is longer in duration than audio duration 1 ("AD1") (120>12.3 seconds). A portion of VC 400 is trimmed from the end thereof, so that the remaining duration is equal to AD1. Trimmed portion 415 is placed last in list 401 of video clips being considered as sources to fill the remaining audio durations. Edited VC 414 is selected and removed from list 401.

Returning to the preferred steps of stage 358, after AD1 has been filled with a video clip, the duration of the next video clip in the list is compared to audio duration 2 ("AD2"). If the duration of the next video clip is at least equal to AD2, the next video clip is selected and any portion exceeding AD2 is trimmed from its end. The trimmed portion of the next video clip is placed at the end of the list of available video clips for filling remaining audio durations and the remaining version of the next video clip is removed from the list and ordered for concurrent playing with AD2. Again, if it is not at least equal to AD2, it is moved to the end of the list of available video clips and the process continues with another video clip, next in the list that has not yet been compared to AD2.

Figure 16B:
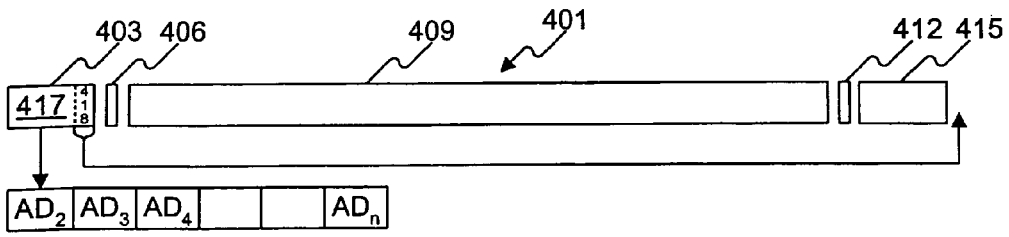

FIG. 16b illustrates the above paragraph, where original video clip ("VC") 403 is longer in duration than audio duration 2 ("AD2") (90>12.4 seconds). A portion of VC 403 is trimmed from the end thereof, such that the remaining duration is equal to AD2. Trimmed portion 418 is placed last in list 401 of video clips being considered as sources to fill the remaining audio durations. Edited VC 417 is selected and removed from list 401.

Stage 358 continues such that if an examined video clip is not at least equal to an AD, then it is moved to the end of the list of video clips available for filling remaining audio durations and the next original video clip's duration is compared to the AD. The same process is repeated for each subsequent video clip that is not at least equal to the AD.

Figure 16C:
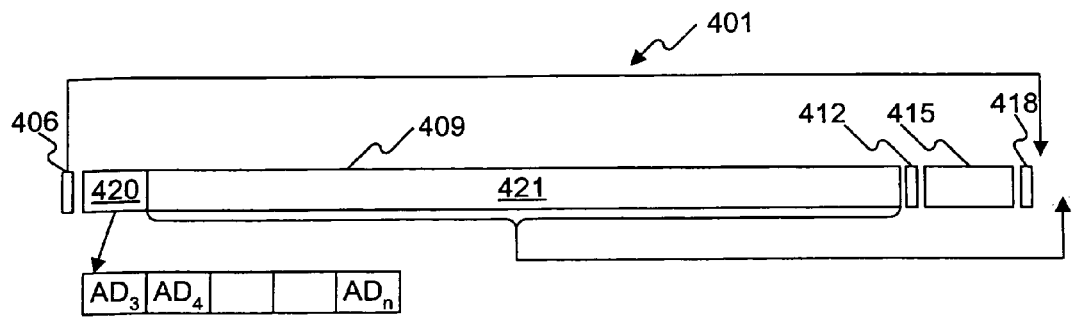

FIG. 16c illustrates the above paragraph, where original video clip 406 is less than audio duration 3 ("AD3") (5<12.1 seconds). It is placed last in list 401 of video clips being considered as sources to fill the remaining audio durations. Original video clip 409 is longer in duration than AD3 (315>12.1 seconds). A portion of VC 409 is trimmed from the end thereof, such that the remaining duration is equal to AD3. Trimmed portion 421 is placed last in list 401 of video clips being considered as sources to fill the remaining audio durations. Edited VC 420 is selected and removed from list 401.

Figure 16D:
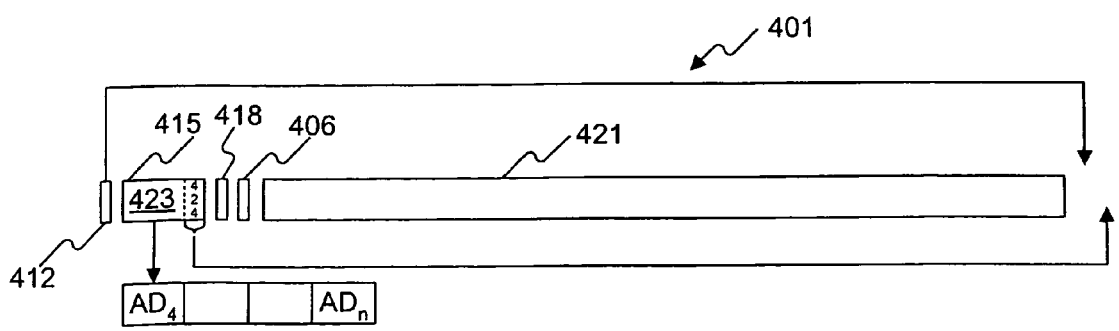

FIG. 16d shows the next intermediate configuration, where original VC 412 is less than audio duration 4 ("AD4") (10<11.9 seconds). It is placed last in list 401 of video clips being considered as sources to fill the remaining audio durations. Trimmed portion 415 is longer in duration than AD4. A portion of VC 415 is trimmed from the end thereof, such that the remaining duration is equal to AD4. Newly trimmed portion 424 is placed after video clip 412 in list 401 of video clips being considered as sources to fill the remaining audio durations. Edited VC 423 is removed from list 401.

As stage 358 continues to work its way through the audio duration array, when none of the video clips (trimmed or otherwise) in the list of video clips available to fill remaining audio durations have durations at least equal to the current audio duration to be filled, then all video clips in the list are removed and stage 358 makes another copy of the original video clips. Copy 322 of the original video clips becomes the list of available video clips and stage 358 starts with the first video clip and continues until all audio durations have been filled or, again, until no single original video clip is long enough to fill an audio duration.

When no remaining video clip in the list is long enough to fill an audio duration, stage 358 makes another copy of the original video clips 322 and selects the smallest subset of chronological video clips that is at least equal to the audio duration to be filled. The need for the above steps most often occurs at the end of a music signal 306. Preferably stage 358 selects the smallest subset by matching the end of the music signal 306 to the end of the chronological video clips and trimming off a portion from the beginning thereof, such that the remaining duration is equal to the audio duration to be filled. In this particular instance, the series of chronological video clips ends at the same time as music signal 306, and the duration of the series corresponds to the audio duration. This will a significant change in video to occur when no beats corresponding to the fundamental beat frequency occur, but creates a natural ending of the video.

When all audio durations have been filled, stage 360 then sorts the selected video clips by play order and synchronized them with musical signal 306 to create multimedia signal 134 in which significant changes in video content occur on beats corresponding to the fundamental beat frequency of the music file.

Another embodiment consistent with the invention is a computer operated automatic video editing method to make movies, the method comprising editing video clips synchronized to beats in the selected audio track which may be one or more songs or sounds.

As shown in FIG. 17, a method 425 for making a movie may include receiving digital music content (stage 450), receiving digital video content (stage 452) which may include digital audio content because it was recorded simultaneously with the video, and offering a user one or more video styles from which to select a video style (stage 454).

The audio files which may make up the digital music content may be available for the user to provide to the application or select within the application at least one of three ways: files "ripped" from a CD, audio that comes as part of video content, audio files that are imported into the application, audio that is generated automatically within the application, or sound already present in the application from which the user can select. Any audio file digital format may be used and converted, if necessary, by the pre-process music content stage (stage 456). Examples of audio file digital formats include .WAV, .MP3, or Apple's .AAC. Others certainly exist. The user may select digital music content that may be offered within the application or may provide digital music content obtained from the internet (via downloading), through a microphone, MIDI, or digitizing hardware that may convert analog audio to digital file formats.

The digital video may be in any file format, such as, for example, AVI, .MPG (MPEG-1 or MPEG-2), .MOV (Apple QuickTime), or .WMV (Windows Media Format). Others may certainly be used, but may need to be converted to another format in the pre-process video content stage (stage 458). The user may select sample digital video from within the application, or may provide digital video from the internet (via downloading), or through video that has been "captured" a television tuner card, a USB device, a DV device (Firewire (1394)), or digitizing hardware that will convert analog video to digital video.

Stage 454 may be implemented by a drop-down menu with the offered video styles, check boxes next to each video style displayed, or other presentation method known to those skilled in the art.

Method 425 also may include receiving a user-selected style (stage 460). With reference to the exemplary methods of offering a user a choice of video styles in stage 454, if a user selects a video style from the drop down menu, or checks a box next to a style, the application receives the user-selected video style. The style selected may be associated with a set of values of variables that may define the video style. In stage 462, method 425 receives a style settings file. A style settings file may be a data file including at least the values of variables associated with the user-selected style. As here implemented, the data file may be in ".ini" format. Alternate formats may be used, such as XML, or others known to those skilled in the art. Example variables and preset values that may be present in the style settings file are explained below, after the description of FIG. 17.

Music pre-process stage 456 may include creating a list of music or other audio data which make up the digital music content, and determining the start time, end time, and total duration of the digital music content, which may be saved for use in the remainder of the method. The digital music content may also be analyzed in stage 464, which creates a set of information on the beats in the digital music content. The set may be implemented as an array, list, or other structure preferred by one skilled in the art. As here implemented, stage 464 creates an array. An element in the array may contain the time of a beat onset and the amplitude of the beat. Preferably, and as here implemented, the array is in chronological order starting with the beginning of the digital music content and ending with the end of the digital music content. This array may be preferably created as previously described according to stages 184 through 188 of previously described method 150, although any "in real time" computer-implemented method of determining at least the onset time of beats in a piece of music will suffice. If the analysis of the digital music content is not "in real time," whether computer-implemented or not, then the movie produced will be limited to digital music content for which the beat information has been previously obtained by any method, but saved in an array or other computer readable structure. Throughout this description, this set of information on the beats of the digital music content is referred to as either the beat element array or the audio scene array, which terms are used interchangeably.

Video pre-process stage 458 may include converting the file format of the digital video content to a common or accepted format, creating a set of video clips, which make up the digital video content, determining the start time, end time, duration of each video clip, removing any gaps in time between video clips, and removing video clips that are low-quality video, e.g., all black, out of focus, over or under exposed. Video pre-process stage 458 may also include calculating the total duration of the set of video clips.

A set of selected video scenes may then be created in stage 466 from the list of video clips. It may be recognized that a video scene is still a video clip, but for clarity, and to separately identify the set of video clips that exists after the selection process and the set of video clips that exists before the selection process, the "selected" video clips will be referred to hereinafter as video scenes. (A method of creating the set of selected video scenes is described in FIGS. 18-31.) The set of selected video scenes, when created by the method described in FIGS. 18-31, and played sequentially, will change video content or, in other words, change scenes, at the same time as the onset time of a beat when played at the same time as the digital music content. The result is a synchronization of sensory inputs of the eye and ear when watching the movie. Other methods of creating the list of trimmed video scenes may be used, as the synchronization of scene transitions and beats of the digital music content is merely preferred.

As here implemented, closing credits, if any have been entered by the user, may then be added to the set of selected video scenes in stage 468. As here implemented, the set of selected video scenes, audio accompanying the selected video scenes, and digital music content may then be merged in stage 470. This stage may create one set of start and stop times of the various components of the movie, such that synchronization between the various edited clips (of video and audio) may be insured. Lastly, as here implemented, the opening credits, if any, may be added in stage 472. If the opening credits are to be displayed prior to the start of the music and video, then the start times may need to be adjusted to account for the delay and synchronize the beginning of the music and video at the end of the opening credits or beginning of the transition, if any, from the opening credits to the first video scene of the movie.

Method 425 may also include a stage 474 to visually display a timeline of the produced movie. If a user prefers to modify the style-determined, computer-obtained results, he or she may then do so, using a standard digital video editor in stage 476. As examples of modifications a user may make, a user may not prefer a selected video scene and may replace it with a video scene of the user's choice using a standard three-point edit technique or a user may wish to move a scene boundary to a different time, extending a scene. As a result of modification, the computer may repeat some stages of method 425 including recalculating the start and stop times of the sequential list of selected video scenes. Once user-modification of the results are complete, the list of selected video scenes, user-provided opening and closing credits content, and digital music content may be saved for future viewing by a user as a movie in stage 478.

Returning to stage 454, Table 4 contains exemplary names and brief descriptions of five example video styles that may be offered in stage 454:

TABLE 4

Music Video Styles

| Name | Description |
|---|---|
| Music video | A fast-paced, exciting video with many quick cuts |
| Romantic | A quiet, romantic video with lots of slow motion and slow transitions |
| Old movie | A nostalgic evocation of the early days of filmmaking |
| Wild and Crazy | A tasteless, no-holds-barred extravaganza |
| Simple | A quiet, understated and straightforward video |

In stage 462, the style settings file may contain values of variables that may be used as inputs to stages 466, 468, and 462 in method 425 and which define at least the visual characteristics of a movie made according to the video style. The variables for which preset values may be included in the style settings file may be any that one skilled in the art deems appropriate. Tables 5-22 include exemplary variables and preset values for each of the exemplary video styles listed in Table 4.

Movies often begin and end with titles and or other information regarding the actors, director, producer, location, etc. Thus a style settings file may preferably include variables defining an opening section and a closing section and that may allow a user to create a title or other text at the beginning and end of each movie. Table 5 illustrates exemplary variables and preset values of the opening and closing section for each of the exemplary video styles of Table 4.

TABLE 5

| Variables | Music Video | Romantic | Old movie | Wild & Crazy | Simple |
|---|---|---|---|---|---|
| Opening Credits Title | Title3 - Directed by.dtl | Title4 - Presenting.dtl | Title5 - Presenting.dtl | Title6 - Presenting.dtl | Title1 - Presenting.dtl |
| Closing Credits Title | Title3 - Directed by.dtl | Title4 - Directed by.dtl | Title5 - Directed by.dtl | Title6 - Directed by.dtl | Title1 - Directed by.dtl |
| Opening Credits Title Duration (sec.) | 4 | 4 | 4 | 4 | 4 |
| Closing Credits Title Duration (sec.) | 4 | 4 | 4 | 4 | 4 |
| Video Opening Transition | 6300 | 6301 | 6301 | 6301 | 6301 |
| Video Opening Transition Duration (sec.) | 1 | 1 | 1 | 1 | 1 |
| Video Closing Transition | 6300 | 6301 | 6301 | 6301 | 6301 |
| Video Closing Transition Duration (sec.) | 1 | 1 | 1 | 1 | 1 |
| Opening Credits Opening Transition | 6301 | 6301 | 6301 | 6301 | 6301 |
| Opening Credits Opening Transition Duration (sec.) | 1 | 1 | 1 | 1 | 1 |
| Opening Credits Closing Transition | 6301 | 6301 | 6301 | 6301 | 6301 |
| Opening Credits Closing Transition Duration (sec.) | 1 | 1 | 1 | 1 | 1 |
| Closing Credits Opening Transition | 6300 | 6301 | 6301 | 6300 | 6300 |
| Closing Credits Opening Transition Duration (sec.) | 1 | 1 | 1 | 1 | 1 |
| Closing Credits Closing Transition | 6301 | 6301 | 6301 | 6301 | 6301 |
| Closing Credits Closing Transition Duration (sec.) | 1 | 1 | 1 | 1 | 1 |
| Opening Action | Overlay | Separate | Separate | Separate | Separate |
| Closing Action | Overlay | Separate | Separate | Separate | Separate |

TABLE 5-continued

| Variables | Music Video | Romantic | Old movie | Wild & Crazy | Simple |
|---|---|---|---|---|---|
| Relative Volume | N/A | 100 | 100 | N/A | N/A |
| Relative Volume Enabled | N/A | 0 | 0 | N/A | N/A |

"Opening Credits Title" is the text that a user may enter into an edit box and the software may put the text into a template graphic that may ultimately be displayed as an opening credit of the movie. "Closing Credits Title" is the same for the closing credit. "Opening Credits Title Duration" is the exemplary variable for the number of seconds for which the opening credit title may be displayed. "Closing Credits Title Duration" is the exemplary variable for the number of seconds for which the closing credit title may be displayed.

"Video Opening Transition" is the exemplary variable that may determine the type of video transition technique to transition from a blank (or black) screen to the first video scene of the movie. The numbers refer to Pinnacle Studio transition numbers. The number 6300, designates, for example, a "fade in" transition. "Video Opening Transition Duration" is the exemplary variable that determines the duration in seconds of the opening transition. "Video Closing Transition" is the exemplary variable that determines the type of video transition technique for transitioning from the final video scene to the a blank (or black) screen. "Video Closing Transition Duration" is the exemplary variable that determines the duration in seconds of the closing transition.

"Opening Credits Opening Transition" is the exemplary variable that determines the video transition technique that will be used to transition from a blank or other non-user selected screen to the opening credits. "Opening Credits Opening Transition Duration" is the exemplary variable that determines the duration in seconds of the transition.

"Opening Credits Closing Transition" is the exemplary variable that determines the video transition technique that will be used to transition from the opening credits into the selected video content. "Opening Credits Closing Transition Duration" is the exemplary variable that determines the duration in seconds of the transition. "Closing Credits Opening Transition" is the exemplary variable that determines the video transition technique that will be used to transition from the selected video content to the closing credits or title. "Closing Credits Opening Transition Duration" is the exemplary variable that determines the duration in seconds of the transition. "Closing Credits Closing Transition" is the exemplary variable that determines the video transition technique that will be used to transition from the closing credits to a blank or other non-user selected screen. "Closing Credits Closing Transition Duration" is the exemplary variable that determines the duration in seconds of the transition.

"Opening Action" is the exemplary variable that determines whether the opening text will overlay the video, or be a separate full screen. "Closing Action" is the exemplary variable for the same determination with regard to the closing text.

The sound that the user may select to accompany the video may vary to include some percentage of the audio recorded with the video content, and some, preferably complementary, percentage of the selected digital music content. Preferably, the user may set the split in sound between the selected digital music content and the audio recorded with the video content. Preferably, the user clicks on a horizontal "slider bar" where 100 percent audio from the video content is on the left end and 100 percent selected digital music is on the right end and drags the slider to the desired split of between audio and music. However, the split may be set in the style settings file. "Relative volume" is the exemplary variable that determines what percentage of the sound that will accompany the video is the audio content, if any, associated with the user-selected video content. "Relative volume enabled" is the exemplary variable that pre-sets whether or not the user will be allowed to set the split using, for example, the slider bar. A value of 1 allows the user's choice to apply and a value of 0 does not.

Movies also may present scenes in chronological or other order (flashbacks, or an order such as that used in the movie Memento, etc.). A style settings file may include a variable and preset value of video scene order. Each of the exemplary video styles in Table 4 includes such a variable. Table 6 presents exemplary values of a scene order variable for each exemplary video style. As here implemented, the exemplary variable is called "Scene Ordering" and its value determines whether the edited video clips will be taken randomly or sequentially from the digital video content.

TABLE 6

| | Music Video | Romantic | Old movie | Wild & Crazy | Simple |
|---|---|---|---|---|---|
| Scene Ordering | Random | Sequential | Sequential | Random | Sequential |

Each video style preferably may define a master framework of sections, where each section may differ from its adjacent sections as a result of different preset settings of predetermined variables, or even different predetermined variables that determine the characteristics of each section. Tables 7-29 contain exemplary variables and exemplary preset values for each of the exemplary video styles listed above in Table 4.

If there is to be more than one section in a video style, the predetermined variables may include one or more variables that set boundaries on the duration of each section. In the exemplary video styles of Table 4, the "music video" style and the "wild and crazy" style have more than one section and have such variables. Table 4 displays the names and preset values of such variables as implemented in the two exemplary styles. As here implemented, variable "duration percent" defines the percent of the total video duration that a particular section may be. As here implemented, variable "maximum duration" defines the maximum duration that a particular section may be. A method using these variables to determine each section's duration is described in FIGS. 19-21.

TABLE 7

(Sections for Music Video and Wild and Crazy)

|  | Sect. 1 | Sect. 2 | Sect. 3 | Sect. 4 | Sect. 5 | Sect. 6 | Sect. 7 |
|---|---|---|---|---|---|---|---|
| Description | opening section | first fast section | first slow section | second fast section | second slow section | third fast section | final section |
| Duration Percent | 10 | 20 | 20 | 20 | 10 | 10 | 10 |
| Maximum Duration (sec.) | 8 | 20 | 20 | N/A | N/A | N/A | 8 |

The other three exemplary video styles of Table 4 only have one section and therefore the exemplary style setting file does not include a maximum duration, but only the variable "duration percent," of which the preset value is, of course, 100.

Each section may have one or more video scene. If a section is to have more than one video scene, the video style may include one or more scene duration variables with preset values. The exemplary video styles of Table 4 each preferably include such variables. Tables 8-10 display the names and preset values of such variables as here implemented. All listed variable names are self explanatory except "Scene Break Duration." This exemplary variable may be used to determine whether the remaining duration in a video section should be added onto the last created selected video scene or should consist of at least one more separate scene in the section. A method of making that determination and using such variable is described in FIG. 25.

TABLE 8

Exemplary Video Style #1, Music Video, scene duration variables & values

| Variable Name | Sect. 1 | Sect. 2 | Sect. 3 | Sect. 4 | Sect. 5 | Sect. 6 | Sect. 7 |
|---|---|---|---|---|---|---|---|
|  | opening section | first fast section | first slow section | second fast section | second slow section | third fast section | final section |
| Scene Min. Duration (sec.) | 3 | .2 | 1.5 | .2 | 1.5 | 0.2 | 3 |
| Scene Max. Duration (sec.) | 4 | 1 | 3 | 1.2 | 3 | 1.2 | 4 |
| Scene Ave. Duration (sec.) | 3.5 | .5 | 2 | .5 | 2 | 0.5 | 3.5 |
| Scene Break Duration (sec.) | 1 | .5 | 1 | .5 | 1 | 0.5 | 3 |

TABLE 9

Exemplary Video Styles #2, 3, and 5 scene duration variables & values

| Variable Name | Romantic | Old movie | Simple |
|---|---|---|---|
| Scene Minimum Duration (sec.) | 3 | 3 | 3 |
| Scene Maximum Duration (sec.) | 8 | 8 | 8 |
| Scene Average Duration (sec.) | 4 | 4 | 4 |
| Scene Break Duration (sec.) | 3 | 2 | 3 |

TABLE 10

Exemplary Video Style 4, Wild and Crazy, scene duration variables & values

| Variable Name | Sect. 1 | Sect. 2 | Sect. 3 | Sect. 4 | Sect. 5 | Sect. 6 | Sect. 7 |
|---|---|---|---|---|---|---|---|
| Description | opening section | first fast section | first slow section | second fast section | second slow section | third fast section | final section |

TABLE 10-continued

Exemplary Video Style 4, Wild and Crazy, scene duration variables & values

| Variable Name | Sect. 1 | Sect. 2 | Sect. 3 | Sect. 4 | Sect. 5 | Sect. 6 | Sect. 7 |
|---|---|---|---|---|---|---|---|
| Scene Minimum Duration (sec.) | 3 | .2 | 2 | .2 | 1.5 | 0.2 | 3 |
| Scene Maximum Duration (sec.) | 4 | 1 | 4 | 1.2 | 3 | 1.2 | 4 |
| Scene Average Duration (sec.) | 3.5 | .5 | 3 | .5 | 2 | 0.5 | 3.5 |
| Scene Break Duration (sec.) | 1 | .5 | 1 | .5 | 1 | 0.5 | 3 |

When a scene starts or ends at the same moment as a beat in the music, the synchronized audio-visual effect is pleasing to a viewer. Thus the start and stop times of the list of selected video scenes may preferably be selected from the set of onset times of beats in the digital music. As discussed above, this set may be included in the beat element array. The video style may also predetermine the method of selecting beats. As here implemented, the exemplary video styles of Table 4 each predetermine which beat selection method may be used to select beats from the music content on which to change video content (i.e., change scenes). Table 11 displays the variable name "algorithm" and preset values as here implemented for exemplary video styles Music Video and Wild and Crazy. Table 12 displays the variable name "algorithm" and preset methods as here implemented for exemplary video styles, Romantic, Old Movie, and Simple. One preset method may be to select at least some of the beats with an onset time nearest to the target time as set by the start time plus the average duration of a scene ("Avg. Length"). Another preset method may be to select a beat with the greatest amplitude between start time plus the minimum and the start time plus the maximum scene duration ("Strongest beat"). These two preferred methods of selecting the scene start and stop times are described in FIGS. 23-24.

TABLE 11

| | Sect. 1 | Sect. 2 | Sect. 3 | Sect. 4 | Sect. 5 | Sect. 6 | Sect. 7 |
|---|---|---|---|---|---|---|---|
| Algorithm | Ave. Length | Strongest beat | Ave. Length | Strongest beat | Ave. Length | Strongest beat | Strongest beat |

TABLE 12

| | Romantic | Old movie | Simple |
|---|---|---|---|
| Duration Percent | 100 | 100 | 100 |
| Seed | N/A | 0 | N/A |
| Algorithm | Strongest beat | Strongest beat | Strongest beat |

A video style may optionally predetermine any video effects to be applied to the one or more video scenes. Non-limiting examples of types of such video effects are transitions between scenes, filters, play-back speed, and other special effects. Specific effects within each type are known to those skilled in the art and may be available with a standard digital video editor, such as Video for Window or QuickTime for Windows. Examples are described in pages 249

Each of the exemplary video styles of Table 4 employ transition techniques. As implemented in the exemplary video styles of Table 4, the predetermined variables for transition techniques include the percentage of scenes in each section that will have transition techniques applied to them, minimum and maximum limits on the duration of a transition between scenes, and a list of transition techniques available to be applied. Tables 13-22 display preferred names and preset values of such variables as implemented in the exemplary video styles.

TABLE 13

Music video Section 1

| Variable Name | Value |
|---|---|
| Transition Percent | 100 |
| Transition Minimum Duration (sec.) | 0.8 |
| Transition Maximum Duration (sec.) | 1.0 |
| Transition 1 | 6301 |

TABLE 14

Music video Section 3

| Variable Name | Value |
|---|---|
| Transition Percent | 50 |
| Transition Minimum Duration (sec.) | 0.6 |
| Transition Maximum Duration (sec.) | 1.0 |
| Transition 1, 2, 3, 5, 6, 7, 8, 10, 11, 12, 13, 14, and 15, | 6301 |
| Transition 4 | 6336 |
| Transition 9 | 6367 |

TABLE 15

Music video Section 5

| Variable Name | Value |
| --- | --- |
| Transition Percent | 40 |
| Transition Minimum Duration (sec.) | 0.6 |
| Transition Maximum Duration (sec.) | 0.9 |
| Transition 1-3, 5, −8, 10-15 | 6301 |
| Transition 4 | 6360 |
| Transition 9 | 6328 |

TABLE 16

Romantic Section 1

| Variable Name | Value |
| --- | --- |
| Transition Percent | 100 |
| Transition Minimum Duration (sec.) | 1 |
| Transition Maximum Duration (sec.) | 2.5 |
| Transition 1-4, 6-25 | 6301 |
| Transition 5 | 6342 |

TABLE 17

Wild Section 1

| Variable Name | Value |
| --- | --- |
| Transition Percent | 100 |
| Transition Minimum Duration (sec.) | 0.8 |
| Transition Maximum Duration (sec.) | 1 |
| Transition 1 | 6301 |

TABLE 18

Wild Section 3

| Variable Name | Value |
| --- | --- |
| Transition Percent | 50 |
| Transition Minimum Duration (sec.) | 1 |
| Transition Maximum Duration (sec.) | 2 |
| Transition 1 | 6301 |
| Transition 2 | 6342 |
| Transition 3 | 6343 |
| Transition 4 | 6336 |
| Transition 5 | 6341 |
| Transition 6 | 6331 |
| Transition 7 | 6328 |
| Transition 8 | 6329 |
| Transition 9 | 6330 |
| Transition 10 | 6360 |
| Transition 11 | 6361 |
| Transition 12 | 6362 |
| Transition 13 | 6363 |
| Transition 14 | 6364 |
| Transition 15 | 6366 |
| HFX Transition 1 | BAS-Airplane 1 |
| HFX Transition 2 | BAS-Balloon |
| HFX Transition 3 | BAS-Block Pieces |
| HFX Transition 4 | BAS-FlyOff |
| HFX Transition 5 | BAS-Glass Break |
| HFX Transition 6 | BAS-Page Peel |
| HFX Transition 7 | BAS-Spider |
| HFX Transition 8 | BAS-Wild Curl |
| HFX Transition 9 | PLS-Ball Split |
| HFX Transition 10 | PLS-Particle Vortex |
| HFX Transition 11 | PLS-Warp |
| HFX Transition 12 | PRO-River Door |

TABLE 19

Wild Section 5

| Variable Name | Value |
| --- | --- |
| Transition Percent | 40 |
| Transition Minimum Duration (sec.) | 0.6 |
| Transition Maximum Duration (sec.) | 0.9 |
| Transition 1-3, 5-8, 10-15 | 6301 |
| Transition 4 | 6360 |
| Transition 9 | 6328 |
| HFX Transition 1 | BAS-Airplane 1 |
| HFX Transition 2 | BAS-Balloon |
| HFX Transition 3 | BAS-Block Pieces |
| HFX Transition 4 | BAS-FlyOff |
| HFX Transition 5 | BAS-Glass Break |
| HFX Transition 6 | BAS-Page Peel |
| HFX Transition 7 | BAS-Spider |
| HFX Transition 8 | BAS-Wild Curl |
| HFX Transition 9 | PLS-Ball Split |
| HFX Transition 10 | PLS-Particle Vortex |
| HFX Transition 11 | PLS-Warp |
| HFX Transition 12 | PRO-River Door |

TABLE 20

Wild Section 6

| Variable Name | Value |
| --- | --- |
| Transition Percent | 50 |
| Transition Minimum Duration (sec.) | 1 |
| Transition Maximum Duration (sec.) | 2 |
| Transition 1 | 6301 |
| Transition 2 | 6342 |
| Transition 3 | 6343 |
| Transition 4 | 6336 |
| Transition 5 | 6341 |
| Transition 6 | 6331 |
| Transition 7 | 6328 |
| Transition 8 | 6329 |
| Transition 9 | 6330 |
| Transition 10 | 6360 |
| Transition 11 | 6361 |
| Transition 12 | 6362 |
| Transition 13 | 6363 |
| Transition 14 | 6364 |
| Transition 15 | 6366 |
| HFX Transition 1 | BAS-Airplane 1 |
| HFX Transition 2 | BAS-Balloon |
| HFX Transition 3 | BAS-Block Pieces |
| HFX Transition 4 | BAS-FlyOff |
| HFX Transition 5 | BAS-Glass Break |
| HFX Transition 6 | BAS-Page Peel |
| HFX Transition 7 | BAS-Spider |
| HFX Transition 8 | BAS-Wild Curl |
| HFX Transition 9 | PLS-Ball Split |
| HFX Transition 10 | PLS-Particle Vortex |
| HFX Transition 11 | PLS-Warp |
| HFX Transition 12 | PRO-River Door |

TABLE 21

Wild Section 7

| Variable Name | Value |
| --- | --- |
| Transition Percent | 50 |
| Transition Minimum Duration (sec.) | 1 |
| Transition Maximum Duration (sec.) | 2 |
| Transition 1 | 6301 |
| Transition 2 | 6342 |
| Transition 3 | 6343 |
| Transition 4 | 6336 |
| Transition 5 | 6341 |

TABLE 21-continued

Wild Section 7

| Variable Name | Value |
|---|---|
| Transition 6 | 6331 |
| Transition 7 | 6328 |
| Transition 8 | 6329 |
| Transition 9 | 6330 |
| Transition 10 | 6360 |
| Transition 11 | 6361 |
| Transition 12 | 6362 |
| Transition 13 | 6363 |
| Transition 14 | 6364 |
| Transition 15 | 6366 |
| HFX Transition 1 | BAS-Airplane 1 |
| HFX Transition 2 | BAS-Balloon |
| HFX Transition 3 | BAS-Block Pieces |
| HFX Transition 4 | BAS-FlyOff |
| HFX Transition 5 | BAS-Glass Break |
| HFX Transition 6 | BAS-Page Peel |
| HFX Transition 7 | BAS-Spider |
| HFX Transition 8 | BAS-Wild Curl |
| HFX Transition 9 | PLS-Ball Split |
| HFX Transition 10 | PLS-Particle Vortex |
| HFX Transition 11 | PLS-Warp |
| HFX Transition 12 | PRO-River Door |

TABLE 22

Simple Section 1

| Variable Name | Value |
|---|---|
| Transition Percent | 80 |
| Transition Minimum Duration (sec.) | 1 |
| Transition Maximum Duration (sec.) | 2 |
| Transition 1 | 6301 |

A few of the exemplary video styles of Table 4 also employ other video effects. Exemplary variables and their names and preset values as displayed in Tables 23-29. As implemented, Speed Percent and Filter Percent are the names of the variables which define what percent of the scenes in a section will have an effect of that respective type. As implemented in the exemplary video styles, Speed Minimum Value is the multiplier for determining the minimum speed at which a video scene may be played. As implemented in the exemplary video styles, Speed Maximum Value is the multiplier for determining the maximum speed at which a video scene may be played. Tables 23-29 also include a numbered list of preferred video filters available to be applied to a video scene.

TABLE 23

Romantic Section 1

| Variable Name | Value |
|---|---|
| Speed Percent | 100 |
| Speed Minimum Value | .2 |
| Speed Maximum Value | .99 |

TABLE 24

Old Movie Section 1

| Variable Name | Value |
|---|---|
| Filter Percent | 100 |
| Video Filter 1 | Old Film |

TABLE 24-continued

Old Movie Section 1

| Variable Name | Value |
|---|---|
| Speed Percent | 100 |
| Speed Minimum Value | 1.1 |
| Speed Maximum Value | 1.5 |

TABLE 25

Wild and Crazy Section 2

| Variable Name | Value |
|---|---|
| Filter Percent | 80 |
| Video filter 1 | Black and White |
| Video filter 2 | Color Correction |
| Video filter 3 | Posterize |
| Video filter 4 | Sepia |
| Video filter 5 | Lens Flare |
| Video filter 6 | Noise |
| Video filter 7 | Water Drop |
| Video filter 8 | Blur |
| Video filter 9 | Emboss |
| Video filter 10 | Mosaic |
| Video filter 11 | Old Film |
| Video filter 12 | Stained Glass |

TABLE 26

Wild and Crazy Section 3

| Variable Name | Value |
|---|---|
| Filter Percent | 50 |
| Video filter 1 | Black and White |
| Video filter 2 | Color Correction |
| Video filter 3 | Posterize |
| Video filter 4 | Sepia |
| Video filter 5 | Lens Flare |
| Video filter 6 | Noise |
| Video filter 7 | Water Drop |
| Video filter 8 | Blur |
| Video filter 9 | Emboss |
| Video filter 10 | Mosaic |
| Video filter 11 | Old Film |
| Video filter 12 | Stained Glass |

TABLE 27

Wild and Crazy Section 4

| Variable Name | Value |
|---|---|
| Filter Percent | 80 |
| Video filter 1 | Black and White |
| Video filter 2 | Color Correction |
| Video filter 3 | Posterize |
| Video filter 4 | Sepia |
| Video filter 5 | Lens Flare |
| Video filter 6 | Noise |
| Video filter 7 | Water Drop |
| Video filter 8 | Blur |
| Video filter 9 | Emboss |
| Video filter 10 | Mosaic |
| Video filter 11 | Old Film |
| Video filter 12 | Stained Glass |

TABLE 28

Wild and Crazy Section 6

| Variable Name | Value |
| --- | --- |
| Filter Percent | 50 |
| Video filter 1 | Black and White |
| Video filter 2 | Color Correction |
| Video filter 3 | Posterize |
| Video filter 4 | Sepia |
| Video filter 5 | Lens Flare |
| Video filter 6 | Noise |
| Video filter 7 | Water Drop |
| Video filter 8 | Blur |
| Video filter 9 | Emboss |
| Video filter 10 | Mosaic |
| Video filter 11 | Old Film |
| Video filter 12 | Stained Glass |

TABLE 29

Wild and Crazy Section 7

| Variable Name | Value |
| --- | --- |
| Filter Percent | 50 |
| Video filter 1 | Black and White |
| Video filter 2 | Color Correction |
| Video filter 3 | Posterize |
| Video filter 4 | Sepia |
| Video filter 5 | Lens Flare |
| Video filter 6 | Noise |
| Video filter 7 | Water Drop |
| Video filter 8 | Blur |
| Video filter 9 | Emboss |
| Video filter 10 | Mosaic |
| Video filter 11 | Old Film |
| Video filter 12 | Stained Glass |

A method using the above preset values of the above variables is described in FIG. 27.

FIG. 18 illustrates a flow chart of method 466a, an implementation consistent with stage 466. Method 466a, as here diagrammed, creates the set of selected video scenes, using the preset values of the variables received in the style setting file as inputs. In general, method 466a first creates a video scene information array, section by section, for all sections that may be defined for the video style. An exemplary video scene information array may contain the required duration of video content needed to create each video scene. Method 466a then creates video scenes by selecting video scenes from the set of video clips that match in duration, the duration of each video scene duration as may be contained in the video scene information array.

Specifically, method 466a may include the following stages. As here implemented, the first section's start time may first be determined in stage 524. The first section's start time may preferably be the start time of the digital music content. For each section, starting with the first section, in stage 525, the section's end time may be determined. (A method of determining a section's end time, consistent with stage 525, is diagrammed in FIGS. 19-21 and is described further below.) In stage 527, method 466a may copy the elements from the beat element array that have onset times greater than or equal to the section's start time and less than the section's end time, thereby creating the section's beat element array. In stage 529, method 466a may create a video scene information array, an element of which may include the start and stop time, and the duration of a scene in the section, as well as information about what type of video effect, if any, may be applied to a scene. (A method of creating a video scene information array consistent with stage 529 is detailed in FIGS. 22-27.) In stage 531 of method 466a, the next section's start time may be set. As here implemented, the next section's start time is set equal to the current section's end time. This is preferred so that no gaps exist in the list of selected video scenes when played and the video content changes on a beat onset so that the visual and audio portions of the video are synchronized. As here implemented, method 466a then determines whether the last section has been processed or not in stage 533. If the last section hasn't been processed and at least one more section needs to be processed, as here implemented, method 466a may use the next section's style settings in stage 535 and may repeat the previously described stages 525 through 535 until all sections in the video style have been created. At that point the video scene information array may be complete and may contain a set of ordered durations of video scenes.

In stage 537 of method 466a, at least a portion of a video clip in the set of video clips may be selected and a duration equal to the scene's duration may be copied for each duration in the set of ordered durations or, as here implemented, each element in the video scene information array. (A method of selecting the portion and copying the duration is detailed in FIGS. 28a-30.)

Alternate methods of creating the set of selected video scenes which will make up the video portion of the movie may be used. In one variation on the overall method, the set of scene durations for one section may be determined and then the video scenes could be selected and copied for that section, rather than completing the video scene information array for all video scenes before selecting and copying video scenes. Other variations will be apparent to one skilled in the art.

FIG. 19 illustrates a flow chart of method 525a, an implementation consistent with stage 525. The style settings file for a video style may have more than one section for which duration variables exist and the last section may have a percent duration and a maximum duration as discussed previously. It may not be possible for each section to meet its duration limits according to the style settings file. If each section is processed in order, the last section will be the section that may not be able to meet its pre-designated duration limits. However, as implemented, method 525a provides for pre-processing the last section, so as to insure the last section may meet its pre-designated duration limits. As here implemented, method 525a pre-processes the last section before processing the next-to-last section. Thus, as here implemented, method 525a begins with stage 542, in which it determines whether or not the section to be processed is the next-to-last section. If the section to be processed is not the next-to-last section, then stage 544 is performed, in which the section's target end time may be determined based on the total duration of the digital music content and the preset values of the section duration variables of the style settings. As here implemented, those variables are the percent duration (of the total music duration) and the maximum duration. A method of calculating the section's target end time is detailed in FIG. 20. In stage 554, method 525a then checks to see if this section is the last section. If it isn't, then in stage 556, method 525a checks to see if the section has a percent duration less than 100. If the percent duration is 100, then the calculated end time is returned in stage 552 to stage 527 of method 466a (FIG. 18). In stage 554, if it is the last section then the section's end time is returned in stage 552.

If, on the other hand, in stage 542, it is determined that the current section is the next-to-last section then in stage 546, as here implemented, method 525a checks to see if the last section has a maximum duration or a percent duration from the style settings file. If it doesn't, method 525a proceeds to stage 544, previously described. If it does, then it may pre-process the last section in order to make sure that the last section meets its pre-designated duration guidelines. This may mean that the next-to-last section is shorter or longer in duration than its pre-designated duration guidelines, if any. In stage 548, method 525a calculates a target time when the next-to-last section should end (by determining a target time when the last section should begin) based on the total duration of the digital music content and the duration guidelines of the last section. (A method of calculating this target time is detailed in FIG. 21.)

In stage 550 of FIG. 18, the beat element with the onset time nearest to the target time of the end of the section may be determined. Preferably each element of the beat element array may be examined, starting with the first element. The section's target end time may be compared with the element's beat onset time. If the target time is greater than the beat's onset time, then the difference between the target end time and the beat onset time (target end time—beat onset time) may be calculated. If the target time is equal to or less than the beat onset time, then the difference between the beat onset time and the target end time (beat onset time—target end time) may be calculated. Whatever difference (by either method) is calculated may then be compared to a value, as here implemented, called the "nearest delta," which initially may be set equal to the target end time. If the difference just calculated is less than the nearest delta, that means this beat is closer to the target than the last one. This beat onset time is saved as the nearest beat onset, and the difference becomes the nearest delta to which the next difference will be compared as the next element is examined. The next element in the beat element array is then examined. If the difference calculated is not less than the nearest delta, this means that the beat is further away from the target than the last one and need not be saved as a candidate "nearest beat." The method may stop at this point, if desired, because the beats will only get further away from the target. Thus, after examining all elements, the last saved beat onset time, the nearest beat onset time is the beat onset nearest the section's target end time. This beat onset time is the section's end time and may be returned to stage 527 of FIG. 18 (method 466a).

Stage 554 of FIG. 19, as here implemented, then checks to see if the current section is the last section. If it is, then the section's end time will be the end time of the music content and the process is complete. If it isn't the last section, then in stage 556, as here implemented, method 525a checks to see if the current section has a percent duration less than 100. If it doesn't, then the section's end time is also the end time of the music content and again the process is complete. If it does, then stage 550, as previously described, may be performed, returning the section's end time to stage 527 of method 466a (FIG. 18).

Figure 20:
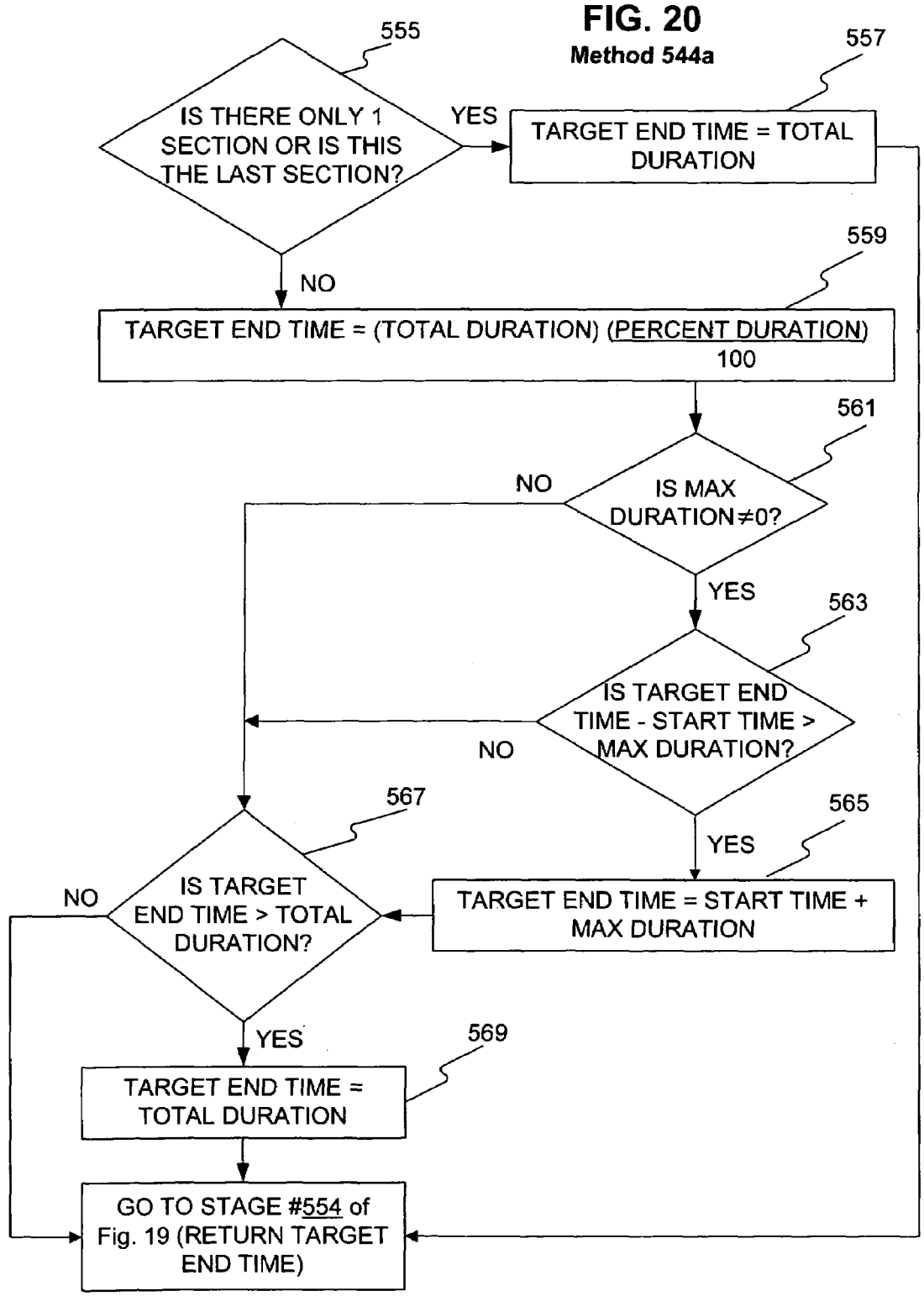
FIG. 20 is a flow diagram of a preferred implementation of stage 544 of FIG. 19 for determining a section's target end time.

FIG. 20 illustrates a flow chart of method 544a, an implementation consistent with stage 544 of FIG. 19. Stage 555 of method 544a may determine if the current section is the last section and or the only section (and thus the last). If it is the last section, then in stage 557, the section's end time may be set to the total duration of the digital music content, as preferably calculated earlier in the music content pre-processing stage 510. This value may be returned to stage 554 of method 525a (FIG. 19) as the section's end time. If, on the other hand, there is more than one section and this is not the last section, then in stage 559, the section's target end time may be set to be the section's start time plus the section's percent duration (as received from the style settings file) multiplied by the total duration of the music content and divided by 100. Note that in certain implementations, the time value of the total duration may be the same as the end-time of the digital music content. Generally, stages 561 through 565 may operate to replace the section's target end time with the section's start time plus the section's maximum duration if the section's duration as calculated using the percent duration end-time is greater than the maximum duration allowed. Specifically, in stage 561, method 544a may check to see if this section has a maximum duration value. If it does, then in stage 563 it may determine whether the section's duration is greater that the maximum duration per the style settings file. If the section's duration is greater, then in stage 565, method 544a may create a new target end time, which is equal to the section's start time plus the section's maximum duration. Then, in addition to 1) if there is no maximum duration value in stage 561, or 2) if the target end time as calculated using the percent duration does not need to be replaced with the target end time as calculated using the maximum duration in stage 563, method 544a may determine, in stage 567, if the current target end time is greater than the total duration of the music content. If the current target end time is greater, then the section's target end time may be set to the time value of the total duration in stage 565 and may be returned to stage 554 in FIG. 19. Note that this will likely only happen when the current section is the last section, thus why, as implemented, the target time may be used without further processing (i.e. stage 550) as the section's end time in method 525a (FIG. 19). If the current target end time is not greater, then the current target end time may be returned as the section's target end time to stage 554 in method 525a (FIG. 19).

Figure 21:
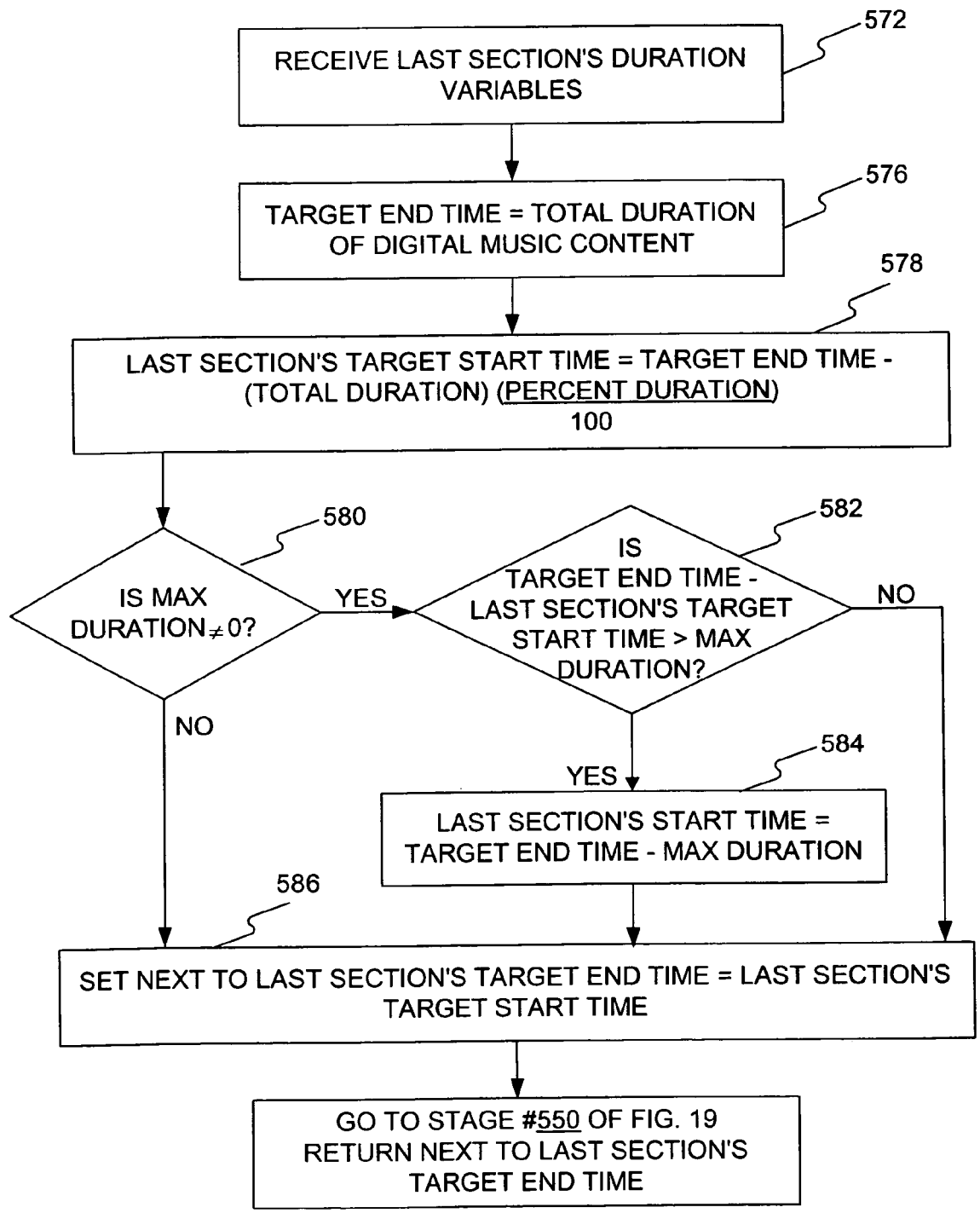
FIG. 21 is a flow diagram of a preferred implementation of stage 548 of FIG. 19 for determining the next-to-last section's target start time.

FIG. 21 is a flow chart of method 548a, an implementation consistent with stage 548 of method 525a (FIG. 19). As described previously, stage 548 may determine the target time when the last section should start, and therefore the target time when the next-to-last section should end. Turning to FIG. 21, the last (as in final) section's duration variables may be received from the style settings file in stage 572. In stage 576, the target end time for the last section may be set to the total duration of the digital music content. In stage 578, the last section's start time may be set equal to the target end time minus last section's duration as calculated using the percent duration default value. Stage 580 may determine whether there is a maximum duration for the last section. If there is a maximum duration, then stage 582 may determine whether the target end time minus the last section's target start time is greater than the maximum duration. If it is greater, then in stage 584, the last section's target start time may be changed to equal the target end time minus the maximum duration. In stage 586, the next-to-last section's target end time may be set equal to the last section's target start time. If there was no maximum duration for the last section in stage 580, or if the last scene's duration as calculated in stage 582 did not exceed the maximum duration, then the next-to-last section's target end time may be set equal to that last section's target start time. The target end-time of the next-to-last section may then be returned to stage 550 of method 466a (FIG. 19).

Figure 22:
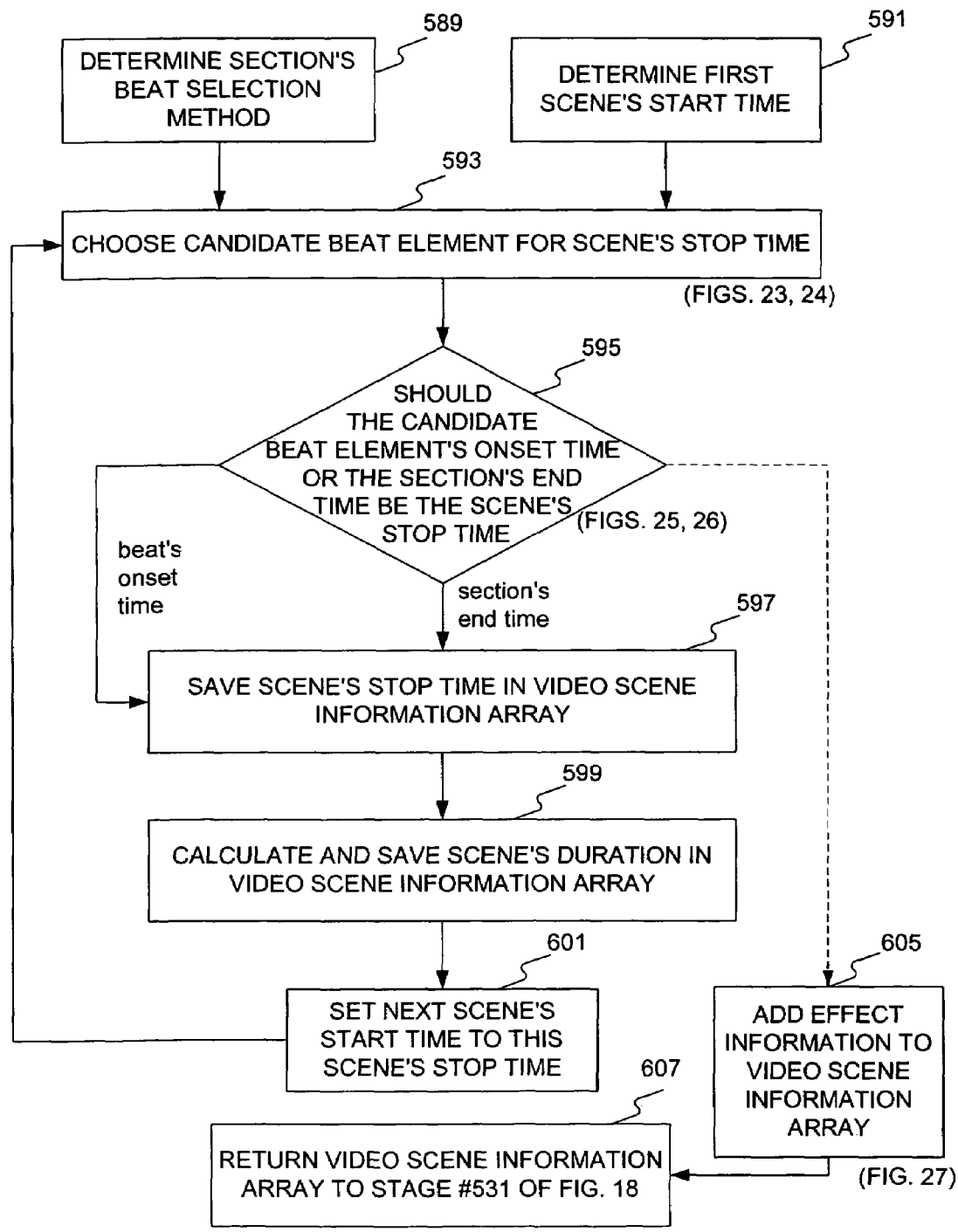
FIG. 22 is a flow diagram of a preferred implementation of stage 529 of FIG. 18 for determining information about video scenes to be created.

FIG. 22 is a flow chart of method 529a, an implementation consistent with stage 529 of method 466a (FIG. 18). As previously described, stage 529 may create a set of information about each scene that may be in the section, including, as non-limiting examples, the start and stop time, the duration, the type of video effect, if any, to be applied to the scene, the particular effect, and if the effect is a transition, the transition duration. Each piece of information preferably may be stored as a member of an element, in a video scene information array comprising these elements. Turning to the exemplary implementation, in stage 589, the current section's beat selection method may be determined from the style settings file. In stage 591, method 529*a* may determine the first scene's start time, which, as here implemented, is the section's start time. In stage 593, method 529*a* may choose a candidate beat element for the scene's stop time. (The two exemplary default methods discussed above for choosing the candidate beat (average length and strongest beat) are described in FIGS. 23-24.) In stage 595, the candidate beat and the remaining duration in the section's beat element array are examined to determine whether the candidate beat element's onset time or the section's end time should be the scene's end time. (A method of making that determination is detailed in FIGS. 25 and 26.) Whichever is selected to be the scene's stop time is saved in stage 597, preferably as a member of the appropriate element of the video scene information array. Stage 595 may also provide for confirming that the end of the section's beat element array has been reached and no more scenes may be created. This option is indicated by the dotted line connecting stage 595 and stage 605 in FIG. 22, and an implementation of such an option is detailed in FIGS. 25 and 26. Stage 595 may also provide for selecting a beat element when stage 593 does not return a candidate beat element. This option is also indicated by the dotted line connecting stage 595 and stage 605 in FIG. 22. Returning to stage 599 of FIG. 22, the scene's duration may be calculated and saved, again, preferably as a member of the appropriate element of the video scene information array. In stage 601, the next scene's start time may be determined in stage 603 and, as here implemented, it may be set to this scene's stop time. Stages 593 through 601 may then be repeated until stage 595, as here implemented, determines that the final scene has been set. Then method 529*a* may add effect information from the style settings file, if any, to the appropriate elements of the video scene information array in stage 605. (A method of adding effect information is detailed in FIG. 27.) In stage 607, the video scene information array may be returned to stage 531 in method 466*a* (FIG. 18).

Figure 23:
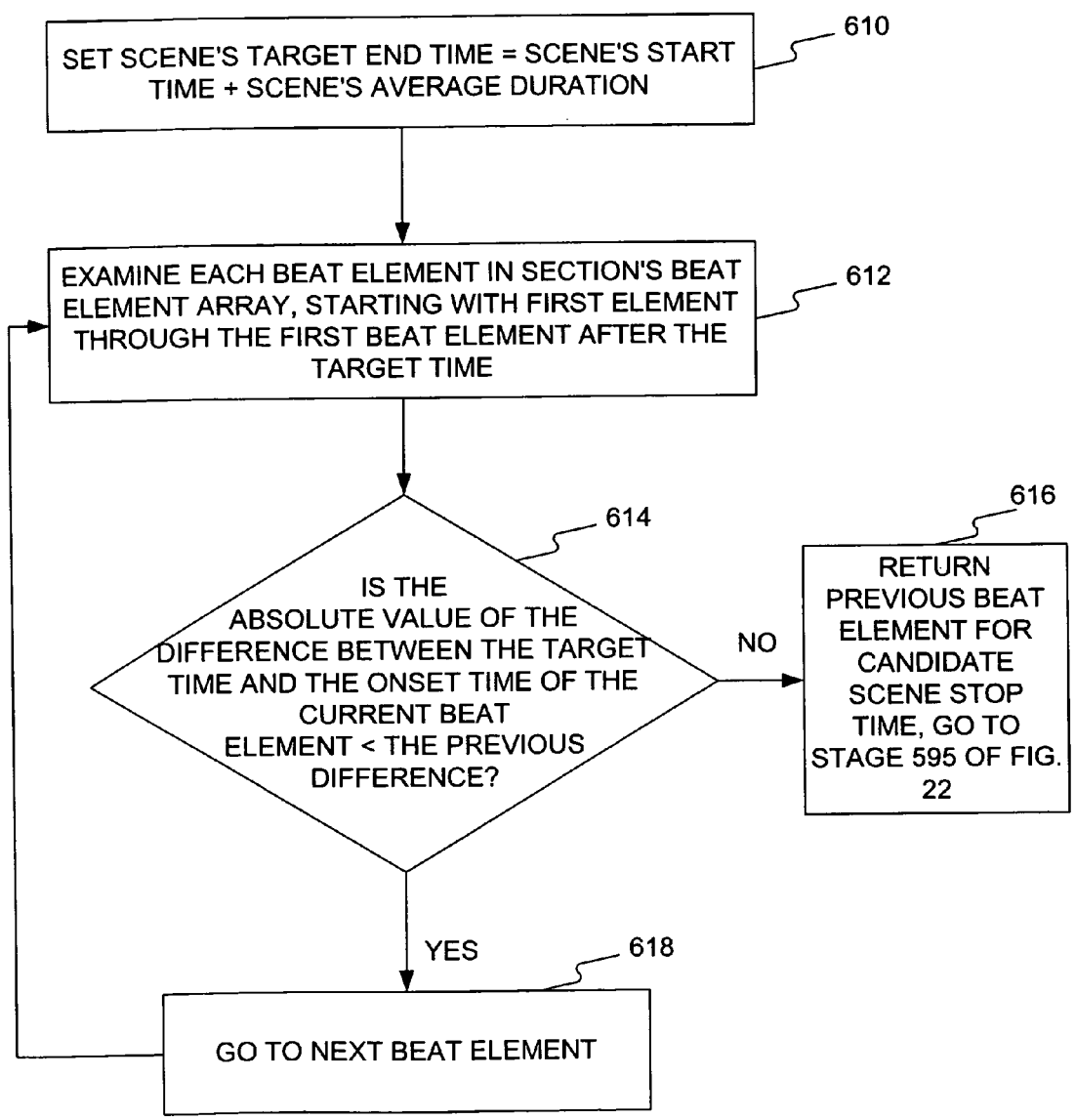
FIG. 23 is a flow diagram of a preferred implementation of stage 593 of FIG. 22 for selecting beats to create scenes of approximately a desired average duration.

FIG. 23 is a flow chart of method 593*a*, an implementation consistent with stage 593 of FIG. 22. As here implemented, method 593*a* is performed when a section's style setting file contains the default method "Average Length" of the variable "algorithm." In general, method 593*a* selects beat elements that are nearest to a target time and, as here implemented, in stage 610, the scene's target end time is preferably the scene start time plus the average scene duration from the style settings file. In stage 612, beat elements in the section beat element array are examined, preferably starting with the first element and continuing through the first beat element after the scene's target end time. In stage 614, method 593*a* determines whether the absolute value of the difference between the target time and the onset time of the current beat element is less that the previous difference. If it is, then in stage 618 the next beat element in the section beat element array is selected that meets the criteria of stage 612, and stage 614 is repeated until the absolute value of the currently calculated difference is equal or greater than the previously calculated difference. In stage 616, the previous beat element may be returned to stage 595 of FIG. 22 as the candidate beat for the scene's stop time.

Figure 24:
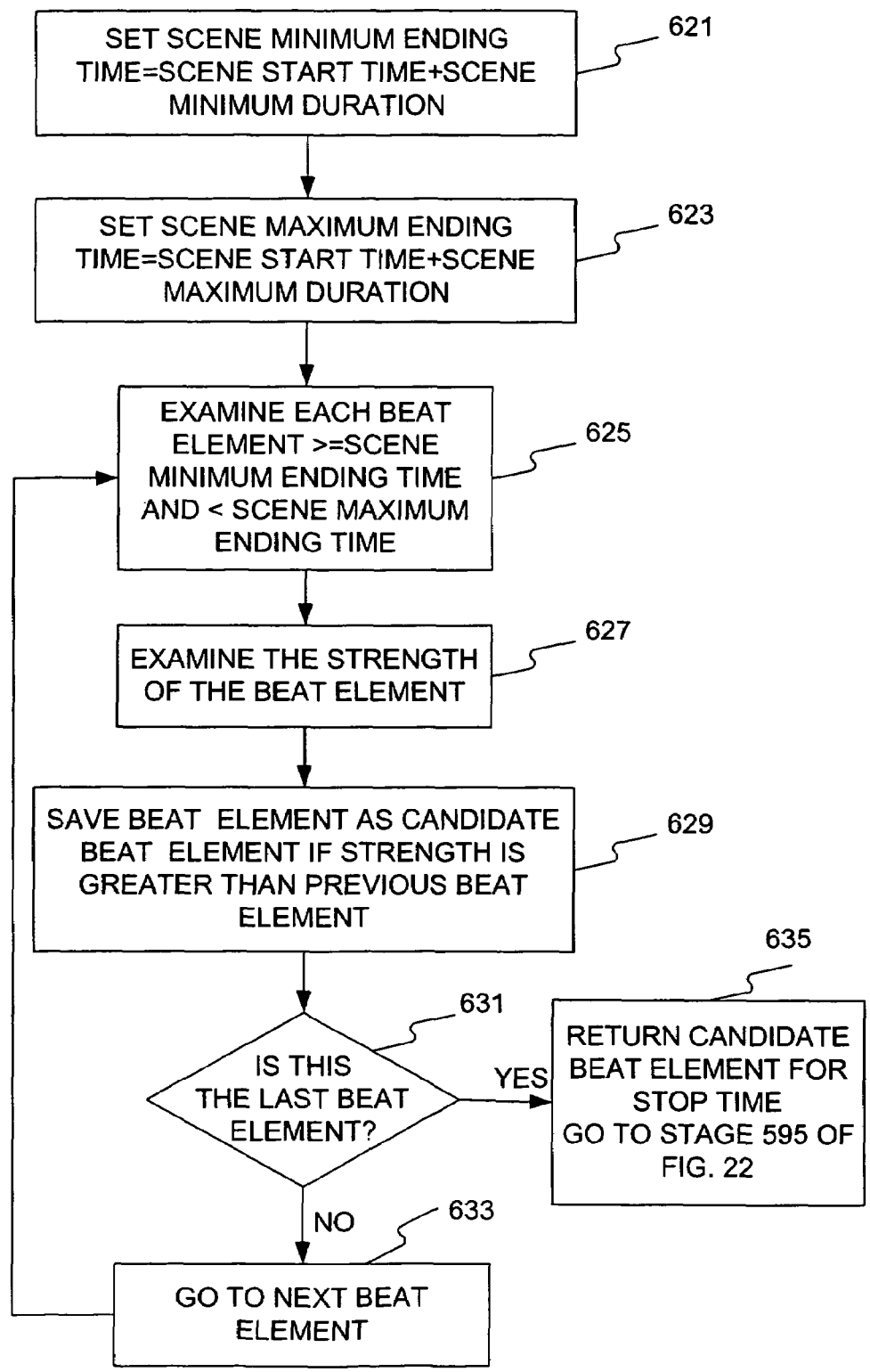
FIG. 24 is a flow diagram of another preferred implementation of stage 593 of FIG. 22 for selecting beats to create scenes of variable duration within set minimum and maximum durations.

FIG. 24 is a flow chart of method 593*b*, an implementation consistent with stage 593 of FIG. 22. In general, method 593*b* may select the beat element with the greatest amplitude between two given times. Specifically, in stage 621, the smaller of the two times, the scene minimum ending time, may be set equal to the scene's start time plus the scene's minimum duration from the style settings file. In stage 623, the larger of the two times, the scene maximum ending time, may be set equal to the scene's start time plus the scene's maximum duration. In stage 625, method 593*b* may examine a beat element from the section's beat element array that may be greater than or equal to the scene's minimum ending time and the less than the scene's maximum ending time. In stage 627, the strength of the beat element is examined and, in stage 629, the beat element may be saved as the candidate beat element if its amplitude is greater than the previous beat element's. In stage 631, method 593*b* determines whether or not the beat element being examined is the last beat element that meets the criteria of stage 625. If it isn't, in stage 633, the next beat element is selected and stages 625 through 631 are repeated until stage 631 determines that the last beat element meeting the criteria of stage 625 has been examined. In stage 635, the candidate beat element is returned to stage 595 of FIG. 22.

Figure 25:
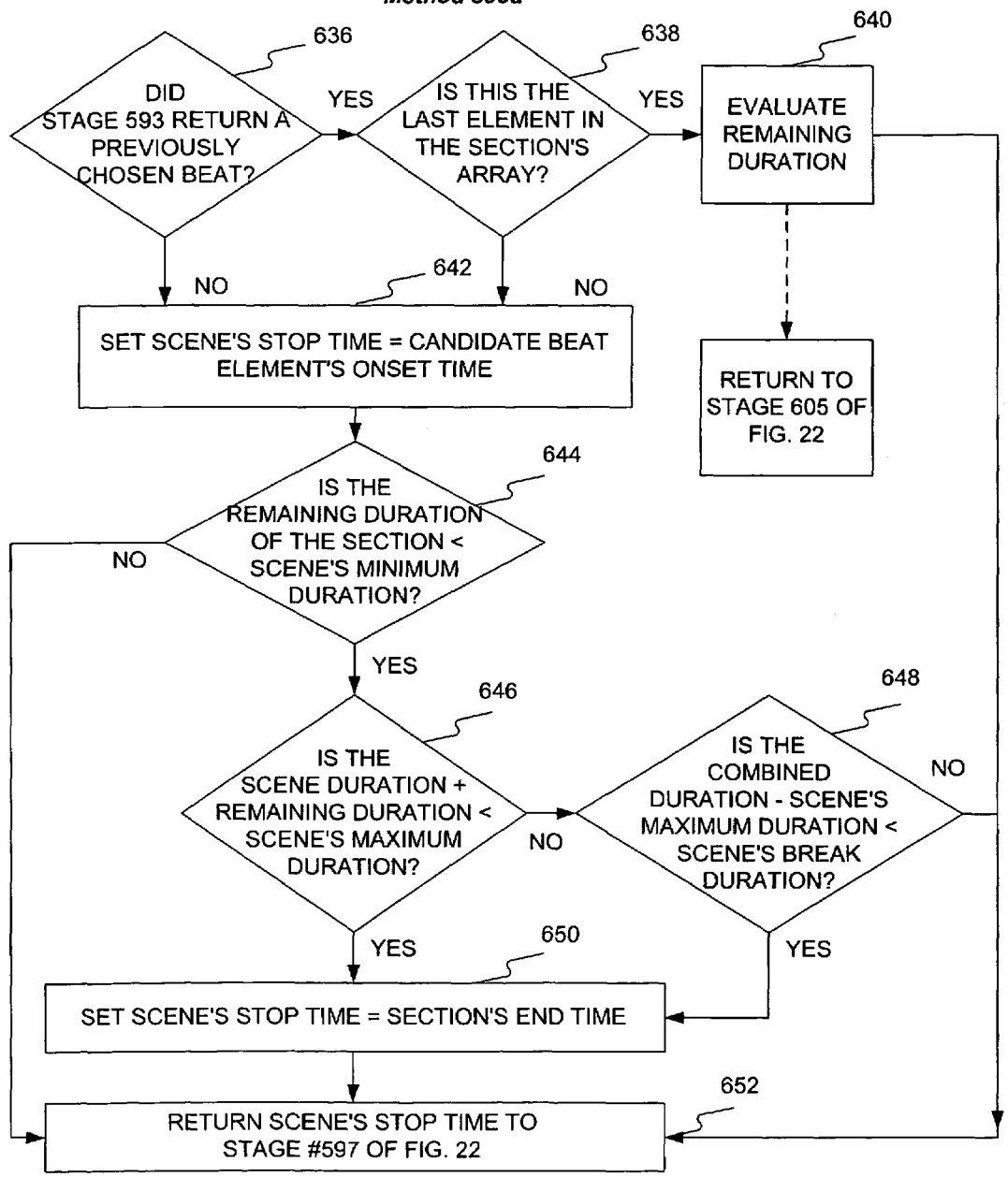
FIG. 25 is a flow diagram of a preferred implementation of stage 595 of FIG. 22 for determining whether a selected beat onset time or the section's end time is the preferable scene stop time.

FIG. 25 is a flow chart of method 595*a*, an implementation consistent with stage 595 of method 529*a* (FIG. 22). In stage 636, method 595*a* may determine whether the identified beat element has been chosen before. If it has been chosen before, then method 595*a* may determine if the identified beat element is the last element in the section's beat element array in stage 638. If it is the last element, then the remaining duration is evaluated in stage 640 to verify that the section is complete and no more scenes may be created within the section. As here implemented, this is illustrated by the dotted line indicating an option to return to stage 605 of FIG. 22, previously described as the "add effects" stage of method 529*a*. Alternatively, if a mistake has been made in performing method 529*a*, stage 640 provides another opportunity for a scene to be set. (A method of evaluating the remaining duration is detailed in FIG. 26.) This option is illustrated by the solid line to stage 652, in which whatever new stop time for the new scene may be returned to stage 597 of method 529*a* (FIG. 22). If the beat element hasn't been previously chosen, stage 642 may set the scene's stop time equal to the candidate beat element's onset time. In stage 644, it may be determined whether the remaining duration in the section is less than the scene minimum duration from the style settings file. If the remaining time in the section is less than the scene minimum duration from the style settings file then, in general, stages 646 and 648 determine whether the remaining duration may be added onto the existing scene, thereby making it the last (final) scene in the section, or whether at least one more scene may be created in the section. Specifically, stage 646 may determine whether the current scene duration plus the remaining duration in the section is less than the scene maximum duration from the style settings file. If so, then as here implemented, the remaining time may be added to the current scene and in stage 650, the scene's stop time is set to the section's end time. If not, then stage 648 may determine whether the combined duration of the current scene duration and the remaining duration minus the scene maximum duration is less than the section's break duration from the style settings file. If the difference is less than the scene break duration, then the remaining time may be added to the scene, even if it will exceed the maximum scene duration. Thus, in stage 650, the scene's stop time may be set equal to the section's end time. If, on the other, the difference is less than the scene break duration, the current scene's stop time may be used. Once the scene's stop time is determined, it may be returned in stage 652 to stage 597 of method 529*a* (FIG. 22). If the remaining duration isn't less than the scene minimum duration in stage 644, (and it shouldn't be the first time through this loop of instructions when a section provides for more than one scene), then stage 652 may return the scene's stop time, which as unchanged, may still be the chosen beat's onset time, to stage 597 of method 529*a* (FIG. 22).

Figure 26:
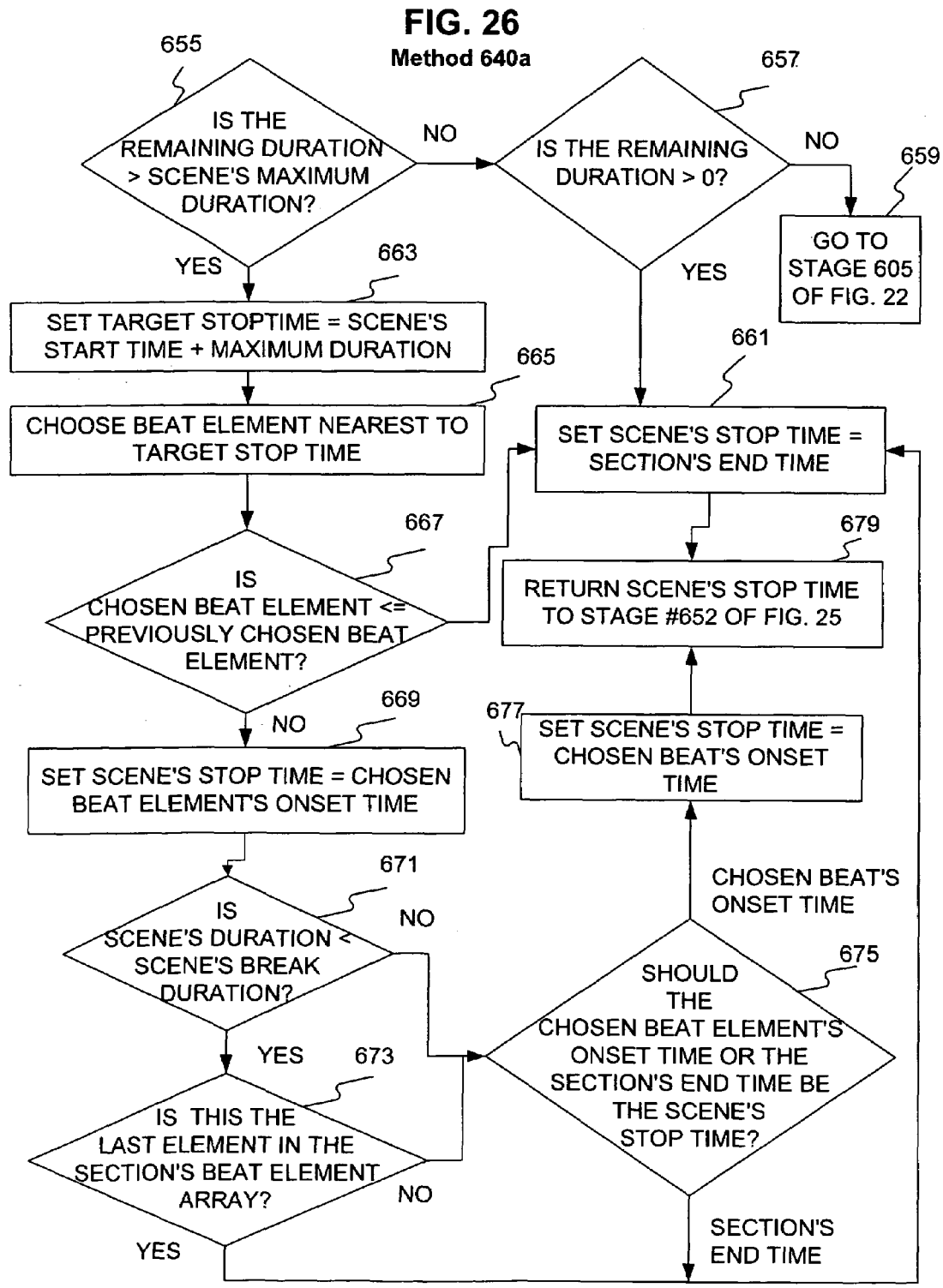
FIG. 26 is a flow diagram of a preferred implementation of stage 640 of FIG. 25 for determining whether another scene may be set within a section or if all scenes for a section have been set.

FIG. 26 is a flow chart of method 640*a*, an implementation consistent with stage 640 of method 595*a* (FIG. 25). In stage 655, method 640*a* may determine whether the remaining duration between the section's stop time and the video scene's start time is greater than the maximum scene duration from the style settings file. If it isn't greater, stage 657 may determine whether the remaining duration is greater than zero. If the video scene's start time is the section's stop time, then, as here implemented, in stage 659 the video scene information array may then be returned to stage 605 of method 529*a* (FIG. 22). Otherwise, if method 640*a* performs a method to set another scene. If, for example, in stage 657, remaining duration in the section exists, but is less than the scene's maximum duration from the style settings file, then stage 661 is performed, where the scene's stop time may be set to the section's end time.

Or method 640*a* may attempt to set at least one more scene in the section, in stage 655, as implemented, if the remaining duration in the section is greater than the scene's maximum duration. In stage 663, a target stop time may be set to the scene's start time plus the maximum duration. In stage 665, the beat element nearest to the target stop time is chosen. Preferably, the method of performing stage 665 may include previously described stages 612-618. In stage 667, method 640*a* may determine whether the chosen beat element is less than or equal to the previously chosen beat element. If it is less than or equal to the previously chosen beat element, then stage 661 may be performed, where the scene's stop time may be set equal to the section's end time. If it is greater than the previously chosen beat element, then another scene may exist, thus the scene's stop time may be set to the beat element's onset time. However, checks may still be performed to verify that the chosen beat element's onset time is the best scene stop time. Thus, as implemented, in stage 671, method 640*a* determines whether the scene's duration is less than the scene's break duration. If it is less than the scene's break duration, then in stage 673, method 640*a* determines whether the element chosen is the last element in the section's beat element array. If it is the last element, then stage 661 may be performed and the scene's stop time may be set to the section's end time, thereby adding the remaining duration to the previously selected scene. If, on the other hand, in stage 671 the scene's duration is not less than the scene break duration or, in stage 673, the element is not the last element in the section's beat element array, then stage 675 may be performed, wherein method 640*a* determines whether the chosen beat element's onset time or the section's end time may be the scene's end time. Preferably, stage 675 may be performed using the stages of method 595*a* (FIG. 25). If the chosen beat is preferable, then the scene's stop time may be set to the chosen beat's onset time in stage 677. If the section's end time is preferable, then the scene's stop time may be set to the section's end time in stage 661. Once a scene's stop time has been finally set in stages 661 or 677, the scene's stop time may be returned to stage 652 in method 595*a* (FIG. 25), which in turn returns the scene's stop time to stage 597 of method 529*a* (FIG. 22). Method 640*a* may be used at other points in the beat selection method, whenever a new beat is not selected in a stage (or series of stages) and yet remaining duration in the section may exist.

FIG. 27 is a flow chart of method 605*a*, an implementation consistent with stage 605 of method 529*a* (FIG. 22). As previously described, stage 593 may determine which scenes will have an effect as provided by the section style settings. It may also add effect information into the appropriate elements of the scene video information array. In stage 682 of method 605*a*, the type of effect, e.g., transition, filter, or speed, that may be added to scenes may be determined from the style settings file. In stage 684, the percent of scenes to have this type of effect applied as set by the predetermined variable of, e.g., transition percent, filter percent, speed effect as may be determined from the style settings file. In stage 686, the number of video scene information array elements with effects may be determined by taking the nearest integer of the result of multiplying the number of video scene elements in the section's video scene information array by the appropriate effect percentage and dividing by 100. In stage 688, method 605*a* may determine whether the effect percentage variable preset value is 100 or not, i.e., whether the number of effect scenes is equal to the number of elements. If it is 100, the type of effect from the style settings file is added to each element of the section's video scene information array in stage 690. If it is not 100, in stage 692, a video scene information element may be selected at random. In stage 694, the type of effect from the style settings file may be added to the selected video scene information element. In stage 696, method 605*a* may determine whether the number of effect scenes equals the total number of scenes randomly selected. If there is at least one more effect scene than scenes randomly selected, it may repeat stages 692 through 696, until stage 696 determines that there are no more video scene elements that should have an effect added to them. In stage 698, the video scene information array may be returned to stage 531 of method 466*a* (FIG. 18).

FIG. 28*a* is a first page of a flow chart of method 537*a*, an implementation consistent with stage 537 of method 466*a* (FIG. 18). As previously described, stage 537 may select and copy at least a portion of the digital video content to create a list of selected video scenes for the section that match in duration the scene duration of each element in a section's video scene information array. Preferably, these copied video scenes may be sequenced for play order and copied to a separate list of selected video scenes that may contain the sequenced scenes for all sections of the video. Turning to method 537*a*, in stage 701 the number of scenes in the section may be determined. As here implemented, the number of elements in the video scene information array are determined in stage 701. In stage 703, the first video scene information element may be examined. In stage 705, it may be determined whether the element has a transition effect. If it doesn't, there is no transition duration and that variable may be set to zero in stage 711. If it does have a transition effect, then the specific transition effect to be applied may be determined and if it is not a "fade," i.e. as implemented by Pinnacle Systems products as transition #6300, the transition duration may be randomly determined using the transition duration variables from the style settings file in stage 709. Method 537*a*, as here implemented, in stage 713, may check to see if the current element is the last element in the video scene information array. If it is the last element, in stage 715, the transition duration may be replaced with the closing transition duration, if one exists. If it isn't the last element, in stage 717 the scene's duration may be adjusted to include the transition duration. In stage 719, the scene duration may be adjusted for the speed effect, if any. As here implemented, stage 719 adjusts the scene duration for a speed effect by setting the scene's duration equal to the next highest integer of the scene duration multiplied by the speed as determined from the style settings file. Method 537*a* continues in FIG. 28*b*.

In stage 721 of method 537*a* as flow charted in FIG. 28*b*, a random start point in the digital video content may be generated. (An implementation consistent with stage 721 is detailed in FIG. 29.) In stage 723, the digital video content may be copied from the start point to an end point determined by the scene duration. (An implementation consistent with stage 685 is detailed in FIG. 30.) In stage 725, method 537a may determine whether the last (final) selected video scene is at least as long as its transition duration and replace it with another selected video scene with a duration calculated without the transition duration, if the original one wasn't long enough.

As here implemented, in stage 727, the play back speed of the video clip may be set, if it is different than the normal play back speed. As here implemented, in stage 729 a filter effect may be selected and applied to the video clip, if the video scene element has filter effect information in it. As here implemented, in stage 731 a transition effect may be selected and applied to the video clip, if the video scene element has transition effect information in it. As here implemented, in stage 733 the effect on the audio associated with the video by the particular transition effect selected in stage 731 is accounted for. In stage 735, method 537a may check to see if this element is the last one in the video scene information array. If it is not the last element, then in stage 737, the next element in the video scene information array may be selected and stages 705 through 737 may be repeated as appropriate until stage 735 determines that the current element is the last element. After all video scenes have been created, in stage 739, the opening transition may be added to the list of video scenes created and in stage 741, the closing transition may be added to the list of video scenes. When a selected video scene is copied from a video clip it and becomes a smaller video clip, its start time then becomes 0 and its end time is its duration. Accordingly, in stage 743, in order to have the selected video scenes play sequentially, the start and stop times for each scene may be assigned new time values relative to the total duration of the set of selected video scenes. The audio accompanying the selected video scenes may also be assigned new start and stop time values that match those of the set of selected video scenes. As here implemented, the section's list of selected video scenes and opening and closing transitions as well as the list of accompanying audio may be returned to stage 468 of method 425 (FIG. 17).

Figure 29:
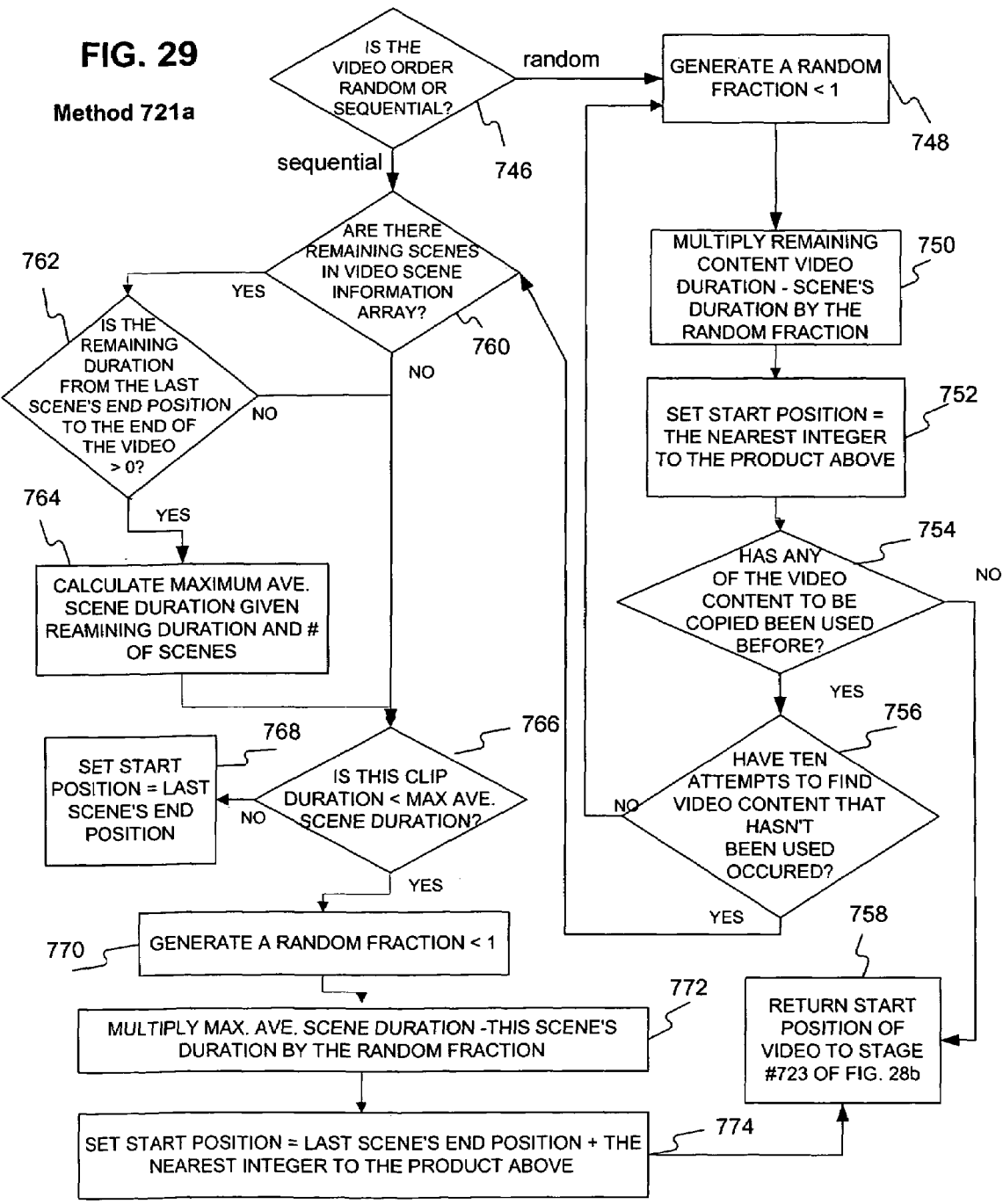
FIG. 29 is a flow diagram of a preferred implementation of stage 721 of FIG. 28b for determining a start position within the user-provided video content to begin copying a video scene.

FIG. 29 is a flow chart of method 721a, an implementation consistent with stage 721 of method 537a (FIGS. 28a &b). As previously described, stage 721 may determine a start position for copying the digital video content for the selected scene. In stage 746 of method 721a the scene order variable preset value may be determined. As here implemented, if it is random, then in general stages 748 through 758 may attempt to return a random start point with never-been-used video content sufficient to copy within ten attempts. Specifically, in stage 748, a random fraction less than one may be generated. In stage 750, the fraction may be multiplied by the difference between the total video duration and the scene's speed-adjusted duration. In stage 752, the start position may be set to the nearest integer to the value calculated in stage 750. In stage 754 the video content after the start position that may be copied may be examined to see if any of it has already been used for another scene. If it hasn't been used before, in stage 758, the start position may be returned to stage 723 of method 537a (FIG. 28b). If it has been used before, in stage 756 method 721 may determine if ten attempts have already been made to find a portion of a video clip that hasn't been used before. If ten attempts have not been made then stages 748 through 756 may be repeated until stage 754 finds a video clip that has not been used before or until stage 756 determines that ten attempts have been made. If ten attempts have been made, then the process for selecting a start point for the sequential video scene order, as here implemented, may be used to return a start position. Thus, as here implemented, the following stages (760 through 774) may also be the method of picking a start position for an selected video scene when the preset value for the video scene order in the style settings file is determined to be sequential in stage 746. In stage 760, method 721a may determine whether there are remaining scenes in the video scene information array. If there are remaining scenes, then in stage 762 it may be determined whether or not the remaining duration from the previous video scene's end position to the end of the digital video content is greater than zero. If it is greater than zero, then in stage 764, the maximum average scene duration may be calculated given the remaining duration and the number of remaining scenes. One method of calculating the maximum average scene duration may be to divide the remaining duration by the number of remaining scenes. In stage 766, which may be the next stage if stage 720 determines that the current scene is the last one in the video scene information array, the current scene's duration may be compared to the maximum average scene duration. If it is not less than the maximum average scene duration, then in stage 768, the start position for the current scene may be set to the end position of the previous video scene's video clip and, in stage 758, this start position may be returned to stage 685 of method 537a (FIG. 28b). If stage 766 determines that the current scene's duration is less than the maximum average scene duration, then in stage 770 a random fraction less than 1 may be generated. In stage 772, the fraction may be multiplied by the difference between the maximum average scene duration and the current scene's duration. In stage 774, the start position for the current scene may be set equal to the previous video clips end position plus the nearest integer to the result calculated in stage 772. This start position may be then returned in stage 758 to stage 723 of method 537a (FIG. 28b).

However, alternate methods of choosing an initial location may be used, such as, for example, starting a fixed duration away from the beginning of the selected video content.

Figure 30:
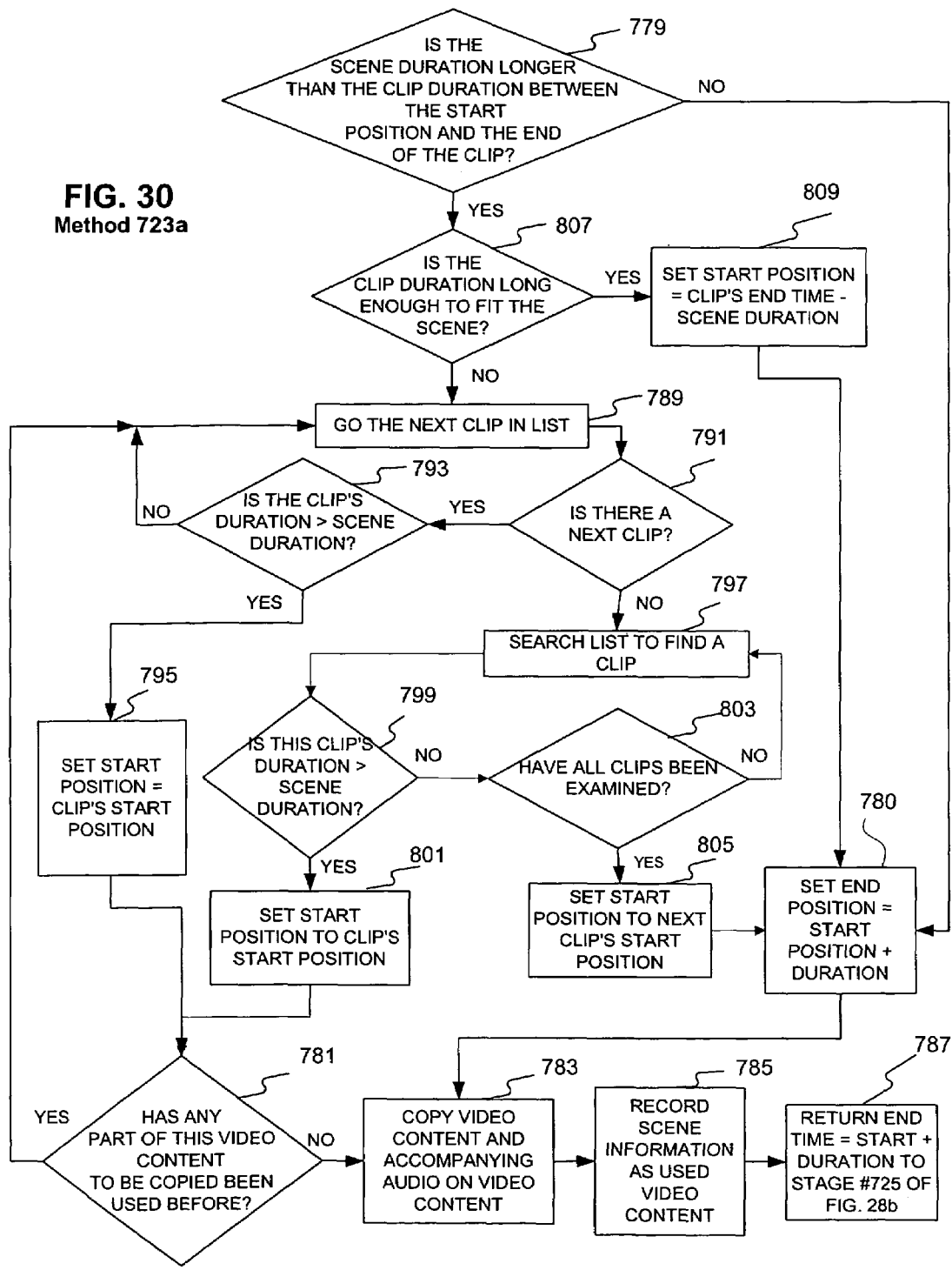
FIG. 30 is a flow diagram of a preferred implementation of stage 723 of FIG. 28b for copying a video scene from the user-provided video content.

FIG. 30 is a flow chart of method 723a, an implementation consistent with stage 723 of method 537a (FIG. 28b). Starting with the video clip in which the start position is located, in stage 779, the scene's duration may be compared to the video clip duration between the start position and the end of the video clip. If the scene's duration is not longer than the video clip, then in stage 780, the end position is set to the start position plus the scene's duration. Then, as here implemented, in stage 783, the video content between the start and end position may be copied as well as any audio accompanying the video content and may be saved as the next video scene in the set or list, as here implemented, of selected video scenes. In stage 785 the scene information may be recorded as used video content. In stage 787, the end position may be returned to stage 725 of method 537a (FIG. 28b). As here implemented, the end position may be set to the start position plus the scene's duration.

If the scene duration is longer than the video clip duration between the start position and the end of the clip in stage 779, then in stage 807, the clip duration may be compared to the scene duration. If the clip duration is long enough to fit the scene, then in stage 809, the start position may be set to the video clip's end time minus the scene's duration. From there, as here implemented, stages 780 through 787 as previously described may be performed. If the video clip in which the originally chosen start position portion of the video clip is not long enough to fit the scene, then in stage 789, the next clip is examined. In stage 791, it may be determined whether or not there is a next video clip. If there is a next video clip, then in stage 793, the next video clip's duration may be compared to the scene's duration. If the next video clip's duration is not greater, then stages 789 and 791 may be repeated until either there is not a next clip in the list, wherein stage 797 may search the list to find a video clip, or where the video clip's duration is greater than the scene's duration in stage 793. If the video clip's duration is greater than the scene's duration, then, as here implemented, in stage 795, the scene's start position may be set to the video clip's start position.

In stage 781, the video scene (i.e., the video content) to be copied as the current scene may be checked against a record of used video content, to see if any part of it has been used before. If no part has been used before, then stage 783 through 787 as previously described, may be performed. If in stage 781, a part of the video scene to be copied has been used before, then method 723a returns to step 789 to examine the next video clip.

If in stage 791, there is no next clip in the list (e.g., the current video clip is the last clip in the list), then, as here implemented, stage 797 locates a clip in the list. In stage 799 the video clip's duration may be compared to the scene's duration. If the video clip's duration is greater, then, as here implemented, in stage 801 the scene's start position may be set to the video clip's start position. Then stages 781, as previously described, may be performed.

Returning to stage 799, if the duration isn't greater, then, as here implemented, in stage 803, method 723a may determine whether all video clips in the list have been examined. If all video clips in the list have been examined, then, as here implemented, in stage 805 the scene's start position may be set to the next clip's start position. If they haven't, then, as here implemented, in stage 797 the next clip in the list may be examined or the list may be searched for a clip and stages 797, 799, and 803 may be repeated until stage 799 locates a video clip whose duration is greater than the scene's duration, or stage 803 determines that all video clips have been examined. When stage 803 determines that all video clips have been examined, the start position may be set to the next video clip's start position in stage 805 and stages 780 through 787 as previously described, may be performed.

Preferably, the video editing method does not copy duplicate video content, however, duplicate video content may be used if necessary.

Figure 31:
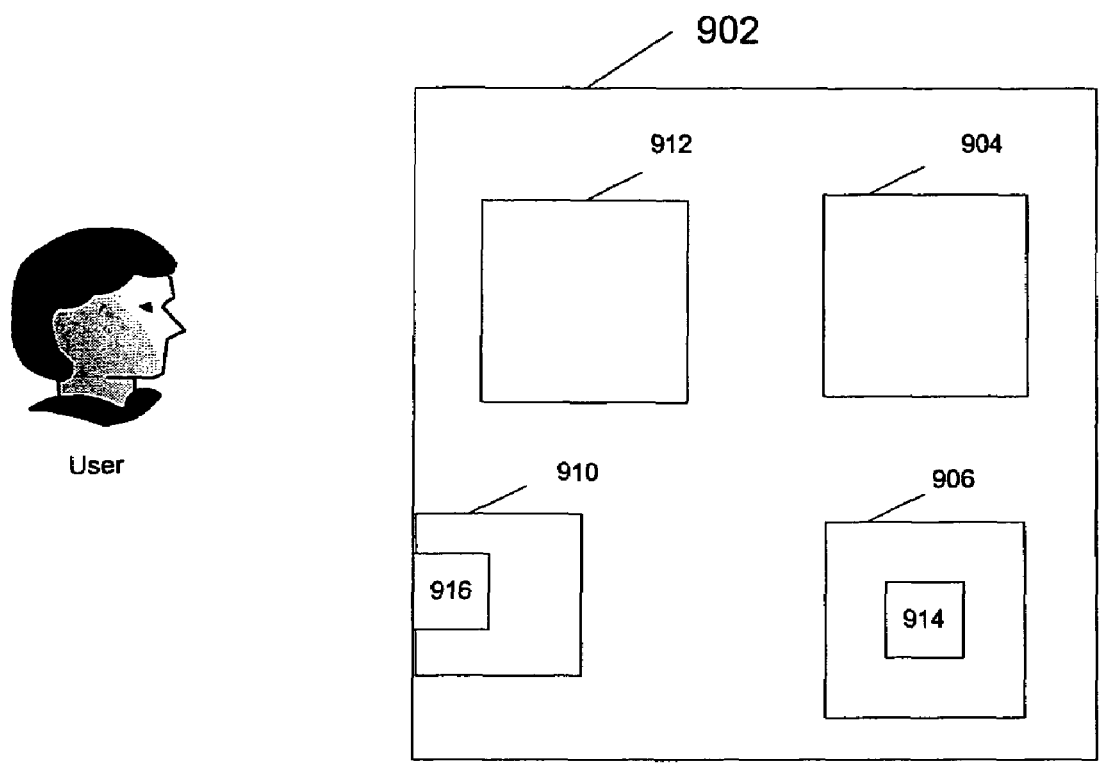
FIG. 31 is a block diagram of a system in which a computer-program product consistent with the invention may be used.

FIG. 31 is a block diagram of a system for using a computer program product consistent with the invention. System 900 may include a computer 902 having a processor 904, memory 906 and an input/output device 910 and display 912. Computer program product 914 may be stored in memory 906, but may also by stored in portable memory, on any computer readable medium 916, accessible through input/output device 910. A user may insert computer readable medium 916 into computer 902 and copy and save computer program product 914 on memory 906. When computer program product 914 is executed, the user may enter his or her selections of music content, video content and video style through a keyboard and or mouse or other input device. The synchronized music and video may be saved as a movie, which may be viewed on display 912 by the user.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of making a movie comprising:
   receiving digital music content;
   receiving user-provided digital video content;
   offering a selection of video styles to a user;
   receiving a user-selected video style, the video style comprising preset values of variables that define the visual characteristics of the movie;
   providing a set of onset times and a corresponding set of beat strength values of beats at a fundamental beat frequency in the digital music content;
   choosing from the set of onset times, stop time for one or more video scenes to be played in the movie using at least one of the preset values of the variables from the video style and the beat strength values corresponding to the onset times;
   selecting from the user-provided digital video content, one or more video scenes to match in duration the duration between the scene's start and stop times;
   creating a list of selected video scenes for synchronized playback with the digital music content, wherein a plurality of the selected video scenes change in synchronization with a subset of onset times of beats in the digital music content.

2. The method of claim 1, wherein the preset values of the variables define at least one of the following characteristics of a video: video scene duration, video scene order, number of transitions between scenes, transition techniques used, number of scenes with filters, filter techniques used, number of scenes with playback speed other than normal, video playback speed.

3. The method of claim 1,
   wherein choosing a stop time comprises:
   determining a first scene ending time and a second, later scene ending time using at least one variable from the video style; and
   choosing the onset time corresponding to the greatest beat strength value between the first scene ending time and the second, later scene ending time.

4. The method of claim 1, wherein choosing a stop time comprises: determining a target scene stop time using at least one variable from the video style; and choosing the beat onset time nearest to the target scene stop time.

5. A computer-readable medium of instructions that when executed by a processor perform a method, the method comprising:
   receiving digital music content;
   receiving user-selected digital video content;
   offering a selection of video styles to a user;
   receiving a user-selected video style, the video style, comprising preset values of variables that create the visual characteristics of the movie;
   providing a set of onset times and a corresponding set of beat strength values of beat at a fundamental beat frequency in the digital music content;
   choosing from the set of onset times, stop time for one or more video scenes to be played in the movie using at least one of the preset values of the variables from the video style and the beat strength values corresponding to the onset times;
   selecting from the user-selected video content, one or more video scenes to match in duration the duration between the video scene's start and stop times; and
   creating a list of selected video scenes for synchronized playback with the digital music content, wherein a plurality of the selected video scenes change in synchronization with a subset of onset times of beats the digital music content.

6. The computer-readable medium of claim 5, wherein the preset values of the variable define at least one of the group of characteristics of a video consisting of: video scene duration, video scene order, number of transitions between scenes, transition techniques used, number of scenes with filters, filter techniques used, number of scene with playback speed other than normal, video playback speed.

7. The computer-readable medium of claim 5, wherein choosing a stop time comprises:

determining a first scene ending time and a second, later scene ending time using at least one variable from the video style; and choosing the beat onset time corresponding to the greatest strength value between the first scene ending time and the second, later scene ending time.

\* \* \* \* \*